US006708000B1

(12) United States Patent
Nishi et al.

(10) Patent No.: US 6,708,000 B1
(45) Date of Patent: Mar. 16, 2004

(54) PHOTONIC NODE, PHOTONIC NODES FOR TRANSMISSION AND RECEPTION, AND METHOD OF RESTORING TRAFFIC UPON OCCURRENCE OF LINK FAILURE IN OPTICAL PATH NETWORK

(75) Inventors: Tetsuya Nishi, Kawasaki (JP); Satoshi Kuroyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 544 days.

(21) Appl. No.: 09/671,028

(22) Filed: Sep. 27, 2000

(30) Foreign Application Priority Data

Oct. 29, 1999 (JP) .......................................... 11-309930

(51) Int. Cl.[7] ................................................ G02F 1/00
(52) U.S. Cl. .................................. 398/1; 398/9; 398/17; 398/51; 398/79
(58) Field of Search ........................... 398/1, 17, 128, 398/79, 9, 51, 166, 45

(56) References Cited

U.S. PATENT DOCUMENTS

| 6,044,076 A | * | 3/2000 | Yamamoto | 370/392 |
| 6,046,833 A | * | 4/2000 | Sharma et al. | 398/48 |
| 6,061,482 A | * | 5/2000 | Davis | 385/17 |
| 6,069,720 A | * | 5/2000 | Cotter et al. | 398/1 |

* cited by examiner

Primary Examiner—Hung N. Ngo
(74) Attorney, Agent, or Firm—Katten Muchin Zavis Rosenman

(57) ABSTRACT

The present invention relates to a technology of an IP node for transferring IP packets accommodated in a wavelength division multiplexing optical signal. The optical IP node of the present invention includes a space switch unit supplied with a wavelength division multiplexing optical signal and a packet with another node destination and generating an optical signal with the self node destination and multiplexing the optical signal with another node destination and an optical signal caused by the packet together and generating the multiplexed signal, link failure detecting unit connected to an input side and an output side of the space switch unit, detecting link failure and generating a detection signal, an OAM packet transmitting unit for generating a monitoring packet at a predetermined time interval, and a traffic restoration control unit connected to the link failure detecting unit, selecting each optical signal depending on the wavelength in response to reception of the detection signal, switching the optical path and generating the optical signal. Each of the optical IP nodes carries out optical path switching on the wavelength division multiplexing optical signal and assignment of an IP packet to be transmitted to an optical signal and switching of the assignment. Thus, the number of optical wavelengths utilized for transmission can be reduced and the size of the optical IP node can be made small.

29 Claims, 28 Drawing Sheets

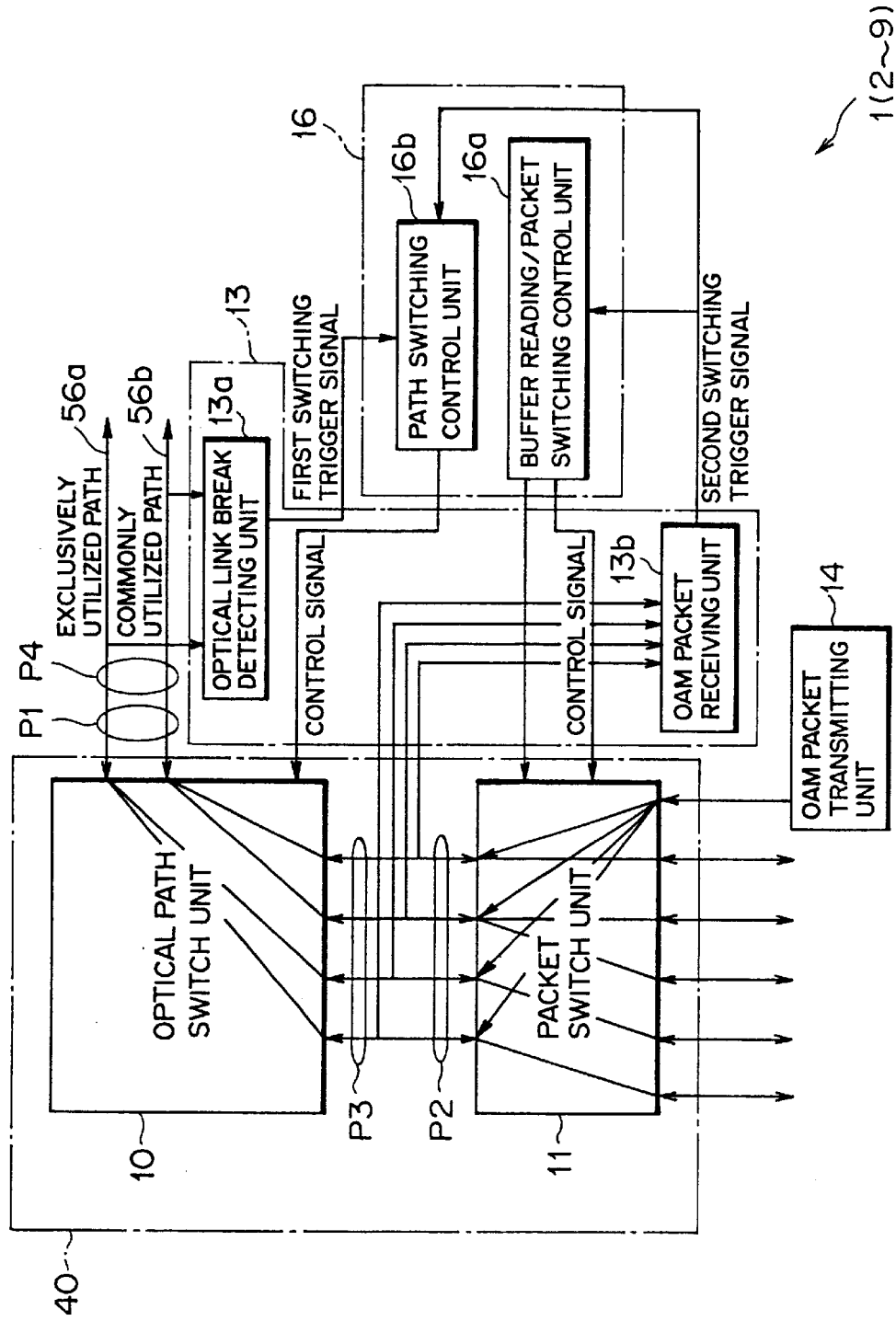

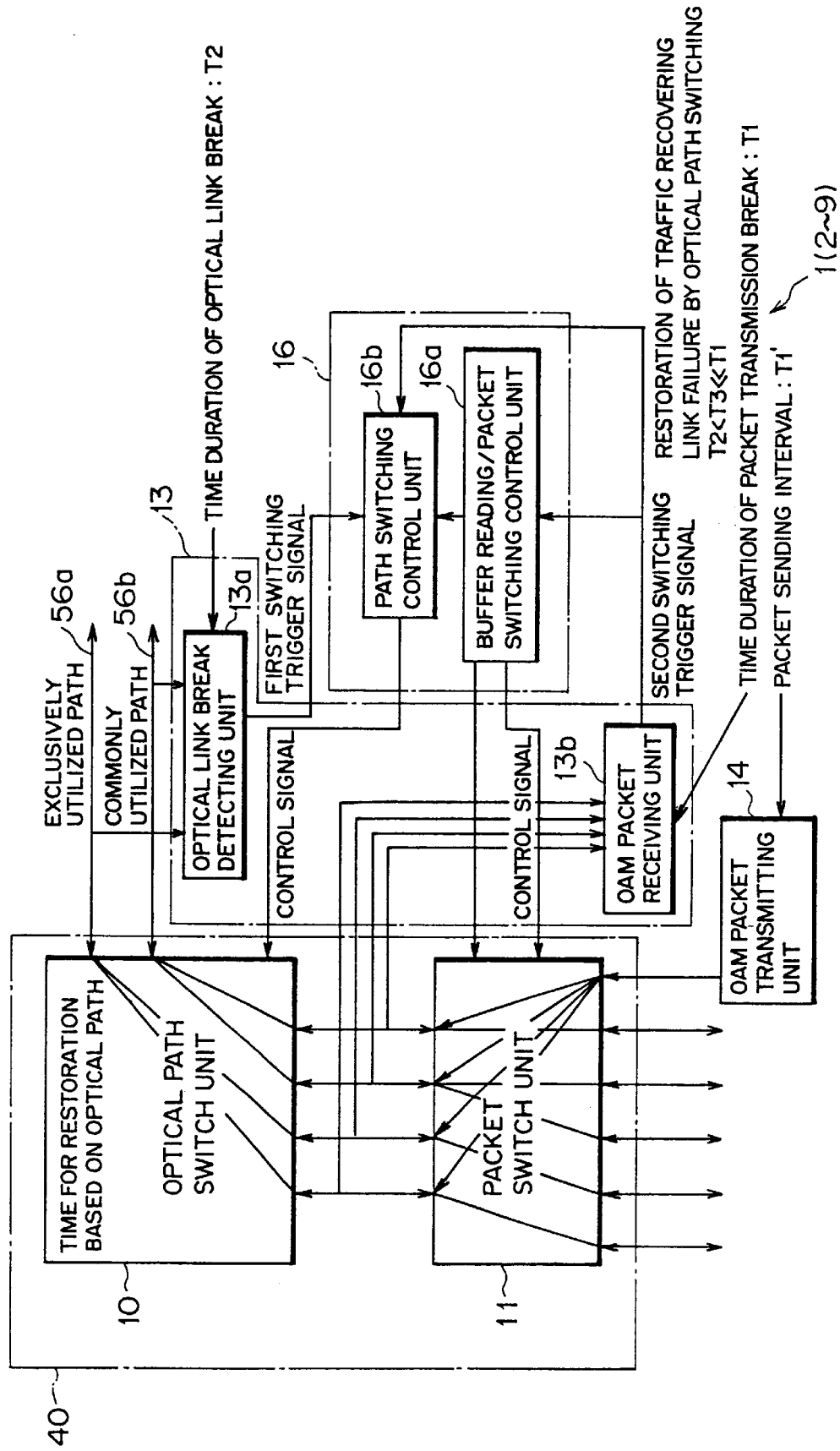

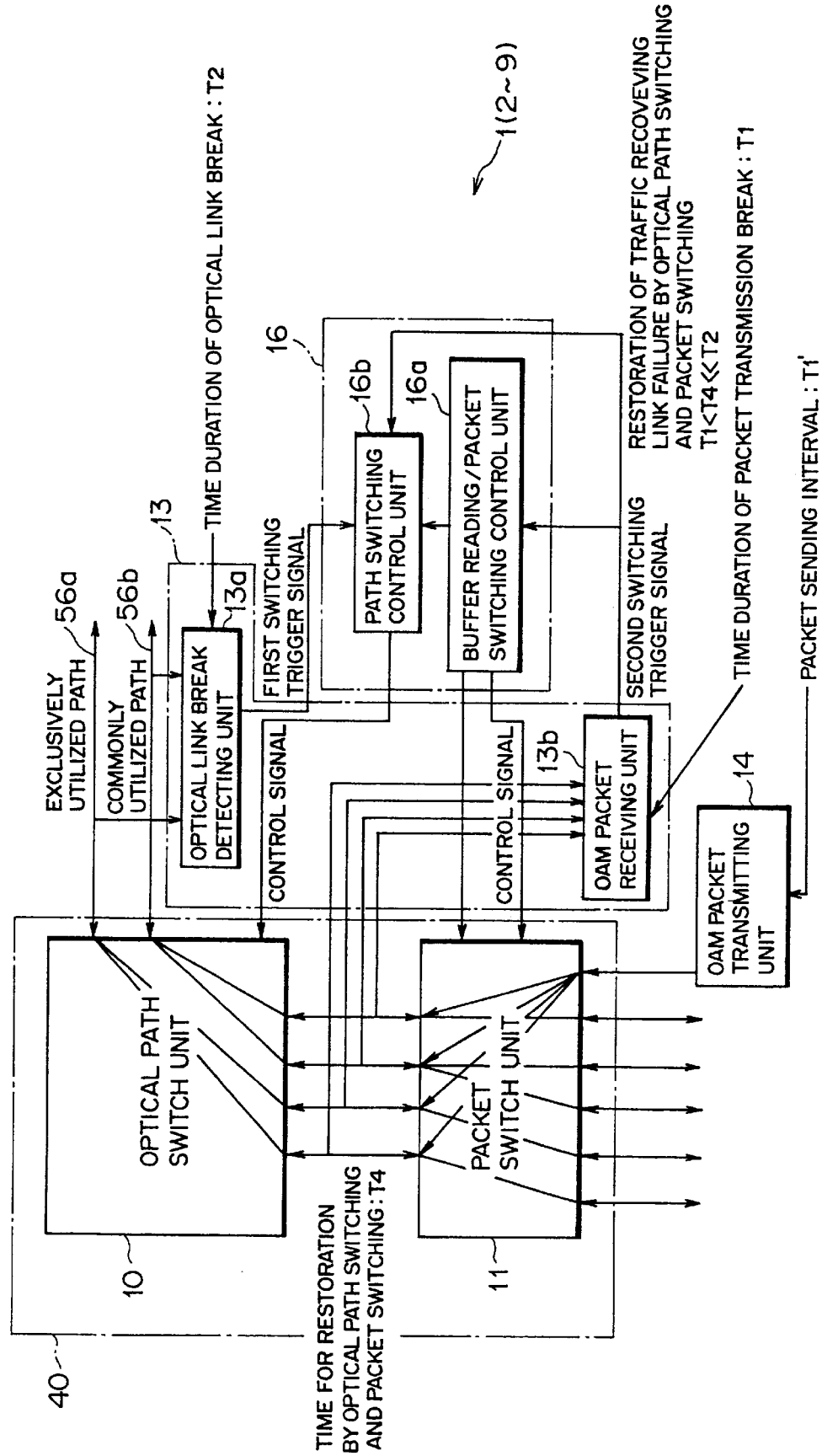

4 x 4 SWITCH

PARAMETER
- NETWORK OF GRID ARRANGEMENT COMPOSED OF 16 NODES
- PATH NUMBER:16C2 (TWO PATHS OF COMPLETE GRID ARRANGEMENT ARE PREPARED FOR EACH NODE)
- MEAN TRANSMISSION BIT RATE PER PATH: 2.5Gb/s
- TRANSMISSION BIT RATE PER WAVELENGTH:10Gb/s

REQUIRED NUMBER OF WAVELENGTHS
CONVENTIONAL ARRANGEMENT:29 WAVELENGTHS
PRESENT INVENTION :16 WAVELENGTHS

FIG. 22

| | GENERAL EQUATION | EXAMPLE |
|---|---|---|
| CONVENTIONAL ARRANGEMENT | (n×2n)2k+(k×k)2n+(A/b)3m | 42978 |
| PRESENT INVENTION (THREE-STAGE SWITCH ARRANGEMENT) | (n×2n)2k+(k×k)2n | 36834 |

PARAMETER

- NUMBER OF WAVELENGTH MULTIPLEXING : 32
- INPUT/OUTPUT TRANSMISSION PATH k : 8
- CAPACITY OF PACKET SWITCH A : 320Gb/s
- NUMBER OF PACKET SWITCH m : 2
- TRANSMISSION BIT RATE b : 10Gb/s

PHOTONIC NODE, PHOTONIC NODES FOR TRANSMISSION AND RECEPTION, AND METHOD OF RESTORING TRAFFIC UPON OCCURRENCE OF LINK FAILURE IN OPTICAL PATH NETWORK

BACKGROUND OF THE INVENTION (1) Field of the Invention

The present invention relates to a photonic node, photonic nodes for transmission and reception, and a method of restoring traffic upon occurrence of link failure in optical path network, which are suitable for use in a technology for accommodating an IP packet in a wavelength division multiplexing optical signal and subjecting to a cross-connection for carrying out routing.

(2) Description of Related Art

Recently, owing to a rapid deployment of the internet, the size of traffic running through the transmission network using an IP (Internet Protocol) is progressively increased. For this reason, a technology of IP over WDM (Wavelength Division Multiplexing) system comes using the wavelength division multiplexing scheme comes to be introduced as a technology for effectively processing the traffic which requires an exchanger having a great amount of exchanging capability.

The IP over WDM system is a system for subjecting a packet to a cross-connection operation to carry out routing. When a packet is subjected to the cross-connection operation, an information of cross-connect is utilized. When an optical signal is subjected to transmission through an optical transmitting network in which a plurality of photonic IP nodes are connected to one another, the optical signal is transmitted depending on the information of cross-connect indicating a photonic IP node as a source and a photonic IP node as a destination. Therefore, the information of cross-connect also indicates whether or not the optical signal under transmission shall be dropped at a node or transmitted through the node without being dropped. The term "photonic IP node" means an optical transmission node in the following description.

In more concretely, when an IP packet is subjected to a routing between two photonic IP nodes of the optical transmission network, initially, one of the photonic IP nodes assigns the IP packet to be routed to a particular wavelength of a wavelength division multiplexing optical signal in accordance with the IP address (destination address). Thus, the IP packet is once converted into an optical signal. Then, the wavelength division multiplexing optical signal made up with a plurality of optical signals each of which is assigned to the IP packet depending on each IP address, is transmitted through an optical transmission path and received by another photonic IP node. In this photonic IP node, only the particular IP packet is extracted from the wavelength division multiplexing optical signal. Thus, the IP packet is routed.

When the technology of IP over WDM system is introduced, even if the IP packet has a variety of addresses, or alternatively, a number of IP packets to be transmitted are created in a burst fashion, each of the photonic IP nodes can cope with the IP packets independently. Thus, the optical transmission network can deal with a great traffic which requires an exchanger to have a large exchanging capability.

Further, in order to utilize the wavelengths for optical signals more effectively, there is proposed a system in which the IP packets are accommodated into an optical signal of the same wavelength depending on the IP address or QoS (Quality of Service). According to the system, each of the photonic IP nodes carries out not only simple routing operation but operation of switching on the transmission paths of an optical signal deriving from the IP packet or operation of switching on the wavelength of the optical signal deriving from the IP packet upon carrying out routing. In this case, the terms "to accommodate IP packet" means "to convert the IP packet into an optical signal". The terms will be utilized as the same meaning in the following description. Also, the term "switching on IP packet" is sometimes referred to as "IP packet switching". In addition, in the following description, a transmission path is sometimes referred to as an optical path.

When an optical signal is received by a photonic IP node, the photonic IP node examines the destination address of the received optical signal. If the optical signal is one that is to be dropped at the photonic IP node, the photonic IP node extracts the IP packet to be dropped from the optical signal. The rest of the optical signal is returned to an optical path switching which corresponds to the layer 1 and then subjected to an IP packet switching which corresponds to the layer 2. In this manner, IP packet can undergo a routing operation with the aid of optical add/drop function.

FIG. 23 is a diagram schematically showing the optical add/drop function. A photonic IP node shown in FIG. 23 has input ports 1, 2 and output ports 3, 4. A wavelength division multiplexing optical signal composed of a plurality of optical signals having different wavelengths is supplied to the input port 1 whereas an IP packet of another node destination (destination of another photonic IP node) is supplied to the input port 2. This IP packet is subjected to a photoelectric conversion and a resultant signal is generated from the output port 3. In this case, of the plurality of optical signal which is supplied from the outside at the input port 1 and multiplexed in a wavelength division manner, an optical signal with a destination of this node is branched and dropped at the output port 4. On the other hand, of the plurality of optical signals which is multiplexed in a wavelength division manner, an optical signal with a destination of another node is passed through the output port 3 and added together with the optical signal which is supplied at the input port 2 and photoelectric converted. The optical signal resulting from the add-operation is transmitted to another node.

FIG. 24 is a physical arrangement of the photonic IP node. The photonic IP node 81 shown in FIG. 24 has input transmission paths 81a, 81b, output transmission paths 81d, 81e, an optical cross-connect apparatus 81c, an ATM exchanger 81f, routers (access router) 81g, 81h, 81i. IP packets are supplied to the node at the routers 81g, 81h, 81i, and each of the IP packets is assigned to an optical signal of a wavelength corresponding to the IP address. In this way, a plurality of optical signals are transmitted from the left side of FIG. 24 to the right side of the same. The plurality of optical signals is supplied to the node at the input transmission paths 81a, 81b. At the optical cross-connect apparatus 81c, of the plurality of optical signals which are multiplexed in a wavelength division manner, an optical signal with a destination of this node is dropped as a signal with a destination of this node. Rest of the optical signals are regarded as those with another node destination, and hence multiplexed together with the added IP packet and transmitted to other node from a desired one of the output transmission paths 81d, 81e which is selected in accordance with the wavelength.

The ATM exchanger 81f is a unit for classifying the IP packets supplied from a plurality of photonic IP nodes and bundle the same depending on the IP address. Thus, the ATM exchanger 81*f* can be regarded as an electric switch for switching IP packets as an electric signal. The ATM exchanger 81*f* is provided, at the side of the optical cross-connect apparatus 81*c*, with switching elements for superimposing the assigned IP packet on an optical signal of a predetermined wavelength depending on the IP address and generate the same therefrom. When the ATM exchanger 81*f* functions with the switching element, the unit can serve as a packet switch unit.

The optical cross-connect apparatus 81*c* transfers IP packets contained in the optical signal with a destination of the own node to the ATM exchanger 81*f*. The optical cross-connect apparatus 81*c* also generates an optical signal supplied from the ATM exchanger 81*f* to another photonic node. Further, the optical cross-connect apparatus 81*c* transfers an optical signal of which address is not own node, to the adjacent node. Thus, the optical cross-connect apparatus 81*c* serves as an optical path switch unit. Also, the optical cross-connect apparatus 81*c* is arranged to include a plurality of space switches.

The space switch is arranged to have a plurality of input ports and a plurality of output ports. An optical signal supplied to the space switch at the input port thereof is generated from a desired output port in accordance with an electric control signal. For example, the space switch may be arranged to have 16 input ports and 32 output ports, and 16 optical signals supplied to the input ports are generated from any of the 32 output ports.

FIG. 25 is a diagram showing an arrangement in terms of the logic of a photonic IP node, and hence the diagram shows the construction shown in FIG. 24 in more detail. As shown in FIG. 25, an optical path switch unit 82*c* provided in a photonic IP node 82 shown in FIG. 25 is supplied with an optical signal multiplexed in a wavelength division manner from a plurality of neighboring photonic IP nodes (not shown) through input transmission paths 83*a* and 83*b*. Each of the optical signals are branched by branching units 82*a* and 82*b*, and an optical signal having a wavelength of $\lambda1$, an optical signal having a wavelength of $\lambda2$, . . . , and an optical signal having a wavelength of $\lambda n$ are supplied to an optical path switch unit 82*c*.

On the other hand, IP packets are supplied from routers 82*g*, 82*h*, . . . , 82*i*, 82*j* to a packet switch unit 82*f*. A plurality of buffers 84*a* provided within the packet switch unit 82*f* are utilized for holding the IP packet temporarily. Further, of the IP packets supplied in order, the first supplied IP packet is outputted first. The IP packets accumulated in the buffers 84*a* are sequentially outputted and supplied to the packet switch 84*b*. A plurality of wavelength division multiplexing optical signals having wavelengths of $\lambda1$ to $\lambda n$ are prepared on the output side of the packet switch 84*b*. The number of the optical signals corresponds to the number of output transmission paths 82*d*, 82*e*, . . . , on the output side of the optical path switch unit 82*c*.

For example, an IP packet from the router 82*h* is supplied through the buffer 84*a* to the packet switch 84*b* in which it is assigned with an optical path with the wavelength of $\lambda1$. Further, an IP packet from the router 82*j* is supplied through the buffer 84*a* to the packet switch 84*b* in which it is also assigned with the wavelength of $\lambda1$. Thus, the IP packets supplied from the two routers 82*h* and 82*j* are accommodated in the optical signal of the wavelength of $\lambda1$.

In the optical path switch 82*c*, the optical signals supplied from the input transmission paths 82*a* and 82*b* are subjected to a cross-connect operation together with the optical signals supplied from the packet switch unit 82*f*. Then, multiplexing units 82*d* and 82*e* multiplex the resultant optical signals together with optical signals sent from another path. The multiplexed signals are outputted from the output transmission paths 83*c* and 83*d*.

Of the optical signals supplied to the optical path switch unit 82*c*, an optical signal with the own node destination is dropped from the output port 84*c* and converted into an IP packet as an electric signal in the photoelectric converters (O/E converter) 82*k* and 82*l*. This IP packet is fed to the packet switch unit 82*f*. In this case, the reason why the IP packet with the own node destination is again fed to the packet switch unit 82*f* is that the signal can be relayed by another photonic IP node or the IP packet is assigned to an optical path of a different wavelength is assigned.

For this reason, the packet switch unit 82*f* assigns predetermined wavelengths to IP packets supplied from the routers 82*g*, . . . , 82*j* provided in the own node and an IP packet with another node destination among the IP packets dropped from the output ports. Further, the optical path switch provided within the optical path switch unit 82*c* carries out path switching, whereby IP packets are accommodated in an optical path of the predetermined wavelength and outputted from the output transmission paths 83*c* and 83*d*.

FIG. 26 is a diagram showing an arrangement of the packet switch unit. The packet switch unit 85 shown in FIG. 26 is a unit for processing a great number of IP packets and assigns the IP packets to an optical signal. The packet switch unit 85 is composed of three stages of switch units 85*a*, 85*b* and 85*c*. The packets undergoing the switch units are switched depending on their IP address and branched in accordance with the transmission wavelength to be outputted. For example, in the switch unit 85*a*, IP packets of n systems (n is an integer) supplied from the left side of FIG. 26 are accumulated within buffers $B_{11}$ to $B_{1n}$. The IP packets generated from the buffers $B_{11}$ to $B_{1n}$ are supplied to m (m is an integer) packet switches $SW_1$ to $SW_m$. The IP packets supplied to the packet switches $SW_1$ to $SW_m$ are branched and generated therefrom. Further, a switching operation of the similar manner is also carried out in the switch units 85*b* and 85*c*, whereby the IP packets are branched from the switch unit 85*c* in accordance with the wavelength for transmission and outputted from the same.

Since the processed IP packets are transmitted to another photonic IP nodes by an optical signal of a predetermined wavelength, the wavelength of the optical signal functions as an indication indicative of a routing of the IP packet. Therefore, when a photonic IP node effects a routing operation on the IP packets, the photonic IP nodes utilizes the optical path instead of a path as an electric signal for the routing of the IP packets.

Accordingly, in an optical transmission network using an IP over WDM system, photonic IP nodes settle optical paths alternately. The optical transmission network will be referred to as an optical path network in the following description.

Now, description will be made with reference to FIGS. 27 and 28 on how traffic is established by a routing operation when normal status is maintained and the same is restored by a routing operation when link failure is brought about.

FIG. 27 is a diagram for explaining how an IP packet is transferred when the optical path network is maintained in the normal status. A wavelength network 90 shown in FIG. 27 includes photonic IP nodes 1 to 8 connected to one another by optical fibers. Thus, an optical signal in which a number of packets are multiplexed in a wavelength division manner can be transmitted in a bidirectional manner. In the optical path network 90, a control channel is utilized for transmitting optical path information concerning the source and destination of each of the wavelength division multiplexing optical signal, whereby each of the photonic IP nodes 1 to 8 can be supplied with the optical path information.

When the IP packets are branched by using wavelengths λ1 and λ2, the network show in FIG. 27 is managed at an availability of 0.5. The availability is an indication indicating a ratio of IP packet number accommodated by using these wavelengths to a maximum possible number of IP packets by using the wavelength at a certain time. For example, if the availability is set to 0.5, which fact means that if the maximum transmission bit rate allowable for the network is 10 Gbps which the actual transmission bit rate set to the network is 5 Gbps. Further, if the availability per photonic IP node is high/low, which means that the availability as viewed from tributary ports branched from the node is high/low.

Further, one of the photonic IP nodes, e.g., a photonic IP node 7 is formed of a router (denoted as IP) 7a, a packet switch unit (denoted as packet switch) 7b, an optical path switch unit (denoted as optical path switch) 7c. These components function similarly to those described above. The photonic IP nodes 1 to 6 and 8 other than the photonic IP node are similarly arranged.

With the above arrangement, routing for the IP packets carried out upon normal status becomes as follows. For example, a traffic for IP packet A, which is to be transferred from the photonic IP node 5 to the photonic IP node 1, is established whereas a traffic for IP packet B, which is to be transferred from the photonic IP node 2 to the photonic IP node 8, is established as follows.

Initially, IP packet A held in a router 5a of the photonic IP node 5 is assigned with an optical signal of a wavelength of λ1 and transmitted as a wavelength division multiplexing optical signal through a path (path attached with reference L1). The wavelength division multiplexing optical signal containing the data of IP packet A is received by the photonic IP node 4, in which routing is carried out in terms of wavelength by an optical path switch unit of the photonic IP node 4. Then, the traffic for IP packet A passes through the adjacent photonic IP node 3. Likewise, the wavelength division multiplexing optical signal containing IP packet A goes through the photonic IP node 3 and the photonic IP node 2 by way of an optical fiber, and then received by the photonic IP node 1. In the photonic IP node 1, data of IP packet A with the own node destination is extracted from the wavelength division multiplexing optical signal.

Similarly, IP packet B held in a router of the photonic IP node 2 is assigned with an optical signal of a wavelength of λ2 and transmitted as a wavelength division multiplexing optical signal through a path (path attached with reference L2). The wavelength division multiplexing optical signal containing data of IP packet B goes through the photonic IP node 1 and received by the photonic IP node 8. In the photonic IP node 8, data of IP packet B with the own node destination is extracted from the wavelength division multiplexing optical signal.

Conversely, if link failure is brought about in the optical path network 90, the traffic is restored as described below with reference to FIG. 28. That is, FIG. 28 is a diagram for explaining how traffics for transferring the IP packets are restored if link failure is brought about in the wavelength path network. If link failure is brought about in fibers between the photonic IP node 1 and the photonic IP node 2 as shown in FIG. 28, an optical path is settled as illustrated in the figure. In this arrangement shown in FIG. 28, each of the photonic IP nodes 1 to 8 are similarly arranged as those shown in FIG. 27. Further, the optical path network 90 is arranged so as to detect the location where the link failure is brought about, and each of the photonic IP nodes 1 to 8 can be informed of the location where the link failure is brought about through a control channel.

With the above arrangement, when the photonic IP node 5 is informed of that link failure is brought about, the photonic IP node 5 superimposes the data of IP packet A on a wavelength division multiplexing optical signal that is to be transmitted to the side of the photonic IP node 6, instead of a wavelength division multiplexing optical signal that is to be transmitted to the side of the photonic IP node 4. Thus, the wavelength division multiplexing optical signal containing the data of IP packet A is transmitted through the photonic IP nodes 6, 7, and 8 to the photonic IP node 1 in which the signal is received (a path attached with reference L3). Likewise, when the photonic IP node 2 outputs a wavelength division multiplexing optical signal containing the data of IP packet B, the photonic IP node 2 outputs the signal to the side of the photonic IP node 3, instead of the side of the photonic IP node 1. Thus, the wavelength division multiplexing optical signal containing the data of IP packet B is transmitted through the photonic IP nodes 4, 5, 6 and 7 to the photonic IP node 8 in which the signal is received (a path attached with reference L4).

In this way, even if link failure is brought about in the network, each of the photonic IP nodes 1 to 8 properly changes the direction in which the traffic for transmitting the wavelength division multiplexing optical signal extends. Thus, the IP packet can reach its destination.

However, as described with reference to FIGS. 24 to 26, when the photonic IP nodes 1 to 8 are provided in the network, each of the nodes shall be arranged to have a great number of electric switches or switch elements and a large-sized optical cross-connecting apparatus. Moreover, the packet switch unit 85 shown in FIG. 26 is arranged as a multi-stage switch circuit network formed of switch units 85a, 85b, and 85c, and each of the units includes a great number of buffers and packet switches. Therefore, if it is intended to make the packet switch unit 85 have a large capacity, the size of the hardware necessarily become large due to the buffers, with the result that complicated control mechanism is required for the apparatus.

In addition, a wavelength to be assigned to an IP packet is fixedly determined for each photonic IP node regardless of the expected availability of the node. Further, restoration of traffic against link failure is effected in the optical path switch unit. Therefore, when a new traffic is established for recovering the link failure, the changing in the branching arrangement for IP packet transmission exclusively effected in terms of optical path is left unchanged regardless of the actual availability of the node. Accordingly, a number of wavelengths that is obliged to prepare for the optical path network 90 becomes increased, with the result that the size of the hardware apparatus becomes large.

Moreover, when link failure is brought about in the network, if all of the optical paths for optical signals are changed, the optical path network 90 will suffer from a limited allowance in selecting a wavelength necessary for wavelength assignment, which fact makes the management of the system more restrictive.

SUMMARY OF THE INVENTION

The present invention is made in view of the above aspect An object of the present invention is to provide an photonic node, photonic nodes for transmission and reception, and a method for restoring a traffic upon occurrence of link failure in a wavelength network applicable to a photonic transmission network having a large IP packet capacity in which when each of the photonic IP nodes is operated at a low availability of an optical signal, an optical transmission signal having an IP packet superimposed thereon is subjected to optical path switching, and a transmission IP packet is subjected to assignment switching to an optical signal, whereby it becomes possible to reduce a number of wavelengths utilized for transmission and it becomes possible to make the size of the photonic IP node small.

According to the present invention, there is provided a photonic node including a packet switching unit for transferring a packet with a first destination address to another photonic node in accordance with the first destination address, and an optical path switching unit connected to the packet switching unit and for transferring a packet with a second destination address by establishing traffic of an optical path for a wavelength division multiplexing optical signal composed of optical signals of a plurality of wavelengths.

The photonic node according to the present invention further includes a space switch unit having a couple of input ports and a couple of output ports, a wavelength division multiplexing optical signal composed of optical signals of a plurality of wavelengths and an add-packet with another node address being supplied thereto through the couple of input ports, respectively, an optical signal with the own node address being extracted from the wavelength division multiplexing optical signal and generated through a first output port as an optical signal to be dropped, and an optical signal with another node address contained in the wavelength division multiplexing optical signal and an optical signal caused by an add-packet with another node address being multiplexed together and generated through a second output port, and buffers for holding a plurality of add-packets generated as an electric signal and supplies the add-packets to the space switch unit.

The arrangement of the photonic node according to the present invention is characterized in that the optical path switching unit is composed of a part of the space switch unit for branching each optical signal of the wavelength division multiplexing optical signal depending on its wavelength, an optical signal with the own node address being extracted from the wavelength division multiplexing optical signal and generated through the first output port as an optical signal to be dropped, and an optical signal with another node address contained in the wavelength division multiplexing optical signal and an optical signal caused by an add-packet with another node address being multiplexed together and generated through the second output port. Further, the arrangement of the photonic node according to the present invention is characterized in that the packet switching unit is composed of a remaining part of the space switch unit for branching each optical signal of the wavelength division multiplexing optical signal depending on its wavelength and the buffers, a packet caused by an optical signal to be dropped which is generated from the optical path switching unit and a plurality of add-packets supplied through the buffer being supplied to the packet switching unit, and a packet caused by an optical signal to be dropped which is generated from the optical path switching unit through the first output port and a plurality of the add-packets being supplied to the optical path switching unit as an optical signal assigned with a predetermined wavelength depending on the destination address.

According to the above arrangement, the packet switching unit can be free from multistage arrangement, with the result that the photonic node can be made small, and the photonic transmission network can be constructed with a low cost. Moreover, the packet switching unit can be made to have a lager processing capacity simply by increasing the number of buffers to be provided. Thus, the photonic node can be managed in response to the fluctuation in the size of traffic.

According to the present invention, there is provided a photonic node including a space switch unit supplied with a wavelength division multiplexing optical signal composed of optical signals assigned with a plurality of wavelengths depending on each destination address and an add-packet with another node address, and generating an optical signal with the own node address extracted from the wavelength division multiplexing optical signal and multiplexing an optical signal with another node address contained in the wavelength division multiplexing optical signal and an optical signal caused by an add-packet with another node address and generating the multiplexed signal therefrom, buffers for holding a plurality of add-packets generated as an electric signal and supplying the add-packets to the space switch unit, link failure detecting unit connected to an input side and output side of the space switch unit and capable of detecting link failure occurrence and generating a detection signal based on the wavelength division multiplexing optical signal, and a traffic restoration control unit connected to the link failure detecting unit and arranged to select an optical signal contained in the wavelength division multiplexing optical signal depending on the wavelength, carry out switching among optical paths, and generate the optical signal in accordance with the reception of the detection signal from the link failure detecting unit, wherein a plurality of space switches provided in the space switch unit are arranged as an optical path switching unit such that an optical signal with the own node address is extracted from the wavelength division multiplexing optical signal and generated through the first output port as an optical signal to be dropped, and an optical signal having another node address contained in the wavelength division multiplexing optical signal and an optical signal caused by an add-packet having another node address are multiplexed together and generated through the second output port, and the plurality of space switches provided in the space switch unit and the buffers are arranged as a packet switching unit such that a packet caused by an optical signal to be dropped which is generated from the optical path switching unit through the first output port and a plurality of add-packets supplied through the buffer are supplied to the packet switching unit, and that a packet caused by an optical signal to be dropped which is generated from the optical path switching unit through the first output port and a plurality of the add-packets are supplied to the optical path switching unit as an optical signal assigned with a predetermined wavelength depending on the destination address.

According to the present invention, there is provided a photonic node provided with a space switch unit having a first input port at which a wavelength division multiplexing optical signal composed of optical signals of a plurality of wavelengths is received, a second input port at which an add-packet with another node address is received, a first output port from which an optical signal extracted from the wavelength division multiplexing optical signal is generated as an optical signal to be dropped, and a second output port from which an optical signal with another node address contained in the wavelength division multiplexing optical signal and an optical signal caused by the add-packet with the another node address multiplexed with that optical signal are generated. The photonic node of the present invention includes a packet switching unit supplied with a packet caused by an optical signal to be dropped which is generated from the first output port and the add-packet from the second input port, and generating a packet caused by an optical signal to be dropped and a plurality of the add-packets as an optical signal assigned with a predetermined wavelength depending on the destination address, an optical path switching unit for branching an optical signal with the own node address extracted from the wavelength division multiplexing optical signal which is supplied from the first input port and generating through the first output port as an optical signal to be dropped, and multiplexing an optical signal with another node address and an optical signal from the packet switching unit together and generating the multiplexed signal from the second output port, link failure detecting unit connected to an input side and output side of the space switch unit and capable of detecting link failure occurrence and generating a detection signal based on the wavelength division multiplexing optical signal, and a traffic restoration control unit connected to the link failure detecting unit and arranged to select an optical signal contained in the wavelength division multiplexing optical signal depending on the wavelength, carry out switching among optical paths, and generate the optical signal in accordance with the reception of the detection signal from the link failure detecting unit.

According to the present invention, the link failure detecting unit may be arranged to include an optical link break detecting unit connected to the input side of the space switch unit and arranged to generate a first switching trigger signal if the node fails to receive the wavelength division multiplexing optical signal, and a monitoring packet receiving unit connected to the output side of the space switch unit and arranged to generate a second trigger signal if the monitoring packet receiving unit fails to receive a monitoring packet which is sent at a predetermined time interval from another node as an electric signal.

Further, according to the present invention, the traffic restoration control unit may be arranged to include a path switching control unit connected to the optical link break detecting unit and the monitoring packet receiving unit, and arranged to detect link failure if a predetermined time duration has elapsed till the first trigger signal is last received from the optical link break detecting unit or the second trigger signal is last received from the monitoring packet receiving unit, and select an optical signal of the space switch unit for controlling switching of the destination of the optical signal, and a buffer reading/packet switching control unit connected to the monitoring packet receiving unit and arranged to detect link failure if a predetermined time duration has elapsed till the second switching trigger signal is last received from the monitoring packet receiving unit, change a reading order of the plurality of add-packets held in the buffers, and select an optical signal of the space switch unit for controlling switching of the destination of the optical signal.

According to the above arrangement, an operation for establishing traffic for recovering the link failure can be carried out not only by the optical path switching unit but also the packet switching unit. Therefore, the number of wavelengths to be prepared in the optical transmission network can be decreased, the availability of the optical path network is improved, and the network can be managed in a more efficient manner.

According to the present invention, the space switch unit may be arranged to include a first packet switch composed of m (m is an integer) packet switches each having an input port at which the add-packet and the packet caused by an optical signal to be dropped are supplied and an output port from which an optical signal assigned with a predetermined wavelength depending on the destination address is generated, a first space switch composed of k−m (k is an integer) switches each of which is arranged as an n×2n (n is an integer) matrix switch having n input ports at which an optical signal having one of plurality of differing wavelengths contained in the wavelength division multiplexing optical signal is supplied, and 2n output ports from which an optical signal having the same wavelength as one of plurality of differing wavelengths, a second space switch composed of 2n switches each of which is arranged as a k×k matrix switch having k input ports at which an optical signal from the first packet switch and an optical signal from the first space switch are supplied, and k output ports from which an optical signal supplied from the k input ports is output to a path selected in a predetermined manner, a third space switch composed of k−m switches each of which is arranged as a 2n×n matrix switch having 2n input ports at which an optical signal from the second space switch is supplied, and n output ports from which an optical signal supplied from the 2n input ports is output in accordance with a selection depending on the wavelength, and a fourth space switch composed of m switches each of which is arranged as a 2n×n matrix switch having 2n input ports at which an optical signal from the second space switch is supplied, and n output ports from which an optical signal supplied from the 2n input ports is output in accordance with a selection depending on the wavelength.

Alternatively, the space switch unit may be arranged to include a second packet switch composed of m (m is an integer) packet switches each having k input ports at which the add-packet and the packet caused by an optical signal to be dropped are supplied and 2k output ports from which an optical signal assigned with a predetermined wavelength depending on the destination address is generated, a fifth space switch composed of n−m (n is an integer) switches each of which is arranged as a k×2k matrix switch having k input ports at which the wavelength division multiplexing optical signal is supplied, and 2k output ports from which an optical signal having the same wavelength is branched and generated, an optical branching unit composed of 2k optical couplers for coupling to each other m optical signals generated from the packet switches of the second packet switch, respectively, and n−m optical signals generated from k×2k matrix switch of the fifth space switch, respectively, and branching and generating an optical signal resulting from the wavelength division multiplexing caused by the photocoupling into n signals, a sixth space switch composed of n−m switches each of which is arranged as 2k×k matrix switch having 2k input ports at which the wavelength division multiplexing optical signal caused by the photocoupling generated from the optical branching unit and k output ports from which the wavelength division multiplexing optical signal caused by the photocoupling is generated under condition of wavelength division multiplexing, a seventh space switch composed of m switches each of which is arranged as 2k×k matrix switch having 2k input ports at which the wavelength division multiplexing optical signal caused by the photocoupling generated from the optical branching unit and k output ports from which the wavelength division multiplexing optical signal caused by the photocoupling is generated under condition of wavelength division multiplexing, and a wavelength selecting unit composed of n×k optical filters, supplied with optical signals from the sixth space switch and the seventh space switch, selecting an optical signal with a particular wavelength from the optical signals, and generating the selected signal.

According to the above arrangement, packets can be changed over in the space switch which can be free from the multistage construction. Therefore, the size of the switch unit can be made small and the photonic node can also be made small.

According to the present invention, there is provided a photonic node for signal transmission including a packet switching unit for transferring a packet with a first destination address to another photonic node in accordance with the first destination address, and an optical path switching unit connected to the packet switching unit and for transferring a packet with a second destination address by establishing connection to an optical path of a wavelength division multiplexing optical signal composed of optical signals of a plurality of wavelengths. The photonic node for signal transmission includes a space switch unit having a couple of input ports and a couple of output ports, a wavelength division multiplexing optical signal composed of optical signals of a plurality of wavelengths and an add-packet with another node address being supplied thereto through the couple of input ports, respectively, an optical signal with the own node address being extracted from the wavelength division multiplexing optical signal and generated through a first output port as an optical signal to be dropped, and an optical signal with another node address contained in the wavelength division multiplexing optical signal and an optical signal caused by an add-packet with another node address being multiplexed together and generated through a second output port, buffers for holding a plurality of add-packets generated as an electric signal and supplies the add-packets to the space switch unit, and a monitoring packet transmitting unit for generating a packet as an electric signal at a predetermined time interval. The arrangement of the photonic node for signal transmission is characterized in that the optical path switching unit is composed of a part of the space switch unit for branching each optical signal of the wavelength division multiplexing optical signal depending on its wavelength, an optical signal with the own node address being extracted from the wavelength division multiplexing optical signal and generated through the first output port as an optical signal to be dropped, and an optical signal with another node address contained in the wavelength division multiplexing optical signal and an optical signal caused by an add-packet with another node address being multiplexed together and generated through the second output port. The arrangement of the photonic node for signal transmission is also characterized in that the packet switching unit is composed of a remaining part of the space switch unit for branching each optical signal of the wavelength division multiplexing optical signal depending on its wavelength and the buffers, a packet caused by an optical signal to be dropped which is generated from the optical path switching unit and a plurality of add-packets supplied through the buffer being supplied to the packet switching unit, and a packet caused by an optical signal to be dropped which is generated from the optical path switching unit through the first output port and a plurality of the add-packets being supplied to the optical path switching unit as an optical signal assigned with a predetermined wavelength depending on the destination address.

According to the above arrangement, a photonic node for detecting link failure can be made small.

According to the present invention, there is provided a photonic node for signal reception including a packet switching unit for transferring a packet with a first destination address to another photonic node in accordance with the first destination address, and an optical path switching unit connected to the packet switching unit and for transferring a packet with a second destination address by establishing connection to an optical path of a wavelength division multiplexing optical signal composed of optical signals of a plurality of wavelengths. The photonic node for signal reception according to the present invention a space switch unit having a couple of input ports and a couple of output ports, a wavelength division multiplexing optical signal composed of optical signals of a plurality of wavelengths and an add-packet with another node address being supplied thereto through the couple of input ports, respectively, an optical signal with the own node address being extracted from the wavelength division multiplexing optical signal and generated through a first output port as an optical signal to be dropped, and an optical signal with another node address contained in the wavelength division multiplexing optical signal and an optical signal caused by an add-packet with another node address being multiplexed together and generated through a second output port, buffers for holding a plurality of add-packets generated as an electric signal and supplies the add-packets to the space switch unit, a monitoring packet receiving unit connected to the output side of the space switch unit and arranged to generate a second trigger signal if the monitoring packet receiving unit fails to receive a monitoring packet which is sent at a predetermined time interval from another node as an electric signal, a buffer reading/packet switching control unit connected to the monitoring packet receiving unit and arranged to detect link failure if a predetermined time duration has elapsed till the second switching trigger signal is last received from the monitoring packet receiving unit, change a reading order of the plurality of add-packets held in the buffers, and select an optical signal of the space switch unit for controlling switching of the destination of the optical signal, and a path switching control unit connected to the monitoring packet receiving unit, and arranged to detect link failure if a predetermined time duration has elapsed till the second trigger signal is last received from the monitoring packet receiving unit, and select an optical signal of the space switch unit for controlling switching of the destination of the optical signal. The photonic node for signal reception according to the present invention is characterized in that the optical path switching unit is composed of a part of the space switch unit for branching each optical signal of the wavelength division multiplexing optical signal depending on its wavelength, an optical signal with the own node address being extracted from the wavelength division multiplexing optical signal and generated through the first output port as an optical signal to be dropped, and an optical signal with another node address contained in the wavelength division multiplexing optical signal and an optical signal caused by an add-packet with another node address being multiplexed together and generated through the second output port, and the packet switching unit is composed of a remaining part of the space switch unit for branching each optical signal of the wavelength division multiplexing optical signal depending on its wavelength and the buffers, a packet caused by an optical signal to be dropped which is generated from the optical path switching unit and a plurality of add-packets supplied through the buffer being supplied to the packet switching unit, and a packet caused by an optical signal to be dropped which is generated from the optical path switching unit through the first output port and a plurality of the add-packets being supplied to the optical path switching unit as an optical signal assigned with a predetermined wavelength depending on the destination address.

According to the present invention, there is provided a photonic node for signal reception including a packet switching unit for transferring a packet with a first destination address to another photonic node in accordance with the first destination address, and an optical path switching unit connected to the packet switching unit and for transferring a packet with a second destination address by establishing connection to an optical path of a wavelength division multiplexing optical signal composed of optical signals of a plurality of wavelengths. The photonic node for signal reception includes a space switch unit having a couple of input ports and a couple of output ports, a wavelength division multiplexing optical signal composed of optical signals of a plurality of wavelengths and an add-packet with another node address being supplied thereto through the couple of input ports, respectively, an optical signal with the own node address being extracted from the wavelength division multiplexing optical signal and generated through a first output port as an optical signal to be dropped, and an optical signal with another node address contained in the wavelength division multiplexing optical signal and an optical signal caused by an add-packet with another node address being multiplexed together and generated through a second output port, buffers for holding a plurality of add-packets generated as an electric signal and supplies the add-packets to the space switch unit, an optical link break detecting unit connected to the input side of the space switch unit and arranged to generate a first switching trigger signal if the node fails to receive the wavelength division multiplexing optical signal, a monitoring packet receiving unit connected to the output side of the space switch unit and arranged to generate a second trigger signal if the monitoring packet receiving unit fails to receive a monitoring packet which is sent at a predetermined time interval from another node as an electric signal, a path switching control unit connected to the optical link break detecting unit and the monitoring packet receiving unit, and arranged to detect link failure if a predetermined time duration has elapsed till the first trigger signal is last received from the optical link break detecting unit or the second trigger signal is last received from the monitoring packet receiving unit, and select an optical signal of the space switch unit for controlling switching of the destination of the optical signal, and a buffer reading/packet switching control unit connected to the monitoring packet receiving unit and arranged to detect link failure if a predetermined time duration has elapsed till the second switching trigger signal is last received from the monitoring packet receiving unit, change a reading order of the plurality of add-packets held in the buffers, and select an optical signal of the space switch unit for controlling switching of the destination of the optical signal. The photonic node for signal reception according to the present invention is characterized in that the optical path switching unit is composed of a part of the space switch unit for branching each optical signal of the wavelength division multiplexing optical signal depending on its wavelength, an optical signal with the own node address being extracted from the wavelength division multiplexing optical signal and generated through the first output port as an optical signal to be dropped, and an optical signal with another node address contained in the wavelength division multiplexing optical signal and an optical signal caused by an add-packet with another node address being multiplexed together and generated through the second output port, and the packet switching unit is composed of a remaining part of the space switch unit for branching each optical signal of the wavelength division multiplexing optical signal depending on its wavelength and the buffers, a packet caused by an optical signal to be dropped which is generated from the optical path switching unit and a plurality of add-packets supplied through the buffer being supplied to the packet switching unit, and a packet caused by an optical signal to be dropped which is generated from the optical path switching unit through the first output port and a plurality of the add-packets being supplied to the optical path switching unit as an optical signal assigned with a predetermined wavelength depending on the destination address.

According to one variation of the present invention, the buffer reading/packet switching control unit may be arranged to respond to the time duration even if the time duration is variable, and the path switching control unit is also arranged to be capable of responding to the time duration even if the time duration is variable.

According to the above arrangement, the photonic node for detecting link failure can also be made small.

According to the present invention, there is provided a photonic node including an optical path switching unit supplied with optical signals having a plurality of wavelengths different from one another at a plurality of input ports, subjecting the optical signals having a plurality of wavelengths different from one another to a switching operation effected by an opto-space switch of a multi-stage arrangement, and a buffer connected to a predetermined number of ports of the plurality of input ports provided in the optical path switching unit, holding a packet with a destination address and supplying the packet to the optical path switching unit at the predetermined number of ports, wherein a part of the opto-space switch of the optical path switching unit is replaced with a packet switching unit for converting the packet supplied to the buffer into an optical signal assigned with a predetermined wavelength depending on the destination address and generating the optical signal.

Accordingly, if the photonic node is arranged as above, it becomes possible to manage the photonic node in response to the fluctuation of the size of traffic fed to the photonic node, with the result that extendability of the system can be improved in response to the increase of number of necessary wavelengths.

According to the present invention, there is proposed a method of restoring traffic upon occurrence of link failure in an optical path network which is composed of a plurality of photonic nodes connected to one another, a photonic node including a packet switching unit for transferring a packet with a first destination address to another photonic node in accordance with the first destination address, and an optical path switching unit connected to the packet switching unit and for transferring a packet with a second destination address by establishing connection to an optical path of a wavelength division multiplexing optical signal composed of optical signals of a plurality of wavelengths. The method includes the steps of processing an input packet by receiving a wavelength division multiplexing optical signal composed of optical signals assigned with a plurality of wavelength depending on the first destination address, and extracting an optical signal with the own node address and an optical signal with another node address from the wavelength division multiplexing optical signal and generating the extracted signals, processing an output packet by decoding a packet from the optical signal generated at the step of processing an input packet, allocating the decoded packet and a plurality of add-packets generated as electric signals to an optical signal with a predetermined wavelength depending on the destination address, and generating the optical signals, extracting a number of nodes which are designated by destination addresses of the optical signals assigned with the packets at the step of processing an output packet, allocating a predetermined wavelength to the optical signal generated at the step of processing the input packet and the optical signal generated at the step of processing the output packet so as to secure the corresponding wavelength, and then generating the optical signal assigned with the predetermined wavelength, detecting an occurrence of link failure based on the wavelength division multiplexing optical signal and generating a detection signal, and establishing traffic avoiding the link failure by operating at least one of the packet switching unit and the optical path switching unit so that the packet can be transmitted through the established traffic to the photonic node corresponding to the destination address, based on the number of destination nodes determined at the step of extracting the number of destination nodes.

In the above-proposed method of restoring traffic according to the present invention, the step of detecting an occurrence of link failure may be arranged as an optical link break detecting step in which if the wavelength division multiplexing optical signal is absent in being received by the node for a predetermined period of time, then it is determined that any link failure is brought about. The step of detecting an occurrence of link failure may be arranged as a monitoring packet receiving step in which a monitoring packet transmitted at a predetermined interval is received and if the monitoring packet is absent in being received for a predetermined period of time, then it is determined that any link failure is brought about. Further, the step of detecting an occurrence of link failure may be arranged to include a first extending step for extending the period of time concerning the detection of the absence in receiving the monitoring packet in the monitoring packet receiving step, and a first detecting step in which if the wavelength division multiplexing optical signal is absent in being received by the node for a predetermined period of time, then it is determined that any link failure is brought about.

Furthermore, the step of detecting an occurrence of link failure may be arranged to include a second extending step for extending the period of time concerning the detection of the absence in receiving the wavelength division multiplexing optical signal in the optical link break detecting step, and a second detecting step in which if the monitoring packet is absent in being received for the predetermined period of time, then it is determined that any link failure is brought about.

In the above-proposed method of restoring traffic according to the present invention, the step of establishing traffic avoiding the link failure may be arranged such that if it is determined that the number of nodes of destination address is singular in the node number extracting step, only the optical path of the optical signal generated at the optical path processing step is changed, whereas if it is determined that the number of node of destination address is plural in the node number extracting step, the optical path of the optical signal generated at the optical path processing step is changed, and also the decoded packet and the add-packet are assigned with a wavelength corresponding to the destination address. Further, the step of establishing traffic avoiding the link failure may be arranged such that the traffic is rerouted at the source node and the destination node in such a manner that the optical signal is assigned with a substituting path which permits the optical signal to be transferred to the destination node. Furthermore, the step of establishing traffic avoiding the link failure may be arranged such that the restoration of traffic is handled by the nodes neighboring the failed link in such a manner that the optical signal is assigned with a substituting path which permits the optical signal to be transferred to the destination node.

In addition, in the above-proposed method of restoring traffic according to the present invention, the step of establishing traffic avoiding the link failure may be arranged such that an identical wavelength is assigned to an optical signal to be transmitted through a section to which the optical path is settled. Further, the step of establishing traffic avoiding the link failure may be arranged such that differing wavelengths are assigned to optical signals to be transmitted through a section to which the optical path is settled.

Furthermore, according to the present invention, there is proposed a method of restoring traffic avoiding link failure in an optical path network in which a plurality of packets each having a destination address are converted into optical signals of a predetermined wavelength and transferred depending on the destination address. The method includes the steps of extracting the number of nodes of the destination address of the optical signals which are converted from the plurality of packets, converting the plurality of packets into optical signals having an identical wavelength if the number of nodes is determined to be plural at the node number extracting step, and converting the packet into an optical signal having a wavelength depending on the destination address if the number of nodes is determined to be singular at the node number extracting step.

According to the above-described arrangement, packet switching can be carried out as well as wavelength switching is. Therefore, traffic restoration is effectively carried out, with the result that extendability of the system can be improved in response to the increase of number of necessary wavelengths.

BRIEF DESCRIPTION OF THE DRAWINGS

FIG. 3 is a diagram showing an arrangement of a traffic restoration control unit according to the first embodiment of the present invention;

FIG. 4 is a diagram for explaining an operation of restoring traffic by optical path switching according to the first embodiment of the present invention;

FIG. 5 is a diagram for explaining an operation of restoring traffic by IP packet switching according to the first embodiment of the present invention;

FIG. 22 is a diagram for comparing an arrangement of the network according to the present invention with that of a conventional one in terms of the required number of switching elements;

DESCRIPTION OF THE PREFERRED EMBODIMENTS

Embodiments of the present invention will hereinafter be described with reference to attached drawings.

(A) Description of a First Embodiment According to the Present Invention

Figure 1:
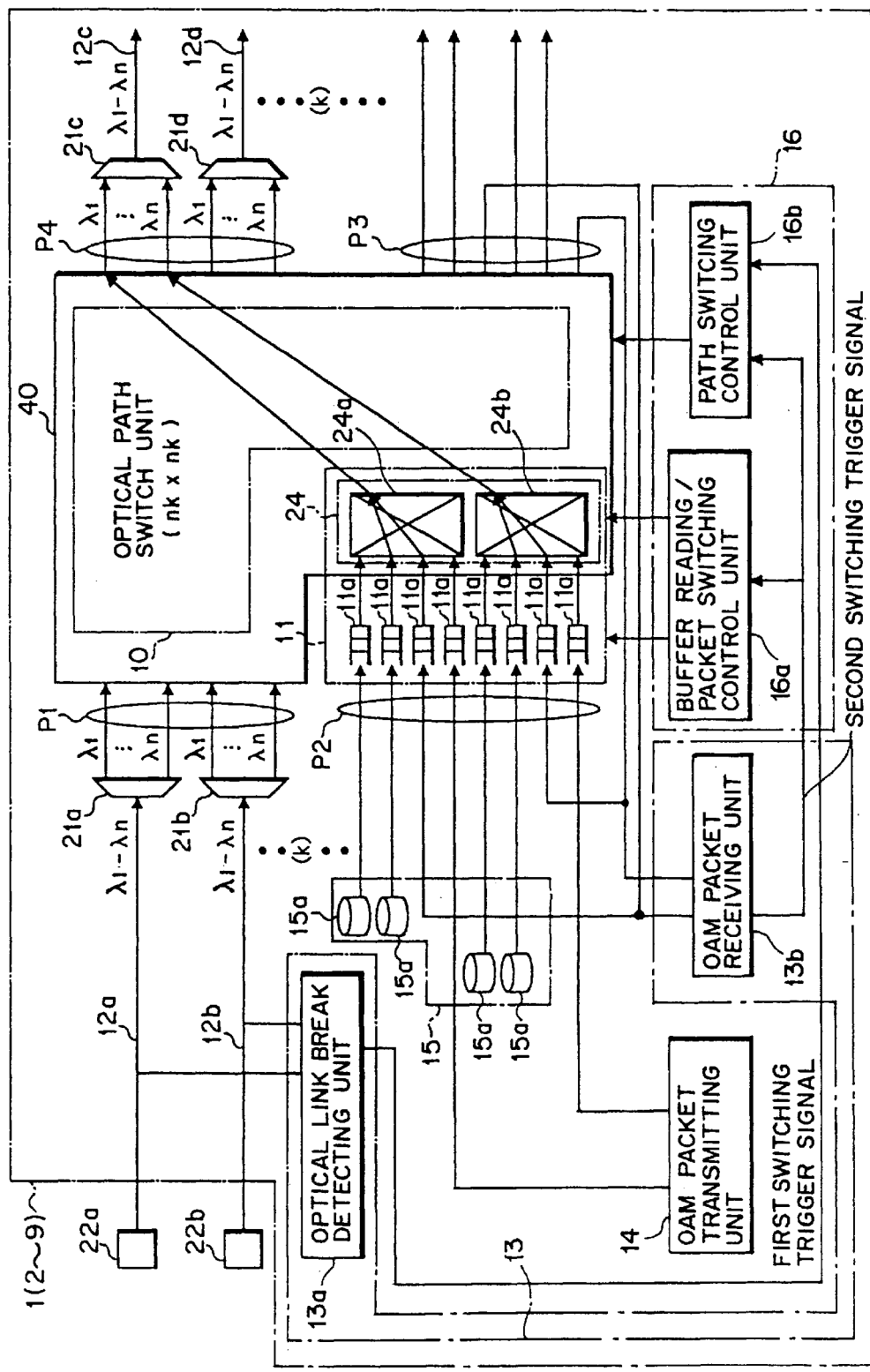
FIG. 1 is a diagram showing an arrangement of a photonic IP node according to a first embodiment of the present invention.

A photonic IP node 1 according to a first embodiment of the present invention also has a function of switching on an optical path of an optical signal in which IP packets are accommodated, and also switching the wavelength of the optical signal in which IP packets are accommodated, whereby routing for the IP packets is effected. FIG. 1 is a diagram showing an arrangement of a photonic IP node according to the first embodiment of the present invention. The photonic IP node 1 shown in FIG. 1 is arranged to include a packet switch unit (packet switching unit) 11 and an optical path switch unit (optical path switching unit) 10.

The packet switch unit 11 is a unit for transferring an IP packet with an IP address (a first destination address) to another photonic IP node based on the IP address. The optical path switch unit 10 is a unit which connects an IP packet with an IP address (second destination address) to an optical path in which a plurality of optical signals of different wavelengths are multiplexed so that the IP packet is transferred to its destination.

The photonic IP node 1 is arranged to include a space switch unit 40, a plurality of buffers 11a, input transmission paths 12a, 12b, branching units 21a, 21b, multiplexing units 21c, 21d, output transmission paths 12c, 12d, link failure detecting unit 13, an OAM packet transmitting unit 14, a group of routers 15, and a traffic restoration control unit 16, whereby the packet switch unit 11 and the optical path switch unit 10 can be implemented.

Each of IP nodes 22a and 22b shown in FIG. 1 is a photonic node which carries out wavelength division multiplexing on an optical signal with a wavelength $\lambda 1$, an optical signal with a wavelength $\lambda 2$, ..., an optical signal with a wavelength $\lambda n$ (n is an integer) and transmits the multiplexed signal to the photonic node 1 or the like.

The input transmission paths 12a and 12b is a transmission paths for transmitting the wavelength division multiplexing optical signal (wavelength $\lambda 1$ to wavelength $\lambda n$) sent from another photonic IP nodes 22a and 22b, respectively. The function of the transmission path can be implemented by, for example, an optical fiber. The branching units 21a and 21b are units for branching a part of the wavelength division multiplexing optical signal received by way of the input transmission paths 12a and 12b. The function of the branching unit can be implemented by an optical branching unit, for example. Thus, the wavelength division multiplexing optical signal is demultiplexed into the wavelength $\lambda 1$ to wavelength $\lambda n$ and each of the branched signals is outputted from the unit.

In this way, the wavelength division multiplexing optical signal transmitted from the photonic IP node 22a is supplied through the input transmission path 12a to the branching unit 21a in which the wavelength division multiplexing optical signal is demultiplexed into the optical signal with the wavelength λ1, the optical signal with the wavelength λ2, ..., the optical signal with the wavelength λn. These branched optical signals are fed to the space switch unit 40. Likewise, the wavelength division multiplexing optical signal transmitted from the photonic IP node 22b is subjected to a similar operation. Therefore, the operation thereof will not be described.

The space switch unit 40 has a first input port P1, a second input port P2, a first output port P3, and a second output port P4. The space switch unit 40 is supplied with a wavelength division multiplexing optical signal formed of optical signals of different wavelengths which are assigned to packets depending on their IP addresses, and add-packets with another node address at the two input ports. The space switch unit 40 extracts an optical signal of which destination is the photonic node 1 (with the own node destination) from the wavelength division multiplexing optical signal, and then generates the extracted signal to the outside from the first output port P3 as an optical signal to be dropped. Also, the space switch unit 40 multiplexes an optical signal with other destination node contained in the wavelength division multiplexing optical signal together with an optical signal caused by an add-packet with another node address. The space switch unit 40 also generates the multiplexed signal to the outside from the second output port P4.

As will be described later on, the space switch unit 40 is arranged as a multi-stage arrangement in which a plurality of space switch units composed of a number of switch elements are connected in a cascade fashion. In this arrangement, the optical path switch unit 10 and the packet switch unit 11 are constructed by the space switch unit 40 and the buffer 11a.

In the following description, the term "add-packet" means an IP packet to be added to a signal transmitted between photonic IP nodes. Further, terms "optical signal caused by the add-packet" means an optical signal with a predetermined wavelength in which data of the add-packet is accommodated. Furthermore, in the following description, the optical signal caused by the add-packet is sometimes referred to as an optical signal containing an add-packet.

Subsequently, the multiplexing units 21c and 21d multiplex the optical signals with the wavelength λ1, ..., and the optical signal having the wavelength λn generated from the space switch unit 40 and generate a resultant wavelength division multiplexed signals. The function of the multiplexing units 21c and 21d can be implemented by an optical multiplexer, for example. Further, the output transmission paths 12c and 12d are transmission paths through which the wavelength division multiplexing optical signal (containing the optical signals with the wavelength λ1, ..., and the optical signal with the wavelength λn) are transmitted. The function of the output transmission paths 12c and 12d can be implemented by optical fibers, for example.

In this way, the optical signals having a plurality of wavelengths fed from the space switch unit 40 are multiplexed by the multiplexing unit 21c, and the resultant wavelength division multiplexing optical signal is transmitted through the output transmission path 12c to another photonic IP node (not shown). The multiplexing unit 21d functions in a similar manner. Therefore, it will not be described. The photonic IP node 1 is connected with a number of optical fibers at the input side thereof, thus capable of communicating with number of other photonic IP nodes. Also, the photonic IP node 1 is connected with a number of optical fibers at the output side thereof, thus capable of communicating with number of other photonic IP nodes. Accordingly, wavelength division multiplexing optical signals can be transmitted in a bidirectional fashion among photonic IP nodes constituting the network. However, in order to simplify the description on the photonic IP node 1, it is assumed that the photonic IP node 1 shown in FIG. 1 is supplied with an optical signal from the photonic IP nodes 22a and 22b on the left side thereof and generates optical signals from the output transmission paths 12c and 12d on the right side thereof. Further, the arrangement of the photonic IP nodes 1 will apply those of a second embodiment, third embodiment and modifications thereof unless otherwise specified.

Subsequently, the plurality of buffers 11a are units for holding a plurality of add-packets generated as an electric signal and supplying the add-packets to the space switch unit 40. Each of the buffers 11a is arranged such that, IP packets sequentially inputted to the buffer are held in accordance with the order of input with a number indicative of an order of input and also the IP packets are generated in such a manner that first held in the buffer is generated therefrom first. With the buffers 11a provided at the input port P2, even if a great amount of IP packets are supplied to the input port P2 at a time, these IP packets can be handled sequentially. Therefore, if the size of traffic is so large that the node is requested to have a large amount of exchanging capability, the handling of IP packets can be effectively executed.

The optical path switch unit 10 is formed of a part of the space switch unit 40, i.e., the optical path switch unit 10 is provided with the space switch unit for branching each of the optical signals of the wavelength division multiplexing optical signal depending on each wavelength assigned to the optical signals. In the optical path switch unit 10, an optical signal with the own node destination is extracted and the extracted optical signal is generated from the first output port P3 as a drop signal. An optical signal with another node destination contained in the wavelength division multiplexing optical signal and an optical signal containing data of an add-packet with another node address are multiplexed with each other and generated from the second output port P4.

The packet switch unit 11 is formed of a remaining part of the space switch unit 40 for branching each of the optical signals of the wavelength division multiplexing optical signal depending on each wavelength assigned to the optical signals. The packet switch unit 11 is also formed of the buffers 11a. The packet switch unit 11 is supplied with an IP packet which derives from the decoding of an optical signal for the dropping generated from the optical path switch unit 10 and a plurality of add-packets supplied from the buffer 11a. In the packet switch unit 11, the IP packet which derives from the decoding of an optical signal generated from the first output port P3 and the plurality of add-packets are inputted to the optical path switch unit 10 as an optical signal assigned with a predetermined wavelength depending on each IP address.

In the following description, an IP packet caused by the optical signal is sometimes referred to as an IP packet deriving from the decoding of the optical signal.

Further, the group of routers 15 is composed of a plurality of routers 15a provided within the own node. Each of the routers 15a is a unit for carrying out routing for the IP packet. In more concretely, the router 11a reads an IP address of the IP packet, searches a mass of electric paths of the optimum one in accordance with the IP address, and sends the IP packet to its destination by using the optimum path. Other routing functions of the router 11a are similar to those of a conventional one. Therefore, they will not be described.

The OAM packet transmitting unit (monitoring packet transmitting unit) 14 is a unit for generating an IP packet as an electric signal at a predetermined time interval. If the photonic IP node 1 is regarded as a signal transmitter, the OAM packet transmitting unit functions as a transmitter. The term OAM (Operation, Administration and Maintenance) means a function for carrying out maintenance and management for a lower degree of layers of the optical path network. That is, the photonic IP node 1 transmits an OAM packet to other photonic IP nodes. If the other photonic IP node successfully receives the OAM packet at the predetermined time interval, which fact indicates that the traffic between the photonic IP nodes is normally maintained. Conversely, if the other photonic IP node fails to receive the OAM packet at the predetermined time interval, which fact indicates that the optical path network suffers from any link failure. Thus, any link failure can be detected. Moreover, the OAM packet contains information useful for managing the optical path network.

Further, each of the above-described photonic IP nodes 22a and 22b has a space switch unit and the OAM packet transmitting unit (not shown). Thus, each of the photonic IP nodes 22a and 22b (photonic nodes for transmitting a signal) includes a space switch unit which is supplied with a wavelength division multiplexing optical signal composed of optical signals of a plurality of wavelengths assigned to packets with a destination address and add-packets having another node address, and generates an optical signal with own node destination extracted from the wavelength division multiplexing optical signal and a multiplexing signal composed of an optical signal with other node destination contained in the wavelength division multiplexing optical signal and an optical signal caused by an add-packet of another node destination. Each of the photonic IP nodes 22a and 22b also includes the monitoring packet transmitting unit for generating a packet as an electric signal at a predetermined time interval.

The link failure detecting unit 13 is connected to the space switch unit 40 at the input side and the output side thereof. The link failure detecting unit 13 is a unit for detecting occurrence of link failure and generating a detection signal in response to the detection of occurrence of the link failure. The link failure detecting unit 13 is formed of an optical link break detecting unit 13a and an OAM packet receiving unit (monitoring packet receiving unit) 13b.

The optical link break detecting unit 13a is connected to the input side of the space switch unit 40. The optical link break detecting unit 13a is arranged to generate a first switching trigger signal if the unit fails to receive a wavelength division multiplexing optical signal.

The OAM packet receiving unit 13b is connected to the first output port P3 of the space switch unit 40. The OAM packet receiving unit 13b is arranged to receive the IP packet as an electric signal transmitted at a predetermined time interval. If the OAM packet receiving unit 13b fails to receive the IP packet at the predetermined time interval, the OAM packet receiving unit 13b generates a second switching trigger signal.

In this way, the OAM packet transmitting unit 14 of another photonic IP node 22a, 22b (see FIG. 1) transmits a series of OAM packets with a predetermined time interval to the output transmission paths 12c and 12d. The data of OAM packet is supplied to the space switch unit 40 in which it is multiplexed with a wavelength division multiplexed signal and transmitted to another photonic IP node. The series of OAM packets is received at the OAM packet receiving unit 13b provided in the photonic IP node. If the OAM packet receiving unit 13b fails to receive the series of OAM packets, then it is determined that any link failure is brought about in the optical path network.

In the following description, if a transmission of an optical signal (or IP packet) is broken due to an occurrence of link failure, the detection of this state is referred to as detection of link break of optical signal (or IP packet) or recognition of link break of optical signal (or IP packet).

The traffic restoration control unit 16 is connected to the link failure detecting unit 13. When the traffic restoration control unit 16 receives the detection signal from the link failure detecting unit 13, the traffic restoration control unit 16 selects any of the optical signals contained in the wavelength division multiplexing optical signal for each wavelength and the optical signal by changing an optical path. The traffic restoration control unit 16 is formed of a buffer reading/packet switching control unit 16a and a path switching control unit 16b.

The buffer reading/packet switching control unit 16a is connected to the OAM packet receiving unit 13b. The buffer reading/packet switching control unit 16a is arranged to detect link failure in the transmission path if a predetermined time duration has elapsed till the second switching trigger signal is last received from the monitoring packet receiving unit 13b. Then, the buffer reading/packet switching control unit 16a changes a reading order of the plurality of add-packets held in the buffers 11a, and selects an optical signal of the space switch unit 40 for controlling switching depending on the destination of the optical signal. That is, the selection and the switching of the optical signal is effected after a predetermined time duration has elapsed till the second switching trigger signal is last received.

Further, the buffer reading/packet switching control unit 16a is arranged to respond to the time duration even if the time duration is variably settled. For example, if an optical power level of the received optical signal becomes zero or goes below a predetermined threshold level for more than a predetermined period of time, the buffer reading/packet switching control unit 16a generates a first switching trigger signal to the packet switch unit 11.

The path switching control unit 16b is connected to the optical link break detecting unit 13a and the OAM packet receiving unit 13b. The path switching control unit 16b is arranged to detect link failure if a predetermined time duration has elapsed till the first trigger signal is last received from the optical link break detecting unit 13a or the second trigger signal is last received from the OAM packet receiving unit 13b. When the path switching control unit 16b is arranged to detect link failure, the path switching control unit 16b selects an optical signal of the space switch unit 40 for controlling switching depending on the destination of the optical signal. Further, the path switching control unit 16b is also arranged to respond to the time duration which is variably settled. That is, if the path switching control unit 16b is arranged to respond to the elongated time interval which is counted from the last received first switching trigger signal generated from the optical link break detecting unit 13a, it becomes possible to make the path switching control unit 16b more insensible to the detection of the optical link break. Therefore, the traffic restoration is effected in a manner more responding to the second switching trigger signal from the OAM packet receiving unit 13b than the first switching trigger signal from the optical link break detecting unit 13a.

The link failure detecting unit 13, the optical linkbreak detecting unit 13a, the OAM packet receiving unit 13b and the traffic restoration control unit 16 serve as receiving components of the photonic IP node 1 if the photonic IP node 1 is regarded as a node for signal reception.

Accordingly, the photonic IP node 1 (a node for signal reception) is constructed by the space switch unit 40, the buffers 11a, the optical link break detecting unit 13a, the OAM packet receiving unit 13b, the path switching control unit 16b and the buffer reading/packet switching control unit 16a. Further, the buffer reading/packet switching control unit 16a is arranged to respond to the time duration which is variably settled. Likewise, the path switching control unit 16b is arranged to respond to the time duration which is variably settled.

Figure 2:
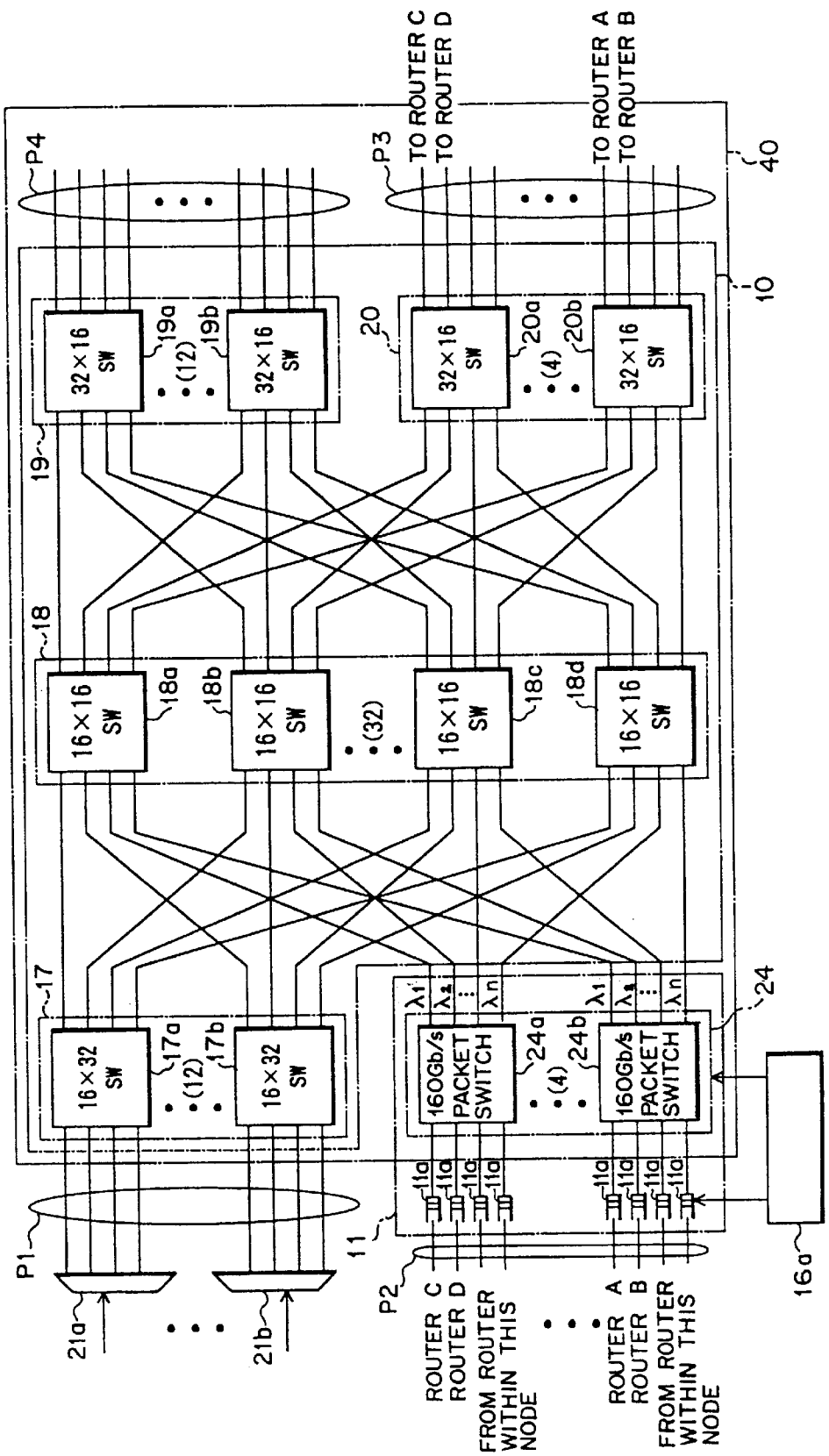
FIG. 2 is a diagram showing an arrangement of a space switch unit according to the first embodiment of the present invention.

FIG. 2 is a diagram showing an arrangement of the space switch unit 40 according to the first embodiment of the present invention. The space switch unit 40 shown in FIG. 2 includes a first input port P1 at which a wavelength division multiplexing optical signal composed of optical signals of a plurality of wavelengths is received, a second input port P2 at which an add-packet with another node address is received, a first output port P3 from which an optical signal with the own node destination extracted from the wavelength division multiplexing optical signal is generated as an optical signal to be dropped, and a second output port P4 from which an optical signal with another node destination contained in the wavelength division multiplexing optical signal and an optical signal containing an add-packet with another node address multiplexed with each other is generated. Further, the space switch unit 40 includes a first packet switch 24, a first space switch 17, a second space switch 18, a third space switch 19, and a fourth space switch 20.

The space switch unit 40 is arranged to effect a cross-connecting operation on optical signals having a plurality of wavelengths by using a switch circuit network in which three units of space switches are connected to one another in a cascade fashion. Values concerning the photonic IP node 1 shown in FIG. 2 are, for example, as follows. A size of input traffic indicating the capacity of IP packet to be sent is 640 Gbps, a number of input/output transmission paths between nodes is six, and a number of wavelengths subjecting to the wavelength division multiplexing is 32 wavelengths. The switching capacity of the photonic IP node is 2.56 Tbps, in the case of transmission bit rate of 10 Gbps.

The unit of rate "bps (bit per second)" indicates a transmission rate, and it can be denoted as b/s. Further, the letter "G" means the ninth power of 10 and letter "T" means the twelfth power of 10.

The first packet switch 24 is formed of four units of packet switch 24a, ..., 24b. Each of the four packet switch units 24a, ..., 24b has an input port at which an add-packet and an IP packet deriving from decoding the optical signal to be dropped are supplied. Each of the four packet switch units 24a, ..., 24b also has an output port from which an optical signal assigned with a predetermined wavelength depending on the IP packet is generated. The packet switches 24a, 24b employed in the space switch unit 40 is one capable of processing an input traffic of 160 Gbps at maximum. Thus, the first packet switch 24 has an input traffic processing capacity of 640 Gbps in total. The first packet switch 24 and a plurality of buffer 11a constitute the packet switch unit 11.

Each of the four packet switch units 24a, ..., 24b is arranged to be supplied with an electric signal and generate an optical signal, and is controlled by the buffer reading/packet switching control unit 16a. Owing to the control, an IP packet to be transmitted is assigned to an optical signal of a predetermined wavelength and the optical signal assigned with the IP packet undergoes cross-connect operation in the optical path switch unit 10.

The first space switch 17 is formed of 12 units of switches 17a, ..., 17b each of which is arranged as a 16×32 switch (denoted as 16×32 SW). Each of the 16×32 switches 17a, ..., 17b has an input port at which an optical signal having one of the plurality of wavelengths differing from one another contained in the wavelength division multiplexing optical signal is supplied. Each of the 16×32 switches 17a, ..., 17b also has an output port from which an optical signal having the same wavelength as the above-mentioned one of the plurality of wavelengths which are different from one another is generated.

Figure 6A:
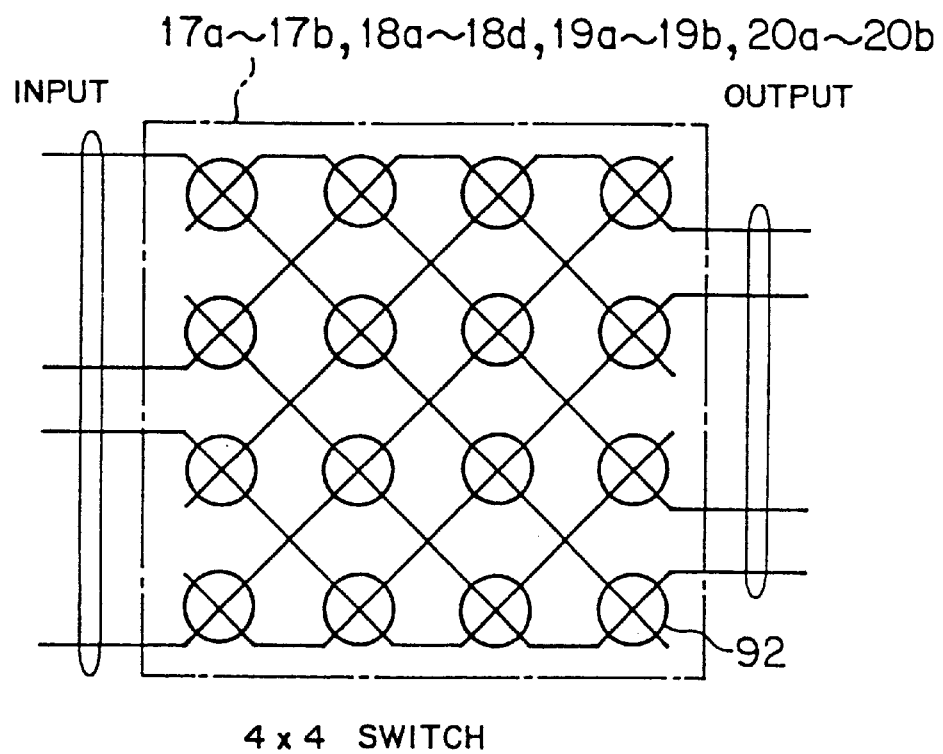
FIG. 6(a) is a diagram schematically showing the space switch.

Each of the 16×32 switches 17a, ..., 17b is arranged as shown in FIG. 6(a). That is, FIG. 6(a) is a diagram schematically showing the arrangement of the space switch. As shown in the figure, the space switch is formed of 16 unit switches 92, four input ports and four output ports. A signal is supplied to the unit switch at any of the four input ports. The input signal is given any of two paths by each of the unit switches 92 and outputted from the space switch at any of the four output ports.

Figure 6B:
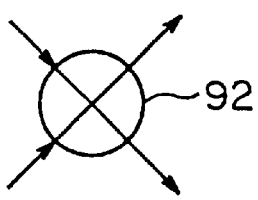
FIG. 6(b) is a diagram schematically showing a unit switch when a voltage is not applied.
Figure 6C:
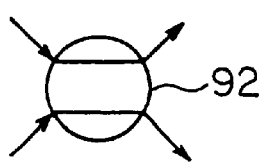
FIG. 6(c) is a diagram schematically showing the unit switch when a voltage is applied.

FIG. 6(b) is a diagram schematically showing a state of the unit switch 92 when no voltage is applied. Thus, signal paths are crossed (cross-state). That is, a signal inputted to the unit switch at the upper left port is fed to the lower right port whereas a signal inputted to the unit switch at the lower left is fed to the upper right port of the unit switch. On the other hand, FIG. 6(c) is a diagram schematically showing a state of the unit switch 92 when a voltage is applied thereto. As shown in the figure, the signal paths run in parallel (bar-state). That is, a signal inputted to the unit switch at the upper left port is fed to the upper right port whereas a signal inputted to the unit switch at the lower left is fed to the lower right port of the unit switch.

When a voltage applicable to each of the unit switch 92 is turned on or off, each of the plurality of optical signals inputted to the input ports can be selectively generated from a desired output port. While the unit switch shown in FIG. 6(a) has an arrangement of 4×4, a switch arrangement of 16×8, which will be introduced in the following description, may be constructed by combining the unit switch 92. Also, a second embodiment and a third embodiment and various modifications of the present invention, which will be described later on, may include a space switch unit which is similarly constructed by combining the unit switch 92.

The second space switch 18 (see FIG. 2) is formed of 32 units of switches 18a, 18b, ..., 18c, 18d each of which is arranged as a 16×16 switch (denoted as 16×16 SW). Each of the 16×16 switches 18a, 18b, ..., 18c, 18d has 16 input ports at which an optical signal from the first packet switch 24 and an optical signal from the first space switch are inputted. Each of the 16×16 switches 18a, 18b, ..., 18c, 18d also has 16 output ports from which the optical signals inputted at the 16 input ports and selectively assigned with a path are outputted.

The third space switch 19 is formed of 12 units of switches 19a, ..., 19b each of which is arranged as a 32×16 switch. Each of the 32×16 switches 19a, ..., 19b has 32 input ports at which optical signals from the second space switch 18 are inputted and 16 output ports from which the optical signals inputted at the 32 input ports and selected depending on the wavelength are outputted.

The fourth space switch 20 is formed of four units of switches 20a, ..., 20b each of which is arranged as a 32×16 switch. Each of the 32×16 switches 20a, ..., 20b has 32 input ports at which optical signals from the second space switch 18 are inputted and 16 output ports from which the optical signals inputted at the 32 input ports and selected depending on the wavelength are outputted.

The fourth space switch 20 converts an optical signal into an electric signal so that the wavelength assigned to the optical signal contained in the wavelength division multiplexed signal is changed. Thus, a plurality of IP packets can be extracted as electric signals.

In this way, the space switch (composed of the first space switch 17, the second space switch 18, the third space switch 19, the fourth space switch 20) functions as an optical path switching unit (optical path switch unit 10) as follows. That is, the space switch branches each of the optical signals contained in the wavelength division multiplexed signal depending on the wavelength, extracts an optical signal with the own node destination to output as an optical signal to be dropped at the first output port, and multiplexes the optical signal with another node destination contained in the wavelength division multiplexing optical signal and an optical signal containing an add-packet with another node address together and outputs the resultant multiplexed signal from the second output port.

Further, the first packet switch 24 which forms the remaining part of the space switch unit 40 and branches each of the optical signal depending on the wavelength, and the buffers 11*a* constitute the packet switching unit (packet switch unit 11), whereby the packet switching unit functions as follows. That is, the packet switching unit 11 is supplied with an IP packet deriving from the decoding of the optical signal to be dropped generated from the first output port P3 of the optical path switch unit 10 and a plurality of add-packets from the buffers 11*a*. The packet switching unit 11 also supplies the IP packet deriving from the decoding of the optical signal to be dropped generated from the first output port P3 and the plurality of add-packets to the optical path switch unit 10 as an optical signal assigned with a predetermined wavelength depending on each IP address.

The optical path switch unit 10 is supplied with optical signals having a plurality of wavelengths different from one another (λ1 to λn) at respective input ports of the 12 units of 16×32 switches 17*a* to 17*b* and four packet switch units 24*a* to 24*b*. The optical path switch unit 10 also subjects the plurality of wavelengths different from one another (λ1 to λn) to a switching operation effected in the space switch of three-stage arrangement, and outputs the switched signals from the first output port P3 and the second output port P4.

Further, the buffers 11*a* are connected to the optical path switch unit 10 at the four packet switch units 24*a* to 24*b* of the above-mentioned plurality of input ports thereof. The buffers 11*a* hold the IP packets and timely release the IP packets to supply the same to respective input ports of the four packet switch units 24*a* to 24*b*.

Then, the packet switch unit 11 plays a role of the optical path switch unit 10 which is originally played by a part of the space switch unit 40. That is, the packet switch unit 11 converts the IP packets supplied to the buffers 11*a* into optical signals assigned with a predetermined wavelengths and generates the converted signals therefrom.

In this way, the flow of the optical signals supplied to the optical path switch unit 10 at the first input port P1 shown in FIG. 2 becomes as follows. Initially, wavelength division multiplexing optical signals supplied thereto through transmission paths are inputted to the 16×32 switch 17*a* in the first space switch 17 included in the space switch unit 40. The optical signals inputted to the 16×32 switch 17*a* are divided into a group of optical signals with the own node destination (to the photonic IP node 1) and a group of optical signals with another node destination (not shown) in accordance with the wavelength of the optical signal. That is, the optical signals of the own node destination are transferred to the space switch 20 and dropped from the first output port P3. The optical signals of another node destination are transferred to the third space switch 19 and again transmitted to another node from the second output port P4.

Similarly, the optical signals inputted into the 16×32 switch 17*b* of the first space switch 17 of the space switch unit 40 are divided into a group of optical signals with the own destination and a group of optical signals with another node destination in accordance with each wavelength of the optical signals. The optical signals with the own node destination is transferred to the fourth space switch 20, in which they are dropped at the first output port P3. The optical signals with another node destination are transferred to the third space switch 19 and again transmitted to another node from the second output port P4.

The 32×16 switch 19*a* of the third space switch 19 is supplied with optical signals from the 16×16 switches 18*a* to 18*d* of the second space switch 18. The optical signals supplied to the 32×16 switch 19*a* are multiplexed and generated from the second output port P4. The generated optical signals are further mixed with each other in the multiplexing unit 21*c*.

On the other hand, 32×16 switch 20*a* of the fourth space switch 20 is supplied with optical signals from the 16×16 switches 18*a* to 18*d* of the second space switch 18. The optical signals supplied to the 32×16 switch 20*a* are multiplexed and dropped from the first output port P3. The dropped optical signals are converted into IP packets as electric signals by a photoelectric converter (not shown). These IP packets are generated.

The space switches such as the 16×32 switch 17*a* of the first space switch 17 shown in FIG. 2 are controlled by the path switching control unit 16*b*. Further, as will be described later on, when any trouble is brought about in other photonic IP nodes 22*a* and 22*b* or transmission paths, the buffer reading/packet switching control unit 16*a* and the path switching control unit 16*b* change a wavelength to be assigned to the optical signal, whereby traffic for the IP packet can be restored.

As described above, the signals outputted from the packet switches 24*a* to 24*b* are optical signals. Therefore, the path through which the signal is transmitted is an optical path. Further, an optical signal generated from the output port of the packet switches 24*a* to 24*b* is led to the input port of the optical path switch unit 10, and hence the optical path switch unit 10 and the packet switches 24*a* to 24*b* as a space switch are integrated together. Therefore, the size of the apparatus of the photonic IP node 1 can be made small.

The IP packets as electric signals generated from the space switch unit 40 (see FIG. 1) are again led from the second input port P2 to the buffers 11*a* of the packet switch unit 11. This is because some of the IP packets subjecting to the routing have destination of the subject photonic IP node 1. Further, some of the IP packets can be those to be transmitted to another photonic IP node. Furthermore, as will be described later on, if any failure is brought about, the IP packet is assigned with alternative wavelength of an optical signal utilized for transmission so as to change the transmission path.

Now, the flow of optical signals supplied to the second input port P2 shown in FIG. 2 will be described. Initially, IP packets are fed from a plurality of routers 15*a* (see FIG. 1) through the second input port P2 to the packet switch unit 11. A number of the supplied IP packets are temporarily stored in the buffers 11*a* of the packet switch unit 11. The IP packets outputted from the buffers 11*a* are fed to the packet switches 24*a* to 24*b*. Thus, optical signals are generated from the packet switches 24*a* to 24*b*.

A concrete manner for assigning a wavelength to the IP packet in accordance with the IP address can be variously determined depending on the design concept of the transmitting system. Therefore, it will not be described. Further, the space switch unit 40 can be modified when the arrangement of the space switch 40 is applied to the second and third modifications of the first embodiment which will be described later on.

Therefore, in the space switch unit 40 of the photonic IP node 1, the wavelength division multiplexing optical signals are supplied to the first input port P1, and a plurality of optical signals contained in the wavelength division multiplexing optical signal are subjected to cross-connecting operation. Also in the space switch unit 40 of the photonic IP node 1, IP packets are supplied to the second input port P2, the supplied IP packets are converted into optical signals with a wavelength assigned depending on the IP address, and subjected to cross-connecting operation.

If the cross-connecting operation is more fully described, the cross-connecting operation can be carried out in two kinds of manners, i.e., a manner in which the wavelength of the optical signal is directly changed and a manner in which the value of the wavelength of the optical signal to be converted is changed. The former manner is such one that the IP packet having an IP address is connected to an optical path in which a plurality of optical signals are multiplexed. The latter one is such that path exchange is effected in a region in which signals are transmitted as an electric signal.

The packet switch unit 11 is supplied with a plurality of IP packets fed from the router 15a (see FIG. 1) and IP packets dropped from the first output port P3. Then a predetermined wavelength is assigned to these IP packets. Further, path exchange is effected in the optical path switch unit 10, whereby data of IP packets are converted into optical signals with a predetermined wavelength. The converted optical signals are further multiplexed in the multiplexing units 21c and 21d. The multiplexed signal is transmitted through the output transmission paths 12c and 12d to another photonic IP node.

As described above, in the multistage switch circuit network (see FIG. 2), a necessary number of buffers 11a are connected to the first stage of the space switch unit of the multistage switch circuit network, with the result that the part of the space switch unit 40, which is connected with the buffer elements 11a, can serve as the packet switches 24a to 24b, whereas the remaining part of the space switch unit 40 can serve as the optical path switch unit 10, whereby the packet switches 24a to 24b and the optical path switch unit 10 constitute the space switch unit 40 in an integrated fashion. Accordingly, the arrangement of the space switch can be free from the multistage construction at a part which functions as a packet switching unit, with the result that the arrangement of the photonic IP node 1 can be made small. Further, four packet switch units may be used in place of the fourth space switch 20.

Further, the arrangement of the space switch unit 40 according to the present invention permits the buffers 11a to be connected thereto, the number of the buffers 11a to be connected can be arbitrarily increased. Therefore, the packet switch unit 11 can be made large depending on the number of connected buffer elements, with the result that the photonic IP node 1 can cope with fluctuation in traffic size fed to the node. Which fact means that the node system according to the present invention has an improved extendability responding to the increase of the necessary number of wavelengths.

How traffic restoration is controlled will hereinafter be described with reference to FIGS. 3 to 5. The term "traffic restoration" is a countermeasure taken so that the wavelength division multiplexing optical signal is positively transmitted to its destination if a transmission path is broken due to any trouble causing link failure. When link failure is brought about, each of the photonic IP nodes detects the location of the link failure and effects path switching so as to establish substituting traffic which is capable of sending the wavelength division multiplexing optical signal to its destination while avoiding the location of the link failure. An arrangement for restoring traffic will be described with reference to FIG. 3, the operation of traffic restoration using optical path switching will be described with reference to FIG. 4, and the operation of traffic restoration using packet switching will be described with reference to FIG. 5.

FIG. 3 is a diagram showing an arrangement of a traffic restoration control unit 16 according to the first embodiment of the present invention. The traffic restoration control unit 16 shown in FIG. 3 includes a buffer reading/packet switching control unit 16a and a path switching control unit 16b. The space switch unit 40 is connected to the traffic restoration control unit 16 at the output side of the traffic restoration control unit 16.

The space switch unit 40 is supplied with wavelength division multiplexing optical signals composed of optical signals with a plurality of wavelengths assigned to the optical signals depending on the address. The space switch unit 40 is also supplied with optical signals containing data of add-packets with another node address. In the space switch unit 40, an optical signal with the own node destination is extracted from the wavelength division multiplexing optical signal and generated from the space switch unit 40. Further, an optical signal with another node destination contained in the wavelength division multiplexing optical signal and an optical signal caused by the add-packet with another node destination are multiplexed with each other and generated from the space switch unit 40.

The packet switch unit 11 is supplied with an IP packet deriving from the decoding of the optical signal to be dropped which is outputted from the first output port P3, and an add-packet inputted at the second input port P2. The packet switch unit 11 outputs the IP packet deriving from the decoding of the optical signal to be dropped and the add-packet as an optical signal to which a predetermined wavelength is assigned depending on the IP address.

In the optical path switch unit 10, an optical signal with the own node destination is branched from the wavelength division multiplexing optical signal which is received at the first input port P1. The optical signal with the own node destination is outputted from the first output port P3 as an optical signal to be dropped. An optical signal with another node destination and an optical signal fed from the packet switch unit 11 are multiplexed with each other and outputted from the second output port P4.

The link failure detecting unit 13 detects occurrence of link failure based on the wavelength division multiplexing optical signal and generates a detection signal in response to the detection of the link failure. When the traffic restoration control unit 16 receives the detection signal from the link failure detecting unit 13, the traffic restoration control unit 16 selects each of the optical signals contained in the wavelength division multiplexing optical signal so that the optical signal is outputted on the changed optical path.

As described above, the photonic IP node 1 is arranged to detect an optical link break in such a manner that the OAM packet transmitting unit 14 constantly transmits a series of OAM packets with a predetermined time interval, another photonic IP node (not shown) receives the series of OAM packets with the predetermined time interval at its OAM packet receiving unit 13b, and occurrence of optical link break is determined in accordance with the absence in continuity of the series of OAM packets.

Initially, an operation for transmitting the OAM packets is as follows. That is, the OAM packet transmitting unit 14 shown in FIG. 3 transmits a series of OAM packets with a predetermined time interval by applying the same to the input side of the packet switch unit 11. Then, the OAM packet is received by another optical IP node.

An operation for receiving the OAM packets is as follows. That is, the wavelength division multiplexing optical signal supplied to the space switch unit 40 at the upper right portion thereof in FIG. 3 (through the exclusively utilized optical path or commonly utilized optical path) is fed to the optical path switch unit 10. An output from the optical path switch unit 10 is further fed to the packet switch unit 11. An optical signal containing the data of the OAM packets is branched from the wavelength division multiplexing optical signal fed from the optical path switch unit 10 to the packet switch unit 11. The branched optical signal is supplied to the optical link break detecting unit 13a. If any trouble is brought about in the transmission path, the optical signal that should be received by the optical link break detecting unit 13a will decrease in its level or cannot be received by the optical link break detecting unit 13a. Thus, optical link break can be detected. When the optical link break is detected, the optical link break detecting unit 13a generates a first switching trigger signal to the path switching control unit 16b. Further, the path switching control unit 16b supplies a control signal to the optical path switch unit 10.

Electric signals are taken out from the optical path switch unit 10 in a similar manner, and the plurality of optical signals taken out therefrom are continuously fed to the OAM packet receiving unit 13b. If the OAM packet receiving unit 13b fails to receive the series of OAM packets at a predetermined interval, the OAM packet receiving unit 13b determines that optical link break is brought about in the path of the OAM packet. Then, the OAM packet receiving unit 13b generates a second switching trigger signal to the path switching control unit 16b and the buffer reading/packet switching control unit 16a. The buffer reading/packet switching control unit 16a generates a control signal to the packet switch unit 11.

A manner of traffic restoration in the optical path network, in which the photonic IP nodes 1 to 9 are connected to one another, will hereinafter be described. Initially, each of the photonic IP nodes 1 to 9 receives a wavelength division multiplexing optical signal composed of optical signals of a plurality of wavelength assigned to the optical signals depending on the IP address. Then, each of the photonic IP nodes 1 to 9 extracts an optical signal with the own node destination and an optical signal with another node destination from the wavelength division multiplexing optical signal (input packet processing step).

Each of the photonic IP nodes 1 to 9 decodes optical signals created in the input packet processing step, and assigns the decoded IP packets and a plurality of add-packets generated as electric signals to optical signals having a predetermined wavelength depending on the IP address (output packet processing step). A predetermined wavelength is assigned to the optical signal generated in the input packet processing step and the optical signal generated at the output IP packet processing step so as to ensure an optical path. Then, the optical signals assigned with the wavelengths are generated (optical path processing step). Further, occurrence of link failure is detected based on the wavelength division multiplexing optical signal and a detection signal is generated (link failure detecting step). The manner for detecting the link failure will be described later on with reference to FIGS. 4 and 5.

As described above, if there is no trouble in the transmission path, the OAM packet can be transmitted from the OAM packet transmitting unit 14 at a predetermined time interval. The optical link break detecting unit 13a and the OAM packet receiving unit 13b monitor the transmitting condition of the optical signal and the OAM packet. If any trouble is brought about in the transmission path, traffic restoration is effected by either one of the control using only the optical path switch unit 10 and the control using both of the optical path switch unit 10 and the packet switches 24a to 24b. In this way, it becomes possible to implement highly reliable control.

FIG. 4 is a diagram for explaining operation of traffic restoration by optical path switching according to the first embodiment of the present invention. According to the example shown in FIG. 4, traffic restoration is carried out only by effecting the switching with the optical path switch unit 10. Components shown in FIG. 4 corresponding to those shown in FIG. 3 are attached with the same reference numerals, and they will not be described.

A series of OAM packets are transmitted from the OAM packet transmitting unit 14 of other photonic IP node at a time interval (transmitting interval) of T1' (second). In this case, T1 (second) is taken as a time duration (packet series break time) for which the OAM packet is absent in reception by the path switching control unit 16b on the receiving side. T2 (second) is taken as a time duration (optical signal break time) for which the wavelength division multiplexing optical signal is absent in reception by the optical link break detecting unit 13a on the receiving side. Further, T3 (second) is taken as a threshold time required for the optical path switch unit 10 to restore traffic. In this case, if the time duration T1, T2 and T3 are placed under the relationship T2<T3<<T1, then only the optical path switch unit 10 is driven.

That is, the path switching control unit 16b is arranged to determine that link failure is brought about based on optical signal link break if the time interval T1 for receiving the OAM packet is set to be considerably large as compared with T2 and T3. Further, the OAM packet receiving unit 13b tends to miss the detection of the break of the OAM packet series. However, if the path switching control unit 16b determine that link failure is brought about due to the break of the OAM packet series, traffic restoration is effected by the optical path switch unit 10.

Accordingly, in the above link failure detecting step, if the wavelength division multiplexing optical signal is absent in receiving for more than the predetermine time duration, i.e., the optical signal break time, then it is determined that link failure is brought about (optical link break detecting step). In other words, in the above link failure detecting step, the series of OAM packets are received at a predetermined time interval and if the series of OAM packets are absent in receiving for more than the predetermined time duration, also it is determined that link failure is brought about (monitoring packet receiving step).

In the above-described method of detecting link failure, the link failure detecting step may be arranged to include a step in which the period of time concerning the detection of the absence in receiving the series of OAM packets in the monitoring packet receiving step is extended (a first extending step), and if the wavelength division multiplexing optical signal is absent in being received by the node for a predetermined period of time, then it is determined that link failure is brought about (a first detecting step).

With the above arrangement, when the step of traffic restoration is activated, the packet switch unit 11 can be prevented from being activated with priority relative to the optical path switch unit 10.

FIG. 5 is a diagram for explaining operation of traffic restoration by optical path switching according to the first embodiment of the present invention. According to the example shown in FIG. 5, traffic restoration by switching is carried out not only by the optical path switch unit 10 but also by the packet switch unit 11. Components shown in FIG. 5 attached with the same reference numerals as those shown in FIG. 4 are the same components or components having substantially the same functions. Therefore, they will not be described.

Similarly to the arrangement shown in FIG. 4, a series of OAM packets are transmitted from the OAM packet transmitting unit 14 of other photonic IP node at a time interval (transmitting interval) of T1' (second). In this case, T1 (second) is taken as a time duration for which the OAM packet is absent in reception by the path switching control unit 16*b* on the receiving side. T2 (second) is taken as a time duration for which the wavelength division multiplexing optical signal is absent in reception by the optical link break detecting unit 13*a* on the receiving side. Further, T4 (second) is taken as a threshold time required by the optical path switch unit 10 and the packet switch unit 11 for effecting traffic restoration. In this case, if the time duration T1, T2 and T4 are placed under the relationship, T1<T4<<T2, then only the packet switch unit 11 is driven.

That is, the buffer reading/packet switching control unit 16*a* and the path switching control unit 16*b* are arranged to determine that link failure is brought about based on the break of the series of OAM packets if the time interval T2 for receiving the wavelength division multiplexing optical signal is counted considerably large as compared with T1 and T4. Thus, traffic restoration is effected by the optical path switch unit 10 and the packet switch unit 11 in response to the detection of the link failure. Further, the optical link break detecting unit 13*a* tends to miss the detection of the break of the wavelength division multiplexing optical signal. However, according to the above arrangement, the buffer reading/packet switching control unit 16*a* also takes a part of the link failure detection based on the break of the OAM packet series. Therefore, traffic restoration is effected not only by the optical path switch unit 10 but also by the packet switch unit 11.

In the above-described method of detecting link failure, the link failure detecting step may be arranged to include an extending step in which the period of time concerning the detection of the absence in receiving the wavelength division multiplexing optical signal in the optical link break detecting step is extended (a second extending step) and a detecting step in which if the monitoring packet is absent in being received for the predetermined period of time, then it is determined that link failure is brought about (a second detecting step).

With the above arrangement, when the step of traffic restoration is activated, the optical path switch unit 10 can be activated with the packet switch unit 11 in response to detection of link failure based on the break of the series of OAM packets. The arrangements illustrated in FIGS. 3 to 5 can be operated in the second and third embodiments and modifications thereof.

Accordingly, the photonic IP node 1 has the buffers 11*a* provided on the input side of the node. Further, the photonic IP node 1 includes a single stage of packet switches 24*a* to 24*b* having a large processing capacity and two stages of space switch units connected in a cascade fashion. With this arrangement of the photonic IP node 1, the photonic IP node 1 can cope with a great size of traffic. Moreover, if the processing capacity of the packet switches 24*a* to 24*b* is varied, then routing can be effected in accordance with the traffic size of the IP packets to be inputted. Therefore, it becomes possible to manage the photonic IP node 1 efficiently.

Further, switching of IP packets is effected not by using a packet switch circuit in which a number of switch units are connected in a multistage fashion but by using a space switch unit in which only three stages of switch units are connected. Therefore, the arrangement of the photonic node can be made small. Thus, even if a great size of traffic is imposed on the network and hence each of the photonic nodes is requested to cope with the large traffic, the photonic node will become capable of dealing with the large traffic by simply increasing the number of small-sized electric switches or switch elements provided.

Routing carried out when no trouble is brought about in the network and routing carried out for establishing traffic for recovering link failure will hereinafter be described with reference to FIGS. 7 to 9.

Figure 7:
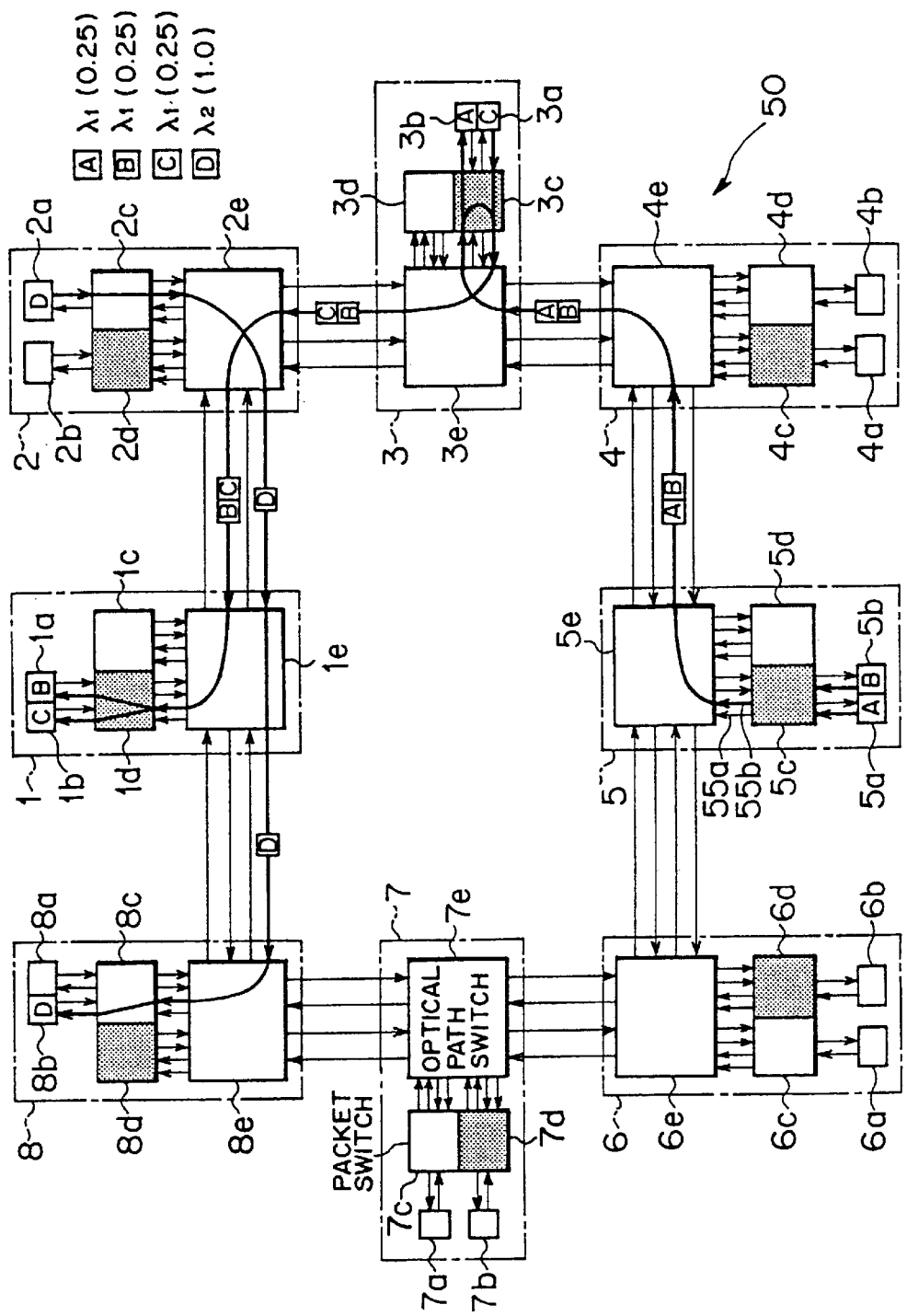
FIG. 7 is a diagram for explaining how an IP packet is transferred in an optical path network according to the first embodiment of the present invention when the network is maintained in a normal status.

FIG. 7 is a diagram for explaining how IP packets are transferred in the optical path network according to the first embodiment of the present invention when no trouble is brought about in the network. As shown in FIG. 7, an optical path network 50 is composed of photonic IP nodes 1 to 8 connected by means of optical fibers, whereby optical signals deriving from wavelength division multiplexing can be transmitted in a bidirectional fashion. Thus, traffic is established for IP packets by effecting routing operation.

The optical path network 50 is provided with a control channel. Optical path information indicating a source and a destination of each optical signal contained in the wavelength division multiplexing optical signal is transmitted through the channel. Each of the photonic IP nodes 1 to 8 can be supplied with the information through the channel. In the arrangement shown in FIG. 7, availability upon branching IP packets using wavelength λ1 is set to 0.25 and availability upon branching IP packets using wavelength λ2 is set to 1.0.

Each of the photonic IP nodes 1 to 8 has a router 1*a* to 8*a*, a router 1*b* to 8*b*, a packet switch unit 1*c* to 8*c*, a packet switch unit 1*d* to 8*d*, and an optical path switch unit 1*e* to 8*e*. In this case, the router 1*a* to 8*a* and the router 1*b* to 8*b* have the same function as that of the router 15*a*. These routers supply IP packets to the packet switch unit 1*c* to 8*c* and the packet switch 1*d* to 8*d*.

The packet switch unit 1*c* to 8*c* has the same function as that of the packet switch unit 11, and uses a wavelength of, for example, λ2. Further, the packet switch unit 1*d* to 8*d* also has the same function as that of the packet switch unit 11, and uses a wavelength of, for example, λ1. In FIG. 7, one of the block of the packet switch unit 1*c* to 8*c* and the block of the packet switch unit 1*d* to 8*d* is applied with half tone notation so that blocks of the packet switch unit 1*c* to 8*c* and the packet switch unit 1*d* to 8*d* can be distinguished from each other. The packet switch 24*a* to 24*b* (see FIG. 2) provided within the packet switch unit 1*c* to 8*c* and 1*d* to 8*d* are protected from being assigned with the same wavelength. That is, the router 1*a* to 8*a* and the router 1*b* to 8*b* use wavelengths of channels different from each other.

Further, an optical path switch unit 1*e* to 8*e* has the same function as that of the optical path switch unit 10. Therefore, these components will not be further described so as to avoid redundant explanation.

With this arrangement, when each of the photonic IP nodes 1 to 8 outputs IP packets, the node can select any one of conversion into an optical signal at the wavelength of $\lambda 1$ or conversion into an optical signal at the wavelength of $\lambda 2$. The photonic IP nodes 1 to 6 and 8 have the same arrangement as that of the photonic IP node 7. In addition, each modification of the first embodiment and each modification of the second and third embodiments also have the same arrangement.

In this case, IP packet A is routed from the photonic IP node 5 to the photonic IP node 3. IP packet B is routed from the photonic IP node 5 to the photonic IP node 1. IP packet C is routed from the photonic IP node 3 to the photonic IP node 1. And IP packet D is routed from the photonic IP node 2 to the photonic IP node 8.

If there is no trouble in the above arrangement, IP packets attached with references A, B, C and D can undergo normal routing operation by respective photonic IP nodes 1 to 8. In more detail, IP packet A is transmitted from the router 5a of the photonic IP node 5, inputted into the packet switch unit 5c, and assigned to an optical path 55b having the wavelength of $\lambda 1$. IP packet B is transmitted from the router 5b of the photonic IP node 5, inputted into the packet switch unit 5c, and assigned to the same optical path 55b having the wavelength of $\lambda 1$. IP packets A and B are further transmitted as a wavelength division multiplexing optical signal from the optical path switch unit 5e to the transmission path. The wavelength division multiplexing optical signal is received by the photonic IP node 4, passes through the optical path switch unit 4e of the photonic IP node 4, and reaches the photonic IP node 3.

In the optical path switch unit 3e of the photonic IP node 3, an IP address of IP packet A is recognized as the own node destination of the photonic IP node 3. Thus, a packet having the own node destination of the photonic IP node 3 is extracted from the received wavelength division multiplexing optical signal and undergoes routing operation of the router 3b. On the other hand, IP packet B is returned from the packet switch unit 3c, converted into an optical signal and again undergoes transmission in the network. Since IP packet C is inputted into the network from the photonic IP node 3 to the photonic IP node 1, IP packet B is outputted to the transmission path together with IP packet C.

The wavelength division multiplexing optical signal containing data of IP packets B and C generated from the photonic IP node 3 is transmitted through the photonic IP node 2 and received by the photonic IP node 1. When the received wavelength division multiplexing optical signal reaches the optical path switching unit 1e, the data of IP packets B and C are extracted from the wavelength division multiplexing optical signal. The extracted IP packets B and C undergo routing operation of the routers 1a and 1b, respectively.

IP packet D is transmitted from the router 2a of the photonic IP node 2, assigned to an optical path having the wavelength of $\lambda 2$, and outputted to the transmission path as a wavelength division multiplexing optical signal. The wavelength division multiplexing optical signal having the wavelength of $\lambda 2$ is transmitted through the photonic IP node 1 and received by the photonic IP node 8. Data of IP packet D is extracted from the wavelength division multiplexing optical signal. The extracted data undergoes routing operation of the router 8a.

In this way, the optical path layer and the packet layer contribute to the packet transmission in a cooperative manner, with the result that IP packet A and IP packet B are accommodated in the same wavelength. Accordingly, it becomes possible to reduce the necessary number of optical paths in the optical path network 50. Moreover, a plurality of optical paths can be accommodated in a single wavelength, the availability of the optical path network 50 can be improved, and the optical path network 50 can be more effectively managed.

If the network is arranged as a ring network, it becomes possible to avoid a useless loop such that the wavelength division multiplexing optical signal is once transmitted up to a photonic IP node adjacent to the location of link failure and turned back to its source or the like.

Further, if link failure is brought about in the network 50, either one or both of the optical path switching and IP packet switching are effected to restore traffic.

Figure 8:
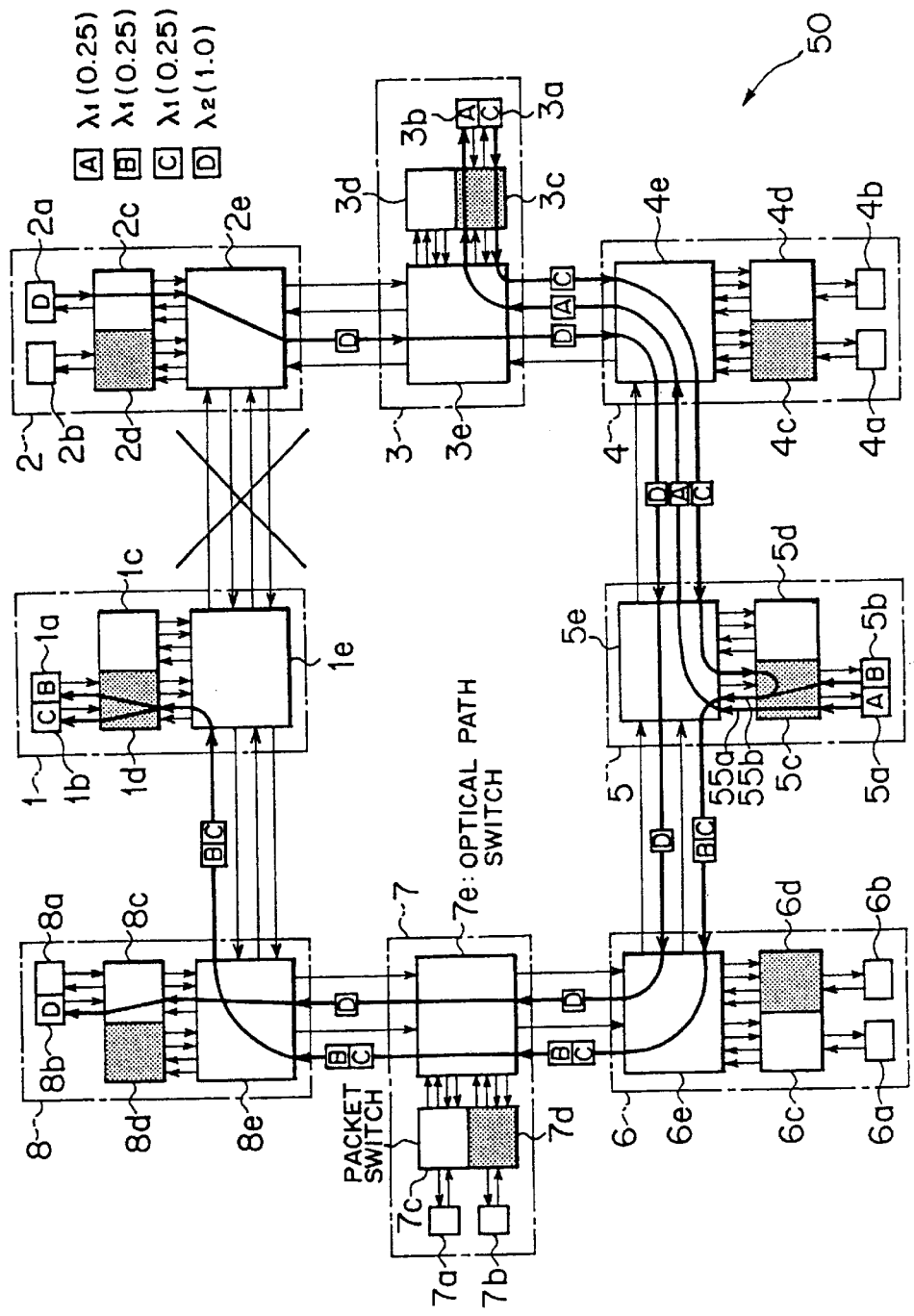
FIG. 8 is a diagram for explaining how the IP packet is transferred in the optical path network according to the first embodiment of the present invention when link failure is brought about and traffic is restored.

FIG. 8 is a diagram for explaining how IP packets are transferred upon traffic restoration for recovering link failure carried out in the optical path network according to the first embodiment of the present invention. In the figure, illustrated is how an optical path is settled after link failure is brought about in a transmission path between the photonic IP node 1 and the photonic IP node 2.

Each of the photonic IP nodes 1 to 8 has the same arrangement as those shown in FIG. 7. Further, in the optical path network 50, if link failure is brought about, the link failure can be localized and each of the photonic IP nodes 1 to 8 can be informed of the location of the link failure through the control channel. In FIG. 8, IP packet A is assigned to an optical signal having the wavelength $\lambda 1$ of which availability is set to 0.25, IP packet B is assigned to an optical signal having the wavelength $\lambda 2$ of which availability is set to 0.25, and IP packet C is assigned to an optical signal having the wavelength $\lambda 1$ of which availability is set to 0.25. The value of the availability indicates that there is still allowance for accommodating additional IP packets. Therefore, if the IP packets are outputted to the same transmission path and transmitted to any of the photonic IP nodes 1 to 8, they are accommodated in the path of the same wavelength. Thus, the optical path can be effectively utilized. IP packet D is assigned to the path of the wavelength $\lambda 2$ of which availability of 1.0. The value of the availability, 1.0 indicates that there is no allowance for accommodating additional IP packets in the same path of wavelength. Therefore, IP packet D is solely transmitted and IP packet assignment using the path of wavelength $\lambda 2$ together with IP packet D is not carried out.

Further, a number of photonic IP nodes as a destination assigned to the optical signal in the output packet processing step is extracted (node number extracting step). In this step, it is determined whether the number of the node as a destination is singular or plural. Then, at least one of the packet switching unit 11 or the wavelength path switching unit 10 is utilized for effecting switching for transferring a packet to a photonic IP node corresponding to the IP address based on the number of destination nodes determined in the node number extracting step (step of traffic restoration).

In this case, if the transmission bit rate of an IP packet to be transferred to a desired photonic IP node is equal to a transmission bit rate of one wavelength, when the IP packet to be transferred is accommodated in the wavelength, the one wavelength of the optical signal accommodating the packet is occupied. Conversely, if the transmission bit rate of the IP packet to be transferred to the desired photonic IP node is smaller than the transmission bit rate of one wavelength, the packet can be relayed by means of packet switches 1c, 1d, 8c, and 8d by sharing the same wavelength among the plurality of photonic IP nodes. Thus, a path can be settled between the photonic IP nodes as a source and destination of the packet transmission.

With the above arrangement, IP packets A, B and C undergo switching operation effected by the packet switching unit and/or the wavelength switching unit. Since IP packet D is transmitted through a path having a large availability settled, IP packet D undergoes only switching operation effected by the optical path switching unit.

IP packet A generated from the router 5*a* is transmitted in a manner which is different from the manner illustrated in FIG. 7. That is, IP packet A is assigned to the optical path 55*a* with the wavelength λ1 prepared for traffic restoration in the packet switch unit 5*a*. The wavelength division multiplexing optical signal outputted therefrom is transmitted through the photonic IP node 4 and received by the photonic IP node 3, and undergoes routing operation carried out by the router 3*b*.

On the other hand, IP packet B is assigned to the optical path 55*b* with the wavelength λ1 for traffic restoration by the router 5*b* of the photonic IP node 5. However, the optical path 55*b* has a rotation inverse to that of FIG. 7 settled to be directed to the photonic IP node 6. In this way, traffic for IP packets A and B is changed in the layer of IP packet and also changed in the optical path. Thus, the IP packets A and B are transmitted. That is, if it is determined that the number of IP nodes are plural, the optical path of the outputted optical signals is changed at the optical path processing, and also the decoded IP packet and the add-packet are assigned to different wavelength corresponding to the IP address (step of restoring traffic recovering link failure).

Further, IP packet C is accommodated in the optical signal with the wavelength λ1 so that IP packet C is transmitted from the router 3*a* of the photonic IP node 3. Thereafter, IP packet C is inputted through the photonic IP node 4 to the photonic IP node 5. IP packet C inputted into the photonic IP node 5 is once inputted to the packet switch unit 5*c*. However, since destination of IP packet C is not the photonic IP node 5, IP packet C is returned from the packet switch unit 5*c* and multiplexed in the optical signal with the wavelength λ1 together with IP packet B which is transmitted from the router 5*b*. The optical signal having IP packet B and IP packet C multiplexed therein is outputted from the photonic IP node 5. The wavelength division multiplexing optical signal containing data of IP packet B and IP packet C therein is supplied through the photonic IP nodes 7 and 8 to the photonic IP node 1. Then, the wavelength division multiplexing optical signal containing data of IP packet B and IP packet C therein is subjected to routing operation effected by the routers 1*a* and 1*b*.

As describe above, when link failure is brought about in the transmission path, it is determined whether the number of destination photonic IP node is singular or plural. If it is determined that the number of destination photonic IP nodes is singular, then the optical path of the generated optical signal is changed in the optical path processing path.

Further, as for IP packet D, it is determined that the number of the destination node is singular (i.e., only the photonic IP node 8) in the photonic IP node 2. Thus, the optical path of the outputted optical signal is changed (step of traffic restoration), with the result that IP packet D is assigned with an optical path for traffic restoration by the optical path switch unit 2*e* and transmitted through the assigned path. Thus, IP packet D is transmitted through the photonic IP nodes 3, 4, 5 and 7 and received by the photonic IP node 8. The optical path switch unit 8*e* in the photonic IP node 8 extracts IP packet D from the received wavelength division multiplexing optical signal based on the IP address. The extracted IP packet D is subjected to routing operation effected by the router 8*b*.

The following is the method of traffic restoration effected in the optical path network 50 in which a plurality of packets with IP addresses are converted into optical signals with a predetermined wavelength depending on their IP addresses and transferred to their destination. That is, the number of destination nodes of a plurality of packets which are converted into an optical signal is extracted (node number extracted step). If it is determined in the node number extracted step that the number of destination nodes is plural, then the plurality of IP packets are converted into optical signals of the same wavelength (packet switching step). On the other hand, if it is determined in the node number extracted step that the number of destination nodes is singular, then each of the IP packets is converted into an optical signal with a wavelength depending on the IP address (optical path switching step).

In this way, according to the method of the present invention, the mode of control effected in each of the photonic IP nodes constituting the network is changed depending on whether the number of destination nodes of the IP packets is singular or plural. Therefore, it becomes possible to carry out routing operation effectively.

Further, according to the above method of the present invention, each of the photonic IP nodes 1 to 8 is capable of selectively effecting the packet switching and the optical path switching when link failure is brought about in the network. Therefore, it is expected for the IP packets to be more reliably transferred in the network.

Moreover, since the optical path switching is carried out as above, the following merit can be expected. That is, if availability as viewed from data terminal equipment governed under each node is set to be low, IP packets to be transferred to a plurality of destination nodes depending on different IP addresses are accommodated in an optical signal of the same wavelength. Accordingly, necessary number of wavelengths prepared for transmission can be reduced. In addition, since a plurality of IP packets can be accommodated in a single optical path, the availability of optical path network 50 is improved and hence the network can be more effectively managed.

Furthermore, according to the method of the present invention, the packet switch unit 11 can be arranged to have an increased capacity with ease by additionally providing the buffer 11*a*. Therefore, each of the photonic IP nodes can be effectively managed in response to the fluctuation of traffic from data terminal equipment governed under the node. Which fact means that the packet switch unit 11 can be designed to have a size of minimum necessity, with the result that the optical network can be constructed at a small cost.

(A1) Description of a First Modification of the First Embodiment

According to the above-described method of traffic restoration, traffic is restored in a different manner depending on the number of destination nodes. That is, if the number of destination nodes is singular, path switching is effected by only the optical path switch unit 10. Conversely, if the number of destination nodes is plural, path switching is effected by not only the optical path switch unit 10 but also the packet switches 24*a* to 24*b*. However, the path switching may not be dependent of the operation effected by the packet switch unit 11. That is, traffic is restored by the optical path switching effected within only a section of optical path under influence of the link failure.

Figure 9:
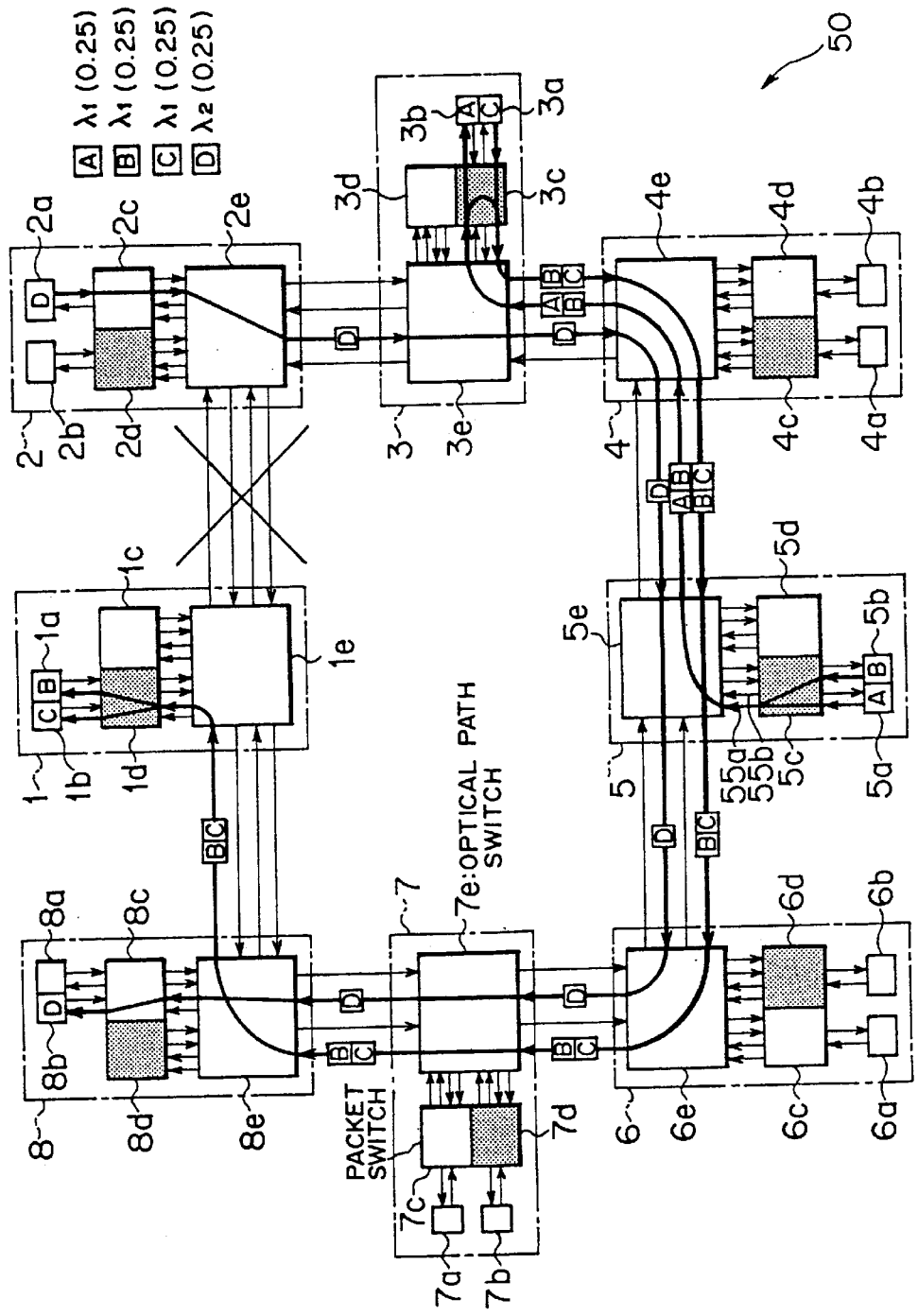
FIG. 9 is a diagram for explaining how the IP packet is transferred in the optical path network according to a first modification of the first embodiment of the present invention when link failure is brought about and traffic is restored.

FIG. 9 is a diagram for explaining how IP packets are transferred through an optical path network upon effecting traffic restoration according to a first modification of the first embodiment of the present invention. In the example illustrated in FIG. 9, traffic restoration is effected only by the optical path switching. As shown in FIG. 9, the manner for effecting routing is different from that of FIG. 8 in sections between the photonic IP nodes 3 and 4 and the photonic IP nodes 4 and 5.

The photonic IP nodes 1 to 8 have the same arrangement as those of FIG. 7. Further, each of the nodes are arranged to be informed of the location of link failure by means of a control channel. In the arrangement of FIG. 9, IP packets A to C are assigned to an optical path of a wavelength λ1 of which availability is set to 0.25. IP packet D is assigned to an optical path of a wavelength λ2 of which availability is set to 0.25.

The manner for routing the packets is as follows. That is, IP packet A is routed from the photonic IP node 5 to the photonic IP node 3. IP packet B is routed from the photonic IP node 5 to the photonic IP node 1. IP packet C is routed from the photonic IP node 3 to the photonic IP node 1. And IP packet D is routed from the photonic IP node 2 to the photonic IP node 8.

In the above arrangement, if link failure is brought about in a section between the photonic IP nodes 1 and 2, traffic restoration is carried out as follows. Initially, IP packet A generated from router 5a and IP packet B generated from the router 5b are assigned to the optical path 55a by the packet switch unit 5c, and then outputted from the optical path switch unit 5e. A wavelength division multiplexing optical signal containing data of packets A and B is transmitted through the photonic IP node 4 and received by the photonic IP node 3. In the photonic IP node 3, received IP packet A is subjected to routing operation effected by the router 3b. That is, not only IP packet A but also IP packet B are subjected to wavelength switching effected in the optical path switching unit 3e and outputted therefrom.

Of IP packet A and IP packet B received by the router 3b, IP packet A is extracted from the wavelength division multiplexing optical signal, with the result that the optical path of wavelength λ1 comes to have a vacancy which has been occupied so far by IP packet A. Thus, the router 3b outputs IP packet C into the packet switching unit 3c, and the packet switching unit 3c generates a wavelength division multiplexing optical signal containing data of IP packets B and C.

The wavelength division multiplexing optical signal generated from the packet switching unit 3c is sent back through the photonic IP nodes 4, 5, 6, 7, and 8 to the photonic IP node 1. In the optical path switch unit 1e of the photonic IP node 1, data of IP packets B and C are extracted from the wavelength division multiplexing optical signal. Then, IP packets B and C undergo routing operation carried out by the routers 1a and 1b, respectively.

IP packet D is transmitted in a manner similar to that shown in FIG. 8. That is, IP packet D is generated from the photonic IP node 2 as a wavelength division multiplexing optical signal containing data of IP packet D, transmitted through the photonic IP nodes 3, 4, 5, 6, 7 and received by the photonic IP node 8.

In this way, if link failure is brought about in the network, each of the photonic IP nodes 1 to 8 carries out optical path switching for assigning IP packets to be transmitted to respective optical paths. Therefore, IP packets transmitted from any of the photonic IP nodes 1 to 8 can be subjected to a satisfactory routing operation. Further, traffic establishment is carried out without useless loop back which tends to occur in a ring-like network.

Even if a path is settled so as to pass through the packet switches 1a to 8a and link failure is brought about in such a path, traffic can be restored simply by changing the optical path settled within the section including the link failure.

Since optical path switching is carried out as described above, if availability of each node as viewed from data terminal equipment governed under the node is low, a plurality of IP packets to be transferred to a plurality of IP nodes assigned to the same transmission path can be accommodated in the same optical path. Therefore, in addition to the above-mentioned advantage that traffic can be restored simply by changing the optical path, required number of wavelengths can be reduced. Moreover, since a plurality of optical paths can be accommodated in a single optical path, availability of the optical path network 50 can be improved, and hence the network can be effectively managed.

According to the method of the present invention, the packet switch unit 11 can be arranged to have an increased capacity with ease by additionally providing the buffer 11a. Therefore, each of the photonic IP nodes can be made small and effectively managed in response to the fluctuation of traffic from data terminal equipment governed under the node.

Further, according to the above arrangement, traffic restoration can be effected by not only the optical path switching but also IP packet switching. Therefore, smaller number of wavelengths are requested to be prepared in the optical path network 50. Thus, the optical transmission system becomes more allowable in dealing with a lot of traffic and capable of providing high performance.

Figure 10:
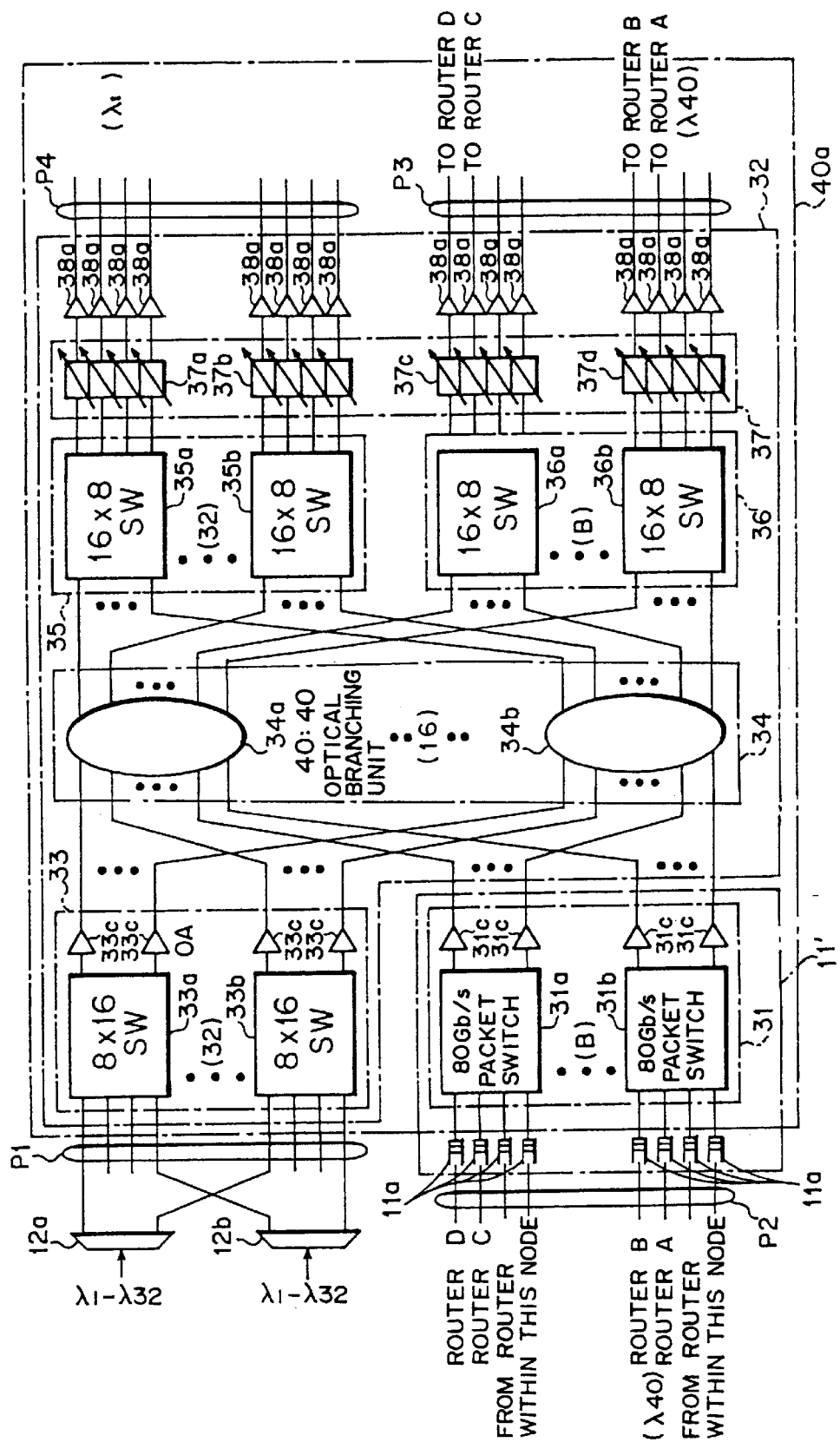
FIG. 10 is a diagram showing an arrangement of the space switch unit according to a second modification of the first embodiment of the present invention.

(A2) Description of a Second Modification of the First Embodiment of the Present Invention The above space switch unit 40 may employ arrangement different from what is described above. FIG. 10 is an arrangement of a space switch unit 40a according to the second modification of the first embodiment of the present invention. The space switch unit 40a shown in FIG. 10 has a first input port P1, a second input port P2, a first output port P3 and a second output port P4. A wavelength division multiplexing optical signal composed of optical signals of different wavelengths assigned to respective packets depending on each IP address and an add-packet having a destination address of another node, are supplied to the space switch unit 40 at the two input ports, respectively. An optical signal of which destination is the photonic IP node 1 is extracted from the wavelength division multiplexing optical signal. The extracted signal is outputted from the first output port P3 as an optical signal to be dropped. An optical signal having another node destination contained in the wavelength division multiplexing optical signal and an optical signal containing data of an add-packet having anther node address are multiplexed with each other and generated from the second output port P4.

The space switch unit 40a is composed of an optical path switch unit 32 and a packet switch unit 11'. The optical path switch unit 32 is arranged to have a second packet switch 31, a fifth space switch 33, an optical branching unit 34, a sixth space switch 35, a seventh space switch 36, a wavelength selecting unit 37, and a plurality of optical amplifiers 38a.

The second packet switch 31 is arranged to include eight packet switches 31a to 31b and a plurality of optical amplifiers 31c. The packet switches 31a to 31b are utilized for changing connection of optical paths of optical signals. Each of the packet switches 31a to 31b has eight input ports to which an add-packet and an IP packet deriving from the decoding of an optical signal to be dropped are supplied. Each of the packet switches 31a to 31b also has 16 output ports from which optical signals assigned with a predetermined wavelength in accordance with the IP address are generated. Further, each of the packet switches 31a to 31b is formed of a switching unit which is capable of processing input traffic of 80 Gbps at maximum. Thus, the second packet switch 31 is capable of processing input traffic of 640 Gbps in total.

The optical amplifier 31c is an element for amplifying an optical signal outputted from the packet switches 31a to 31b.

The fifth space switch 33 is formed of thirty two 8×16 switches 33a to 33b and a plurality of optical amplifiers 33c. Each of the 8×16 switches has eight input ports to which a wavelength division multiplexing optical signal is inputted and 16 output ports from which a branched optical signal having the same wavelength is outputted. Further, each of the optical amplifiers 33c is an element for amplifying an optical signal outputted therefrom.

The optical branching unit 34 is formed of 16 photocouplers 34a to 34b. These photocouplers 34a to 34b are utilized for mixing the eight optical signals outputted from the packet switches 31a to 31b of the second packet switch 31 and a bundle of 32 optical signals outputted from 8×16 switches 33a to 33b through the optical amplifiers 33c. Further, the photocouplers 34a to 34b branch into 40 signal flows, the optical signals deriving from the wavelength multiplexing owing to the mixing.

The sixth space switch 35 is formed of thirty two 16×8 switches 35a to 35b. Each of the 16×8 switches 35a to 35b has 16 input ports to which a wavelength division multiplexing optical signal deriving from mixing outputted from the optical branching unit 34 is inputted and eight output ports from which the wavelength division multiplexing optical signal deriving from the mixing of the signals inputted from the 16 input ports thereof is outputted under a state of wavelength division multiplexing.

Similarly, the seventh space switch 36 is formed of eight 16×8 switches 36a to 36b. Each of the 16×8 switches 36a to 36b has 16 input ports to which a wavelength division multiplexing optical signal deriving from mixing outputted from the optical branching unit 34 is inputted and eight output ports from which the wavelength division multiplexing optical signal deriving from the mixing of the signals inputted from the 16 input ports thereof is outputted under a state of wavelength division multiplexing.

Each of the 8×16 switches 33a to 33b and the 16×8 switches 36a to 36b is formed of a unit switch 92 which has been described with reference to FIGS. 6(a) to 6(c). Therefore, they will not be further described.

The wavelength selecting unit 37 is formed of 256 (32×8) optical filters 37a to 37d. Each of the 256 optical filters 37a to 37d is supplied with an optical signal sent from the sixth space switch 35 and an optical signal sent from the seventh space switch 36. Upon receiving the optical signal sent from the sixth space switch 35 and the optical signal sent from the seventh space switch 36, each of the 256 optical filters 37a to 37d selects an optical signal having a predetermined wavelength contained in these optical signals and outputs the selected optical signal. The optical filter 37a to 37d is arranged to effect filtering so that a selected one wavelength is allowed to pass through the filter. Further, each of a plurality of optical amplifiers 38a is an optical amplifier for amplifying an optical signal.

As described above, the photonic IP node 1 is arranged to have a switching capacity of 2.56 Tbps, in the case of transmission bit rate of 10 Gbps. Further, the photonic IP node 1 is arranged as a multistage switch circuit network composed of the space switches (the fifth space switch 33, the sixth space switch 35 and the seventh space switch 36), the photocouplers 34a to 34b, and the optical filters 37a to 37d.

The packet switches 31a to 31b are controlled by the buffer reading/packet switching control unit 16a (see FIG. 1). Other switches are controlled by the path switching control unit 16b. Thus, these switches can be controlled so as to respond to various commands.

The branching units 21a and 21b and the optical amplifiers 38a have the same arrangement as those of the above-introduced one. Therefore, they will not be further described.

With the above arrangement, flow of signals inputted at the first input port P1 of the space switch unit 40a shown in FIG. 10 becomes as follows. Initially, a wavelength division multiplexing optical signal transmitted to the node through the transmission path is inputted through the optical branching unit 21a to the 8×16 switch 33a of the fifth space switch 33. Of the optical signals inputted to the 8×16 switch 33a, an optical signal with the own node destination and an optical signal with the other node (not shown) destination are independently extracted in accordance with the wavelength of the optical signals. That is, the optical signal with the own node destination is led to the seventh space switch 36 and outputted from the first output port P3 as a signal to be dropped. On the other hand, the optical signal with the other node destination is led to the sixth space switch 35 and again outputted from the second output port P4 to another node.

The optical signal outputted from the 16×8 switch 35a of the sixth space switch 35 and the optical signal outputted from the 16×8 switch 36a of the seventh space switch 36 are subjected to a filtering operation in the respective optical filters 37a of the wavelength selecting unit 37. The optical signals having undergone the filtering operation are amplified by the optical amplifiers 38a and outputted therefrom.

Of the optical signals outputted from the optical amplifiers 38a, signals outputted from the optical filters 37a to 37b are subjected to wavelength division multiplexing operation, outputted from the second output port P4 and mixed together in the multiplexing unit 21c and 21d (see FIG. 1).

On the other hand, of the optical signals outputted from the optical amplifiers 38a, signals outputted from the optical filters 37c to 37d are subjected to wavelength division multiplexing operation, and outputted from the first output port P3 as a signal to be dropped. The optical signals dropped from the first output port P3 are converted into IP packets as an electric signal by a photoelectric converter (not shown).

Further, some of optical signals outputted from the 16×8 switch 36a of the seventh space switch 36 (attached with "to router C", or "to router D") are sent to an input port of the packet switch 31a of the second packet switch 31. Some other optical signals outputted from the 16×8 switch 36b of the seventh space switch 36 (attached with "to router A", or "to router B") are sent to an input port of the packet switch 31b of the second packet switch 31.

As described above, the output signals of the packet switches 31a to 31b are optical signals. Further, the optical path switch unit 32 and the packet switch units 31a to 31b are integrally formed in the space switch unit 40, the size of the photonic IP node 1 can be made small.

Moreover, of the 8×16 switches 33a to 33b and 31a to 31b constituting the first stage switch unit, the buffers 11a are added to the eight input port. Therefore, the buffers 11a to be additionally provided to a necessary portion of the space switch can be limited to a necessary number, with the result that the photonic IP node 1 can be managed in response to the fluctuation of the required traffic.

Further, the packet switch units 31a to 31b are integrally formed in the optical path switch unit 10 which is formed of a multistage connection circuit network, the size of the apparatus can be more simplified.

Further, if availability as viewed from data terminal equipment governed under the node stays low, a plurality of IP packets can be accommodated in a single optical path. Therefore, the number of wavelengths to be prepared in the network can be reduced, and the optical path network 50 can be more effectively utilized, with the result that the transmission system can be more effectively managed.

Figure 11:
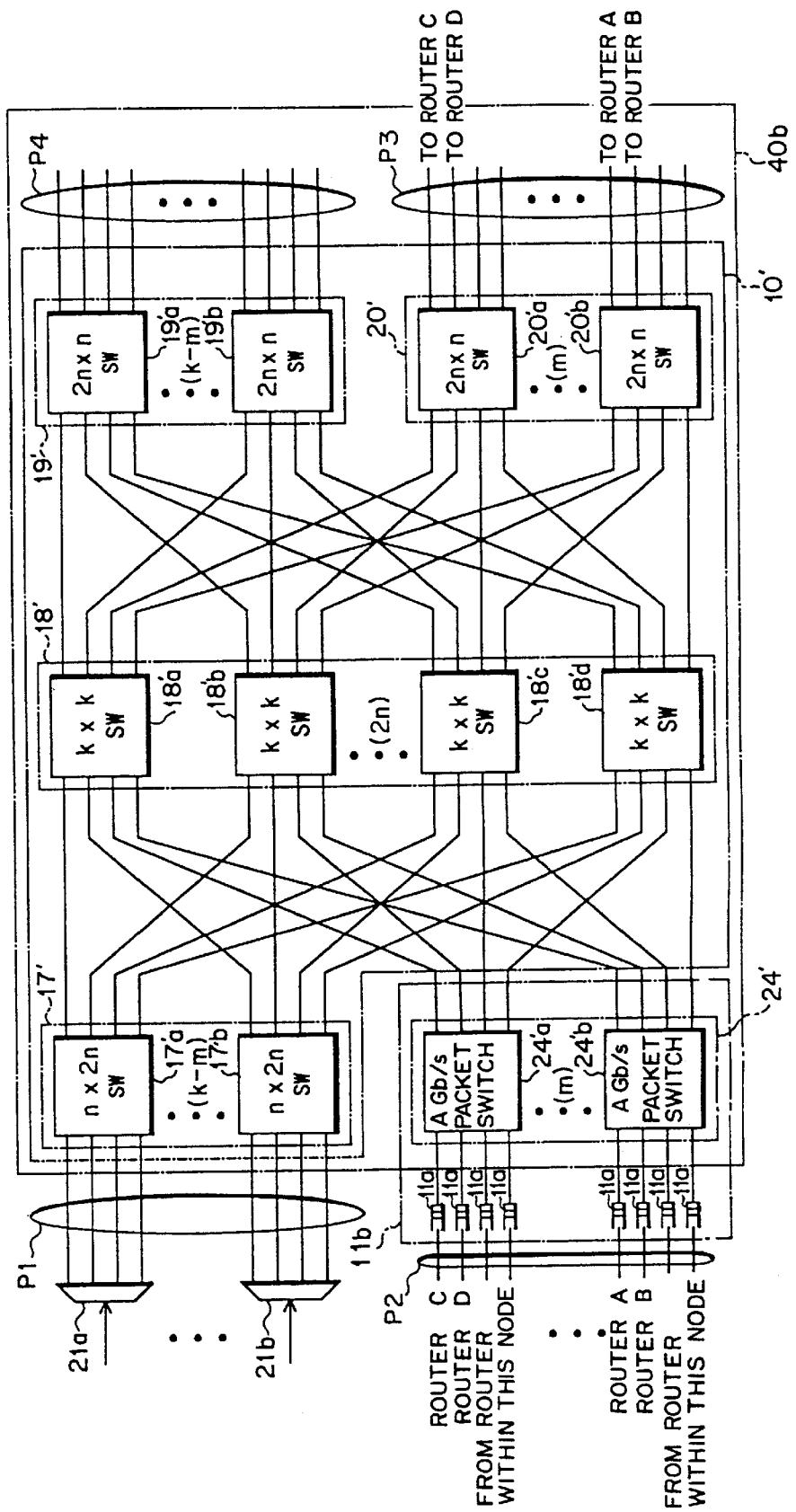
FIG. 11 is a diagram showing an arrangement of the space switch unit according to a third modification of the first embodiment of the present invention.

(A3) Description of a Third Modification of the First Embodiment of the Present Invention While in the first embodiment described so far the space switch unit 40 is arranged to have a specified number of switches, the number of switches constituting the space switch unit 40 may be arbitrary determined. FIG. 11 is a diagram showing an arrangement of the space switch unit 40b according to a third modification of the first embodiment of the present invention. The space switch unit 40b shown in FIG. 11 is a unit for effecting cross-connect operation on optical signals having a plurality of wavelengths by using a switch circuit network in which three-stage space switches are connected in a cascade fashion. The space switch unit 40b includes a first packet switch 24', a first space switch 17', a second space switch 18', a third space switch 19', and a fourth space switch 20'.

The first packet switch 24' is formed of m (m is an integer) packet switches 24' each having an input port to which an add-packet and an IP packet deriving from decoding an optical signal to be dropped are inputted and an output port from which an optical signal assigned with a predetermined wavelength in accordance with the IP address of the packet is outputted. Further, the packet switch unit 11b includes a plurality of buffers 11a and a first packet switch 24'. Thus, the packet switch unit 11b can function similarly to the above-described packet switch unit 11.

The first space switch 17' is formed of k–m (k and m are integers) n×2n switches 17'a to 17'b each having n input ports to which an optical signal having one of a plurality of different wavelengths contained in a wavelength division multiplexing optical signal is inputted and 2n output ports from which an optical signal having a wavelength same as the one of a plurality of different wavelengths is outputted.

The second space switch 18' is formed of 2n k×k switches 18'a, 18'b to 18'c, 18'd each having k input ports to which an optical signal from the first packet switch 24' and an optical signal from the first space switch 17' are inputted and k output ports from which an optical signal selected from the optical signals inputted at the k input ports and branched in a predetermined manner is outputted.

The third space switch 19' is formed of k–m 2n×n switches 19'a to 19'b each having 2n input ports to which an optical signal from the second space switch 18' is inputted and n output ports from which an optical signal selected from the optical signals inputted at the 2n input ports depending on the wavelength is outputted.

The fourth space switch 20' is formed of m 2n×n switches 20'a to 20'b each having 2n input ports to which an optical signal from the second space switch 18' is inputted and n output ports from which an optical signal selected from the optical signals inputted at the 2n input ports depending on the wavelength is outputted. Further, m packet switches may be used in place of the m space switches.

Each element of the space switches is formed of the unit switch 92 which is described with reference to FIGS. 6(*a*) to 6(*c*). Therefore, further description will be omitted.

In the arrangement shown in FIG. 11, flow of optical signals supplied thereto at the first input port P1 becomes as follows. Initially, a wavelength division multiplexing optical signal is supplied from the transmission path through the branching unit 21a to each of the n×2n switches 17'a of the first space switch 17'. Of the optical signals inputted to the n×2n switches 17'a, an optical signal with the own destination and an optical signal with the other node (not shown) destination are independently extracted in accordance with the wavelength of the optical signal. The optical signal with the own node destination is led to the fourth space switch 20' and dropped from the first output port P3. The optical signal with another node destination is led to the third space switch 19' and again transmitted to another node from the second output port P4.

In a similar manner, of the optical signals inputted to the n×2n switches 17'b, an optical signal with the own destination and an optical signal with the other node destination are independently extracted in accordance with the wavelength of the optical signal. The optical signal with the own node destination is led to the fourth space switch 20' and dropped from the first output port P3. The optical signal with another node destination is led to the third space switch 19' and again transmitted to another node from the second output port P4.

The optical signals led by the k×k switches 18'a, 18'b to 18'c, 18'd of the second space switch 18' are supplied to the 2n×n switches 19'a of the third space switch 19'. These supplied optical signals are multiplexed and outputted from the second output port P4. Thus, the optical signals are mixed by the mixing unit 21c.

Conversely, the optical signals led by the k×k switches 18'a, 18'b to 18'c, 18'd of the second space switch 18' to the 2n×n switches 20'a of the fourth space switch 20' are multiplexed and dropped from the first output port P3. These dropped optical signals are converted into IP packets as an electric signal by a photoelectric converter (not shown). The converted IP packets are generated therefrom.

With the above arrangement, routing for IP packets upon normal status mode and traffic restoration mode is effected in a manner that is described in the above first embodiment.

In this way, optical signals outputted from the output port of the packet switches 24'a to 24'b are led to the input port of the optical path switch unit 10'. Which fact means that the optical path switch unit 10' and the packet switches 24'a to 24'b are integrated. Therefore, the photonic IP node 1 can be made small.

Further, if availability as viewed from data terminal equipment governed under the node stays low, a plurality of IP packets can be accommodated in a single optical path. Therefore, the number of wavelengths to be prepared in the network can be reduced, and the optical path network 50 can be more effectively utilized, with the result that the transmission system can be more effectively managed.

(A4) Description of a Fourth Modification of the First Embodiment of the Present Invention The space switch unit 40a of the second modification can be further generalized.

Figure 12:
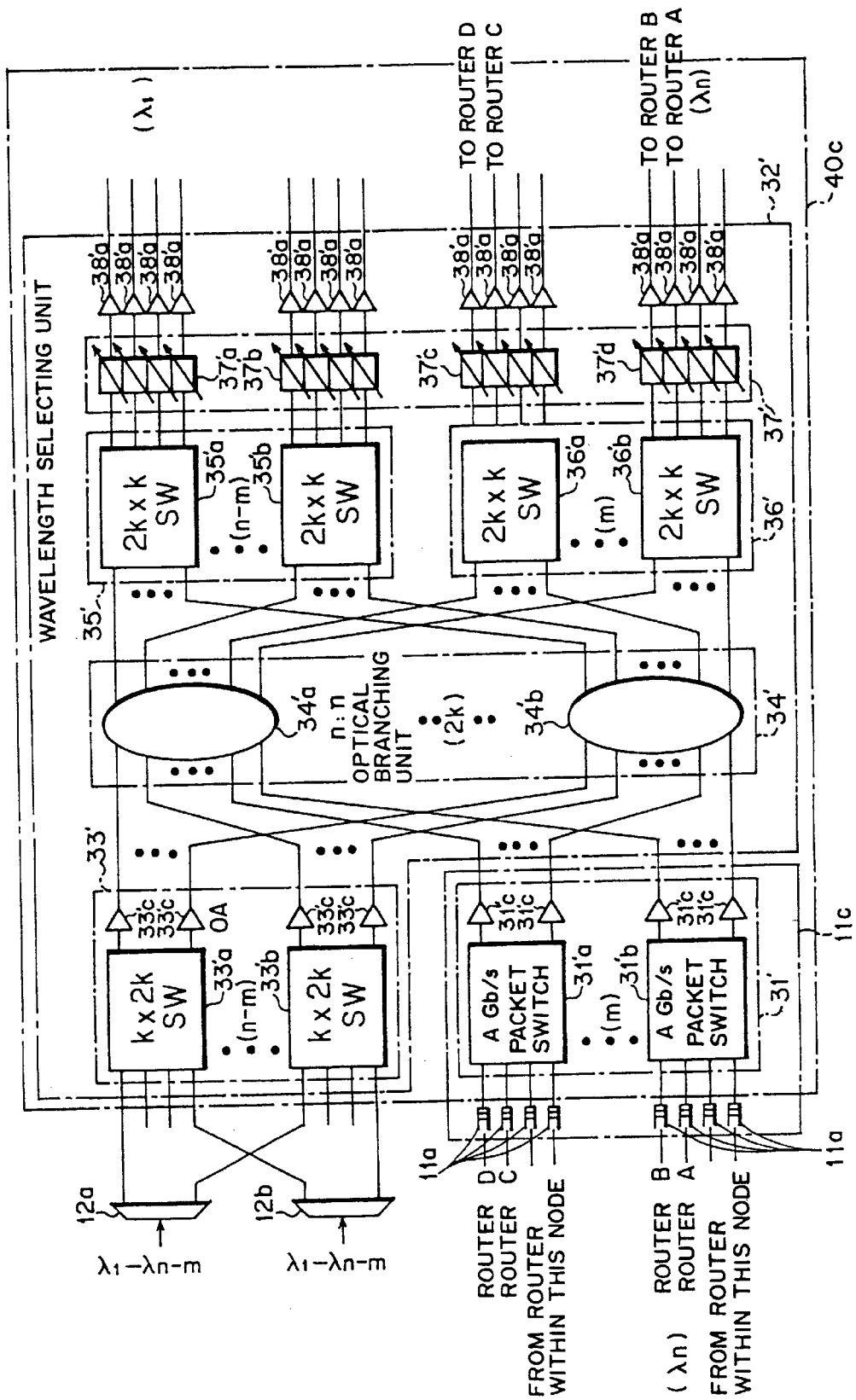
FIG. 12 is a diagram showing an arrangement of the space switch unit according to a fourth modification of the first embodiment of the present invention.

FIG. 12 is an arrangement of a space switch unit 40c according to the fourth modification of the first embodiment of the present invention. The space switch unit 40c shown in FIG. 12 has a first input port P1, a second input port P2, a first output port P3 and a second output port P4. A wavelength division multiplexing optical signal composed of optical signals of different wavelengths assigned to respective packets depending on each IP address and an add-packet having a destination address of another node, are supplied to the space switch unit 40c at the two input ports, respectively. An optical signal of which destination is the photonic IP node 1 is extracted from the wavelength division multiplexing optical signal, and the extracted signal is outputted from the first output port P3 as an optical signal to be dropped. An optical signal having another node destination contained in the wavelength division multiplexing optical signal and an optical signal containing data of an add-packet having another node address are multiplexed together and generated from the second output port P4.

The optical path switch unit 32' is arranged to have a second packet switch 31', a fifth space switch 33', an optical branching unit 34', a sixth space switch 35', a seventh space switch 36', a wavelength selecting unit 37', and a plurality of optical amplifiers 38'a. Thus, the optical path switch unit 32' has a function similar to that of the above-described optical path switch unit 32. Further, the packet switch unit 11c is arranged to include a plurality of buffers 11a and a second packet switch 31', whereby the packet switch unit 11c functions similarly to the packet switch unit 11.

The second packet switch 31' is formed of m (m is an integer) packet switches 31'a, to 31'b each having k (k is an integer) input ports to which an add-packet and an IP packet deriving from decoding an optical signal to be dropped are inputted and 2k output ports from which an optical signal assigned to a predetermined wavelength in accordance with the IP address. Further, the second packet switch 31' includes a plurality of optical amplifiers 31'c for amplifying an optical signal outputted from packet switches 31'a to 31'b.

The fifth space switch 33' is formed of n-m (n is an integer) k×2k switches 33'a to 33'b each having k input ports to which a wavelength division multiplexing optical signal is inputted and 2k output ports from which a branched optical signal having the same wavelength is outputted. Further, the second packet switch 33' includes a plurality of optical amplifiers 33'c for amplifying an optical signal outputted from packet switches 33'a to 33'b.

The optical branching unit 34' is formed of 2k photocouplers 34'a to 34'b. These photocouplers 34'a to 34'b are utilized for mixing the m optical signals outputted from the packet switches 31'a to 31'b of the second packet switch 31' and n-m optical signals outputted from k×2k switches 33'a to 33'b of the second packet switch 33'a through the optical amplifiers 31'c and 33'c. Further, the photocouplers 34'a to 34'b branch the optical signals deriving from the wavelength multiplexing owing to the mixing into n branched signal flow.

The sixth space switch 35' is formed of n-m 2k×k switches 35'a to 35'b each having 2k input ports to which a wavelength division multiplexing optical signal deriving from mixing outputted from the optical branching unit 34' is inputted and k output ports from which the wavelength division multiplexing optical signal deriving from the mixing of the signals inputted from the 2k input ports thereof is outputted under a state of wavelength division multiplexing.

The seventh space switch 36' is formed of m 2k×k switches 36'a to 36'b each having 2k input ports to which a wavelength division multiplexing optical signal deriving from mixing outputted from the optical branching unit 34' is inputted and k output ports from which the wavelength division multiplexing optical signal deriving from the mixing of the signals inputted from the 2k input ports thereof is outputted under a state of wavelength division multiplexing.

Each of the space switch is formed of a unit switch 92 which has been described with reference to FIGS. 6(a) to 6(c). Therefore, they will not be further described.

The wavelength selecting unit 37' is formed of n×k optical filters 37'a to 37'd each being supplied with an optical signal sent from the sixth space switch 35' and an optical signal sent from the seventh space switch 36'. When the optical signal sent from the sixth space switch 35' and the optical signal sent from the seventh space switch 36' are received, each of the n×k optical filters 37'a to 37'd selects an optical signal having a predetermined wavelength contained in these optical signals and outputs the selected optical signal.

Further, each of a plurality of optical amplifiers 38'a is an optical amplifier for amplifying an optical signal outputted from the n×k optical filters 37'a to 37'd of the wavelength selecting unit 37'.

With the above arrangement, flow of signals inputted at the first input port P1 of the space switch unit 40c shown in FIG. 12 becomes as follows. Initially, a wavelength division multiplexing optical signal transmitted to the node through the transmission path is inputted through the optical branching unit 21a to the k×2k switch 33'a of the fifth space switch 33'. Of the optical signals inputted to the k×2k switch 33'a, an optical signal with the own node destination and an optical signal with the other node (not shown) destination are independently extracted in accordance with the wavelength of the optical signals.

The optical signal with the own node destination is led to the seventh space switch 36' and dropped from the first output port P3. On the other hand, the optical signal with the other node destination is led to the sixth space switch 35' and again outputted from the second output port P4 to another node.

The optical signal outputted from the 2k×k switch 35'a of the sixth space switch 35' and the optical signal outputted from the 2k×k switch 36'a of the seventh space switch 36' are subjected to a filtering operation in the respective optical filters 37'a to 37'd of the wavelength selecting unit 37'. The optical signals having undergone the filtering operation are amplified by the optical amplifiers 38'a and outputted therefrom. Of the optical signals outputted from the optical amplifiers 38'a, signals outputted on the output side of the sixth space switch 35' are subjected to wavelength division multiplexing operation, outputted from the second output port P4 and mixed together in the multiplexing unit 21c (see FIG. 1).

On the other hand, the optical signals outputted from the seventh space switch 36' are subjected to wavelength division multiplexing operation, and outputted from the first output port P3 as a signal to be dropped. The optical signals dropped from the first output port P3 are converted into IP packets as an electric signal by a photoelectric converter (not shown).

With the above arrangement, routing for IP packets upon normal status mode and traffic restoration mode is effected in a manner that is described in the above first embodiment.

In this way, optical signals outputted from the output port of the packet switches 31'a to 31'b are arranged as an optical path. Thus, the optical path switch unit 32' and the packet switches 31'a to 31'b are integrated. Therefore, the photonic IP node 1 can be made small.

Further, if availability as viewed from data terminal equipment governed under the node stays low, a plurality of IP packets can be accommodated in a single optical path. Therefore, the number of wavelengths to be prepared in the network can be reduced, and the optical path network 50 can be more effectively utilized, with the result that the transmission system can be more effectively managed.

(B) Description of a Second Embodiment of the Present Invention

While the optical path network 50 introduced for describing the first embodiment of the present invention is a ring-like one, the present invention is applicable even if the optical path network 50 is arranged as a mesh-like form.

Figure 13:
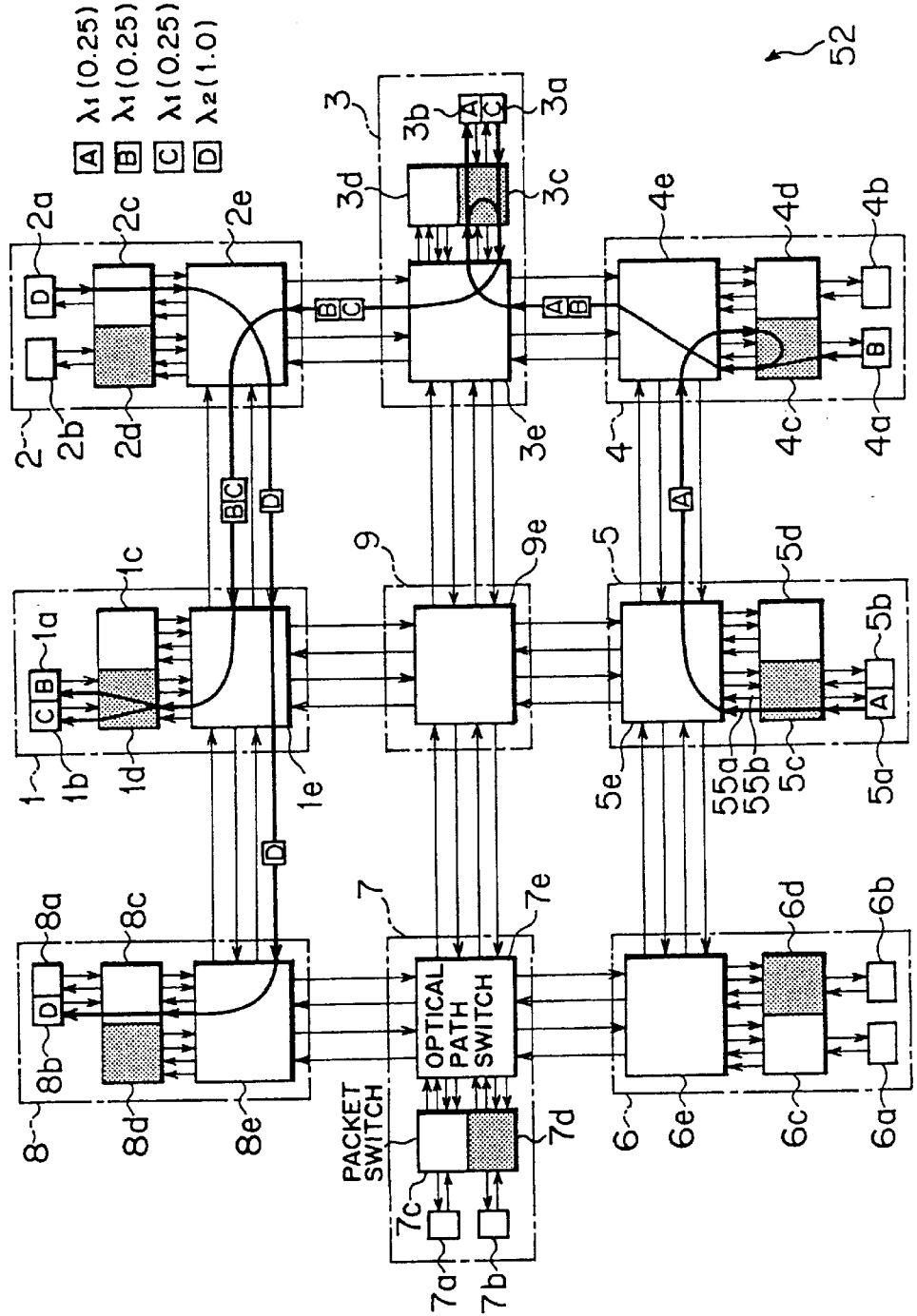
FIG. 13 is a diagram for explaining how the IP packet is transferred in an optical path network according to a second embodiment of the present invention when the network is maintained in a normal status.

FIG. 13 is a diagram for explaining how IP packets are transferred in the optical path network arranged as a mesh-like form according to the second embodiment of the present invention when no trouble is brought about in the network. As shown in FIG. 13, an optical path network 52 is composed of photonic IP nodes 1 to 9 which are connected so as to form a mesh-like network. In the network, optical signals deriving from wavelength division multiplexing can be transmitted in a bidirectional fashion. Further, the photonic IP nodes 1 to 9 are connected to one another so that a bidirectional optical path is established among the nodes. Thus, routing is effected for IP packets.

The photonic IP nodes 1 to 8 illustrated in FIG. 13 are the same as those introduced in the description of the first embodiment. The photonic IP node 9 illustrated in FIG. 13 is arranged to include, in addition to an optical path switch unit 9e, routers 9a and 9b and packet switch units 9c and 9d (not shown). The routers of the photonic IP node 9 are the same as the router 15a which is introduced in the description of the first embodiment. The packet switch units 9a and 9b of the photonic IP node 9 are the same as the packet switch unit 11 which is introduced in the description of the first embodiment. And the optical path switch unit 9e is the same as the optical path switch unit 10 which is introduced in the description of the first embodiment. Therefore, these components will not be described. In addition, other components illustrated in FIG. 13 attached with the same reference numerals as those of the above-described components have the same functions, respectively. Therefore, these components also will not be described.

Similarly to the first embodiment, the optical path network 52 is provided with a control channel through which optical path information is transmitted. Each of the photonic IP nodes 1 to 9 can be supplied with the information through the channel. In the arrangement shown in FIG. 13, availability upon branching IP packets using wavelength $\lambda 1$ is set to 0.25 and availability upon branching IP packets using wavelength $\lambda 2$ is set to 1.0.

In the network composed of the photonic IP nodes 1 to 9, IP packet A is routed from the photonic IP node 5 to the photonic IP node 3. IP packet B is routed from the photonic IP node 4 to the photonic IP node 1. IP packet C is routed from the photonic IP node 3 to the photonic IP node 1. And IP packet D is routed from the photonic IP node 2 to the photonic IP node 8.

If there is no trouble in the above arrangement, IP packets attached with reverences A, B, C and D can undergo normal routing operation by respective photonic IP nodes. In more detail, IP packet A is transmitted from the router 5a of the photonic IP node 5, inputted into the packet switch unit 5c, and assigned to an optical path 55a having the wavelength of $\lambda 1$ and transmitted through the transmission path as a wavelength division multiplexing optical signal. The wavelength division multiplexing optical signal is determined as a signal with other node destination in the optical path switch unit 4e of the photonic IP node 4. At this time, since the router 4a of the photonic IP node 4 transmits IP packet B, IP packet B is assigned to an optical signal having a wavelength of $\lambda 1$ together with IP packet A by the optical path switch unit 4e. The optical signal assigned with IP packet A and IP packet B is again outputted to the transmission network, i.e., packet switching is carried out. When the optical signal assigned with IP packet A and IP packet B reaches the photonic IP node 3, IP packet A is extracted.

Since the optical signal releases IP packet A, making the signal have a capacity to accommodate another packet, IP packet C supplied from the router 3a of the photonic IP node 3 is accommodated in the optical signal by the optical path switch unit 3e. Thereafter, the wavelength division multiplexing optical signal containing data of IP packet B and IP packet C is again outputted to the transmission path. The wavelength division multiplexing optical signal containing data of IP packet B and IP packet C is transmitted through the photonic IP node 2 and received by the photonic IP node 1. When the wavelength division multiplexing optical signal containing data of IP packet B and IP packet C is received by the photonic IP node 1, IP packet B and IP packet C are extracted from the wavelength division multiplexing optical signal by the optical path switch unit 1e of the photonic IP node 1, and supplied to the routers 1a and 1b, respectively.

IP packet D is transmitted from the router 2a of the photonic IP node 2, assigned to an optical path having the wavelength of $\lambda 2$ by the packet switch unit 2e, and outputted to the transmission path as a wavelength division multiplexing optical signal. The wavelength division multiplexing optical signal is transmitted through the photonic IP node 1 and received by the photonic IP node 8. Data of IP packet D is extracted from the wavelength division multiplexing optical signal by the optical path switch unit 8e of the photonic IP node 8. Thus, IP packet D undergoes routing operation of the router 8a.

In this way, if availability as viewed from data terminal equipment governed under the node is set to be low, IP packet switching is carried out by using the settled optical path. Thus, routing for IP packets can be satisfactorily carried out in the above mesh-like network. Further, when a packet is transmitted between the photonic IP nodes 3 and 4, nodes 2 and 3, or nodes 1 and 2, two IP packets can be accommodated in an optical signal of a single wavelength. Accordingly, it becomes possible to reduce the necessary number of optical paths in the optical path network 52. Moreover, the availability of the optical path network 52 can be improved, and the optical path network 52 can be more effectively managed.

Conversely, if link failure is brought about in the optical path network 52, both of the optical path switching and the packet switching are carried out to effect traffic restoration. Further, if the transmission bit rate of the IP packet to be transmitted to a desired photonic IP node is smaller than the transmission bit rate of one optical path, the wavelength is shared by a plurality of photonic IP nodes, with the result that the packet can be relayed by the packet switches 1c, 1d, to 9c, 9d. Thus, a path connecting between a source photonic IP node and a destination photonic IP node can be established.

Figure 14:
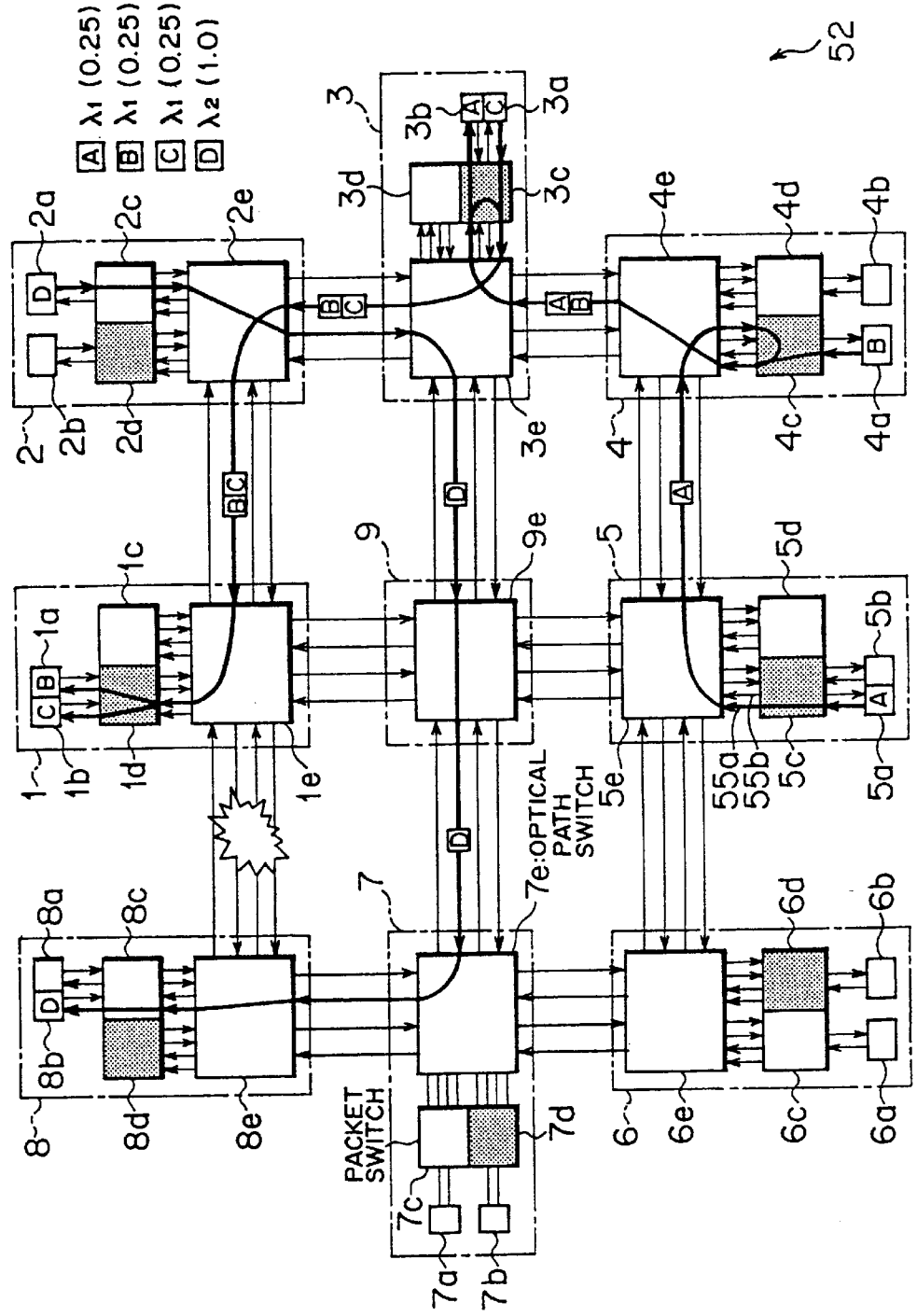
FIG. 14 is a diagram for explaining how the IP packet is transferred in the optical path network according to the second embodiment of the present invention when link failure is brought about and traffic is restored.

FIG. 14 is a diagram for explaining how IP packets are transferred upon traffic restoration in the optical path network according to the second embodiment of the present invention. As shown in FIG. 14, it is assumed that link failure is brought about in a transmission path between the photonic IP node 1 and the photonic IP node 2. An optical path is established for recovering the link failure as illustrated in FIG. 14. The photonic IP nodes constituting the optical path network 52 are arranged to be connected with input/output transmission paths capable of transmitting optical signals so as to form a mesh-like network.

Components illustrated in FIG. 14 attached with the same reference numerals as those of the components of the above-described embodiment have the same arrangements or same functions, respectively. Therefore, these components will not be further described. Further, similarly to the already described embodiment, each of the photonic IP nodes 1 to 9 is arranged to be supplied with wavelength information. In the arrangement shown in FIG. 14, availability upon branching IP packets using wavelength $\lambda 1$ is set to 0.25 and availability upon branching IP packets using wavelength $\lambda 2$ is set to 1.0.

According to the situation illustrated in FIG. 14, only IP packet D is influenced from the link failure. Thus, IP packets A, B and C are transmitted through the same paths as those illustrated in FIG. 13.

Traffic restoration for recovering link failure is carried out by effecting optical path switching in the above network. With regard to IP packets A, B and C, traffic restoration is effected by not only optical path switching but also packet switching. Conversely, as for IP packet D, only optical path switching is effected because availability for the packet is large. In this case, IP packet D is generated from the router 2a of the photonic IP node 2, and assigned to an optical signal of a wavelength λ2 by the packet switch unit 2e. A resulting wavelength division multiplexing optical signal resulting therefrom is transmitted through the network. Thus, the optical path switching is effected by changing wholly the optical path through which IP packet D is transmitted. In other words, traffic for recovering the link failure is established in a path that is fully extending between the source node and destination node of IP packet D in the above-described traffic restoration step.

The wavelength division multiplexing optical signal containing data of IP packet D is supplied to the photonic IP node 3. The wavelength division multiplexing optical signal is routed by the optical path switch unit 3e of the photonic IP node 3, and further transmitted through the photonic IP nodes 9 and 7 and then received by the photonic IP node 8. The optical path switch unit 8e of the photonic IP node 8 extracts data of IP packet D from the wavelength division multiplexing optical signal. Thus, IP packet D is routed by the router 8b.

As described above, the optical path switching is effected in the photonic IP node on the source side and traffic is restored for recovering the link failure. Therefore, even if photonic IP nodes which the signal only passes through do not effect the optical path switching, the packet can reach the photonic IP node as a destination.

In this way, if link failure is brought about in the above mesh-like network, wavelength switching is effected to change the optical path on the photonic IP node on the source side, and new traffic is established through any of the photonic IP nodes 1 to 9.

While in the above description, only optical path switching is effected for changing the path for the packet to be transmitted, packet switching may be also effected for changing the path for the packet to be transmitted depending on the condition of the optical path.

Moreover, since the path changing is effected by the optical path switching carried out by the source node (IP node on the source side), if availability as viewed from data terminal equipment governed under each node is set to be low, IP packets to be transferred to a plurality of destination nodes in accordance with IP addresses are accommodated in an optical signal of the same wavelength. Accordingly, necessary number of wavelengths prepared for transmission can be reduced. In addition, since a plurality of IP packets can be accommodated in a single optical path, the availability of optical path network 52 is improved and hence the network can be more effectively managed.

According to the above-described manner of traffic restoration, when link failure is brought about in the optical path network 52, optical path switching is effected by the photonic IP node on the source side. However, IP packet switching may be effected by the photonic IP node on the source side for restoring traffic. Also in the present embodiment, path settlement upon normal mode is equal to that illustrated in FIG. 13.

Figure 15:
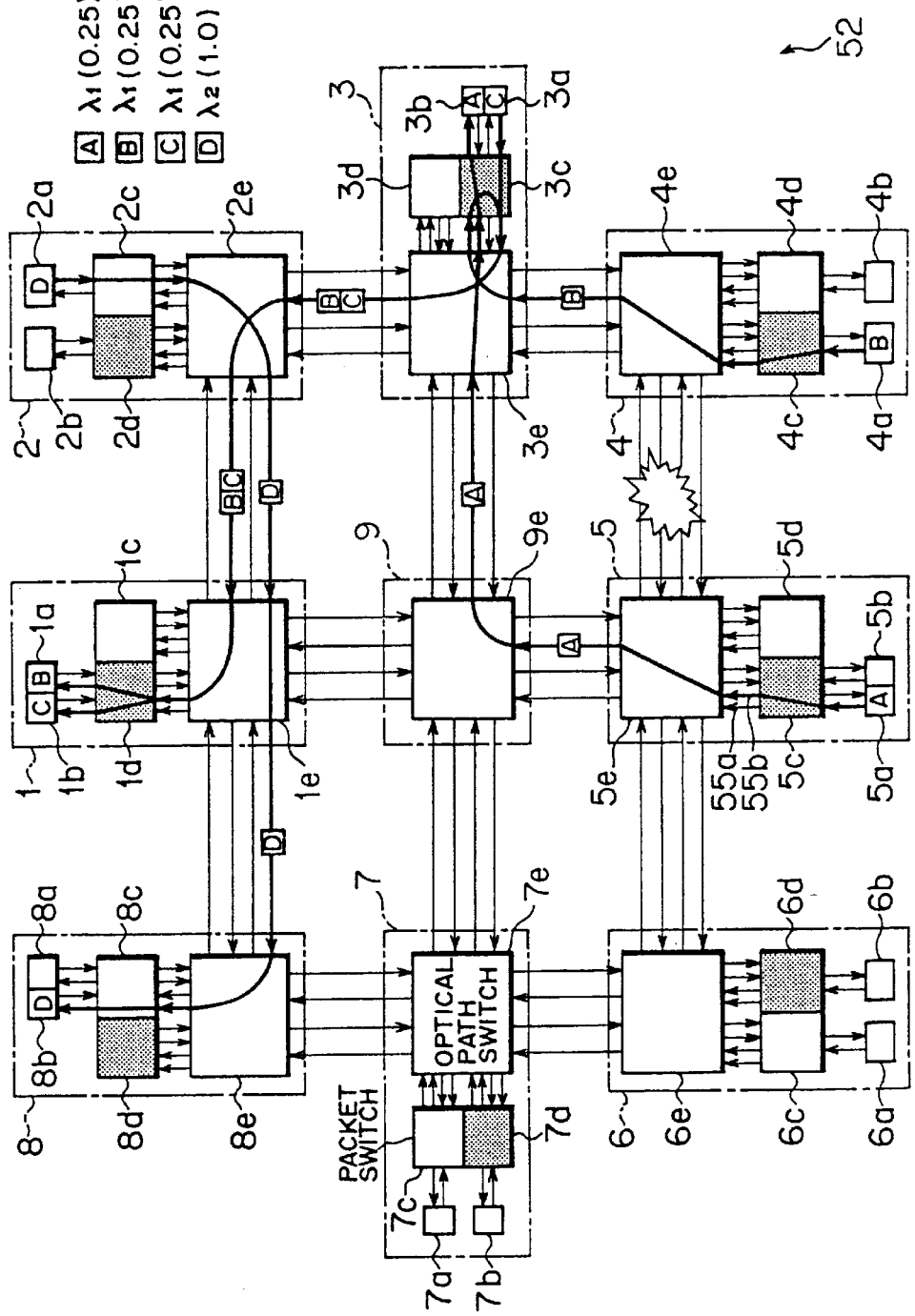
FIG. 15 is a diagram for explaining how the IP packet is transferred in the optical path network according to the second embodiment of the present invention when link failure is brought about at another part of the network and traffic is restored.

FIG. 15 is a diagram for explaining how IP packets are transferred upon another case of traffic restoration in the optical path network according to the second embodiment of the present invention. As shown in FIG. 15, it is assumed that link failure is brought about in a transmission path between the photonic IP node 4 and the photonic IP node 5. An optical path is established for recovering the link failure as illustrated in FIG. 15. The photonic IP nodes constituting the optical path network 52 are arranged to be connected with input/output transmission paths capable of transmitting optical signals so as to form a mesh-like network.

In comparison with the path arrangement shown in FIG. 13, the only IP packet A is influenced from the link failure. Thus, IP packets B, C and D are transmitted through the same paths as those illustrated in FIG. 13.

With the above arrangement, IP packet A generated from the photonic IP node 5 is assigned by the packet switch unit 5c not to the optical path 55a but to the optical path 55b. That is, the switching operation effected by the packet switch unit 5c differs as follows. The optical path 55a of FIG. 13 extends from the photonic IP node 5 through the photonic IP node 4 to the photonic IP node 3. But the optical path 55b of FIG. 15 extends from the photonic IP node 5 through the photonic IP node 9 to the photonic IP node 3. Therefore, the wavelength division multiplexing optical signal is transmitted through the path deriving from the above switching.

The wavelength division multiplexing optical signal containing data of IP packet A is transmitted through the photonic IP node 9 to the photonic IP node 3. The data of IP packet A is extracted from the wavelength division multiplexing optical signal by the optical path switch unit 3e of the photonic IP node 3. Then, IP packet A is routed by the router 3b. Since the optical signal of the wavelength of Al releases the data of IP packet A, with the result that the optical signal comes to have a vacant portion therein, IP packet C is accommodated in the signal and transmitted to the photonic IP node 1.

As described above, when link failure is brought about in the mesh-like network and traffic restoration is effected, the optical path switching is carried out not by the IP node 9 through which a packet to be transmitted passes but by the photonic IP node 5 as a source of the packet transmission. Thus, IP packet A is satisfactorily transmitted to the destination node, or the photonic IP node 3.

Moreover, since the optical path switching is carried out by the source node, if availability as viewed from data terminal equipment governed under the node is set to be low, IP packets to be transferred to a plurality of destination nodes in accordance with IP addresses and outputted to the same transmission path are accommodated in an optical signal of the same wavelength. Accordingly, necessary number of wavelengths prepared for transmission can be reduced. In addition, since a plurality of IP packets can be accommodated in a single optical path, the availability of optical path network 52 is improved and hence the network can be more effectively managed.

(B1) Description of a First Modification of the Second Embodiment of the Present Invention While in the above-described optical path network 52 arranged as a mesh-like network of the second embodiment traffic restoration is carried out by effecting optical path switching or IP packet switching by a photonic IP node on the source side, the optical path switching or IP packet switching may be effected by a photonic IP node neighboring the section in which link failure is brought about.

Figure 16:
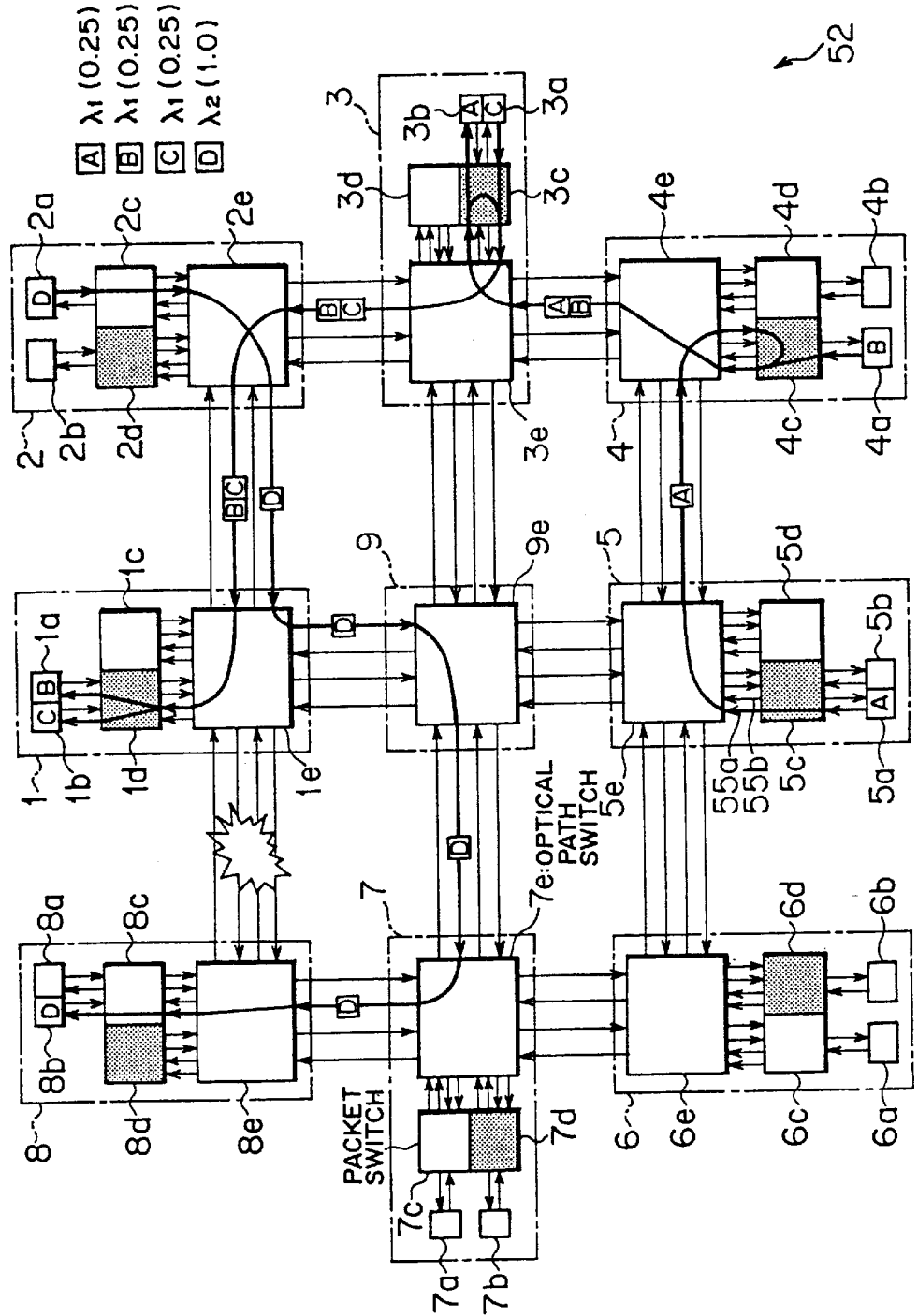
FIG. 16 is a diagram for explaining how the IP packet is transferred in the optical path network according to a first modification of the second embodiment of the present invention when link failure is brought about and traffic is restored.

FIG. 16 is a diagram for explaining how IP packets are transferred upon traffic restoration in the optical path network according to a first modification of the second embodiment of the present invention. The photonic IP nodes 1 to 9 constituting the optical path network 52 shown in FIG. 16 are connected to one another to form a mesh-like network. Thus, the photonic IP nodes 1 to 9 are capable of communicating with one another by means of a wavelength division multiplexing optical signal in a bidirectional fashion. Further, the photonic IP nodes 1 to 9 are provided with an optical path allowing communication bidirectionally and hence an IP packet can be routed among the network composed of the photonic IP nodes 1 to 9. Accordingly, the optical path network 52 is formed of a mesh-like network having input/output transmission paths capable of transmitting optical signals among the photonic IP nodes 1 to 9.

The manner of routing IP packets is as follows. IP packet A is routed from the photonic IP node 5 to the photonic IP node 3. IP packet B is routed from the photonic IP node 4 to the photonic IP node 1. IP packet C is routed from the photonic IP node 3 to the photonic IP node 1. And IP packet D is routed from the photonic IP node 2 to the photonic IP node 8.

Components illustrated in FIG. 16 attached with the same reference numerals as those of the components of the above-described embodiment have the same arrangements or same functions, respectively. Therefore, these components will not be further described. Further, the optical path network 52 is provided with a control channel through which optical path information can be supplied to each of the photonic IP nodes 1 to 9. Thus, the photonic IP nodes 1 to 9 can be informed of a source node and a destination node of each IP packet to be transmitted. In the arrangement shown in FIG. 16, availability upon branching IP packets using wavelength $\lambda 1$ is set to 0.25 and availability upon branching IP packets using wavelength $\lambda 2$ is set to 1.0.

In the above arrangement, if link failure is brought about in a section between the photonic IP node 8 and the photonic IP node 1 shown in FIG. 16, traffic restoration is carried out as follows. That is, with regard to IP packets A, B and C, traffic restoration is effected by not only optical path switching but also packet switching. Conversely, as for IP packet D, only optical path switching is effected because availability for the packet is large.

In more detail, IP packet A is assigned to an optical signal having the wavelength of $\lambda 1$ and transmitted through the transmission path as a wavelength division multiplexing optical signal. The wavelength division multiplexing optical signal containing data of IP packet A is determined as a signal with other node destination in the optical path switch unit 4e of the photonic IP node 4. At this time, since the router 4a of the photonic IP node 4 transmits IP packet B, IP packet B is assigned to an optical signal having a wavelength of $\lambda 1$ together with IP packet A by the optical path switch unit 4e. The optical signal containing data of IP packet A and IP packet B is again outputted to the transmission network.

Successively, when the optical signal assigned with IP packet A and IP packet B reaches the photonic IP node 3, IP packet A is extracted and outputted to the router 3b of the photonic IP node 3. Since the optical signal releases IP packet A, the signal comes to have a capacity to accommodate another packet. On the other hand, the router 3a generates IP packet C, the optical path switch unit 3e converts data of IP packets B and C into an optical signal of an identical wavelength. Thus, the wavelength division multiplexing optical signal containing data of IP packet B and IP packet C is again outputted to the transmission path. The wavelength division multiplexing optical signal is transmitted through the photonic IP node 2 and received by the photonic IP node 1. When the wavelength division multiplexing optical signal containing data of IP packet B and IP packet C is received by the photonic IP node 1, IP packet B and IP packet C are extracted from the wavelength division multiplexing optical signal by the optical path switch unit 1e of the photonic IP node 1, and supplied to the routers 1a and 1b, respectively. Then, the routers 1a and 1b effect routing on IP packet B and IP packet C, respectively.

As shown in FIG. 16, link failure is brought about in a section between the nodes 1 and 8 which is assigned to IP packet D as a part of the route upon normal status. Therefore, IP packet D generated from the router 2a of the photonic IP node 2 is subjected to optical path switching and transmitted in a form of wavelength division multiplexing optical signal. The wavelength division multiplexing optical signal is fed to the photonic IP node 1. The photonic IP node 1 is located at one end of the section in which the link failure is brought about. Second time optical path switching is effected in the photonic IP node 1. Thus, the wavelength division multiplexing optical signal containing data of IP packet D is transmitted through the photonic IP nodes 7 and 9 and reaches the photonic IP node 8. The data of IP packet D is extracted from the wavelength division multiplexing optical signal by the optical path switch 8e of the photonic IP node 8, and extracted IP packet D is routed by the router 8B. Therefore, the above described step of traffic restoration is handled by the nodes neighboring the failed link in such a manner that the optical signal is assigned with a substituting path which permits the optical signal to be transferred to the destination node.

As described above, since the photonic IP node 1 neighboring the failed link on the source side handles the path changing operation, routing for the IP packet can be effected even in the mesh-like network. The neighboring IP node in this case is a node on the side of the source of IP packet A. The photonic IP node 1 effects optical path switching as a neighboring node of the failed link.

While in the above embodiment traffic restoration is carried out by effecting optical path switching, the same can be effected by IP packet switching. Also in the present modification, the state of normal path settlement is equal to that shown in FIG. 13.

Figure 17:
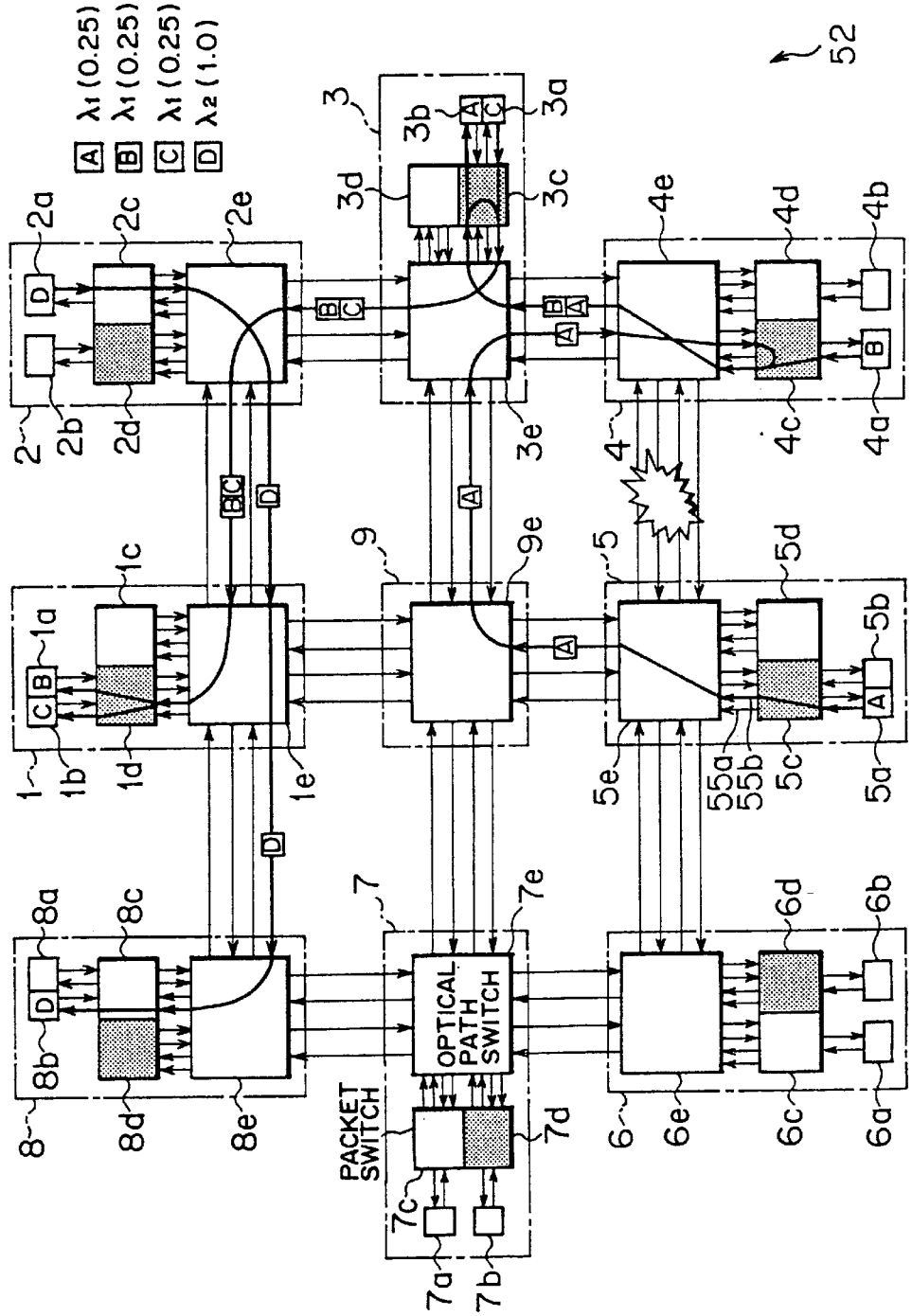
FIG. 17 is a diagram for explaining how the IP packet is transferred in the optical path network according to the first modification of the second embodiment of the present invention when link failure is brought about at another part of the network and traffic is restored.

FIG. 17 is a diagram for explaining how IP packets are transferred upon another case of traffic restoration in the optical path network according to a first modification of the second embodiment of the present invention. As shown in FIG. 17, it is assumed that link failure is brought about in a transmission path between the photonic IP node 4 and the photonic IP node 5. An optical path is established for recovering the link failure as illustrated in FIG. 17. The photonic IP nodes constituting the optical path network 52 are arranged to be connected with input/output transmission paths capable of transmitting optical signals so as to form a mesh-like network.

In comparison with the path arrangement shown in FIG. 13, the only IP packet A is influenced from the link failure. Thus, IP packets B, C and D are transmitted through the same paths as those illustrated in FIG. 13.

With the above arrangement, IP packet A generated from the router 5a is assigned by the packet switch unit 5c not to the optical path 55a but to the optical path 55b. Since the optical path 55b is a path passing through the photonic IP node 5, the photonic IP node 9, the photonic IP node 3 and the photonic IP node 4, the wavelength division multiplexing optical signal from the photonic IP node 5 is outputted not to the photonic IP node 4 but to the photonic IP node 9. That is, the optical path of IP packet A is changed by packet switching. IP packet A is once extracted by the optical path switch unit 4e of the photonic IP node 4, and then extracted IP packet A is again assigned to an optical path which is changed by the packet switch unit 4c. IP packet A is transmitted together with IP packet B to the photonic IP node 3.

As described above, the traffic restoration is handled by the photonic IP node 5 on the source side by means of IP packet switching, whereby the IP packet can be satisfactorily transmitted to its destination node, i.e., photonic IP node 3.

In this way, when link failure is brought about in a mesh-like network, each of the IP nodes 1 to 9 effects optical path switching and packet switching and a photonic IP node neighboring the failed link effects optical path switching. Thus, traffic is restored for recovering the link failure and the IP packet can be satisfactorily transmitted to its destination photonic IP node.

Moreover, since the optical path switching is carried out by the node neighboring the failed link, if availability as viewed from data terminal equipment governed under the node is set to be low, IP packets to be transferred to a plurality of destination nodes in accordance with IP addresses and outputted to the same transmission path are accommodated in an optical signal of the same wavelength. Accordingly, in addition to the optical path switching, necessary number of wavelengths prepared for transmission can be reduced. In addition, since a plurality of IP packets can be accommodated in a single optical path, the availability of optical path network 52 is improved and hence the network can be more effectively managed.

(C) Description of a Third Embodiment of the Present Invention

In the description of the first embodiment, it is described how traffic is restored for recovering link failure which is brought about in a ring-like optical path network. In the description of the second embodiment, description is made on a case in which traffic is restored by effecting optical path switching and IP packet switching by a source node so that link failure brought about in a mesh-like network is recovered. Further, in the description of the first modification of the second embodiment, description is made on a case in which the path switching or the IP packet switching is effected by the source side node of the photonic IP nodes neighboring the failed link.

In the following description of an embodiment, description will be made on a case where a path is settled by using an identical wavelength in a section in which an optical path for traffic restoration is settled and a case where a path is settled by using a wavelength which is variably determined depending on the transmission path in a section in which an optical path for traffic restoration is settled. Initially, reference is made on FIG. 18 for describing the routing carried out in a normal status. Reference is made on FIG. 19 for describing the case where a path is settled by using an identical wavelength in a section in which an optical path for traffic restoration is settled. And reference is made on FIG. 20 for describing a case where a path is settled by using a wavelength which is variably determined depending on the transmission path in a section in which an optical path for traffic restoration is settled.

Figure 18:
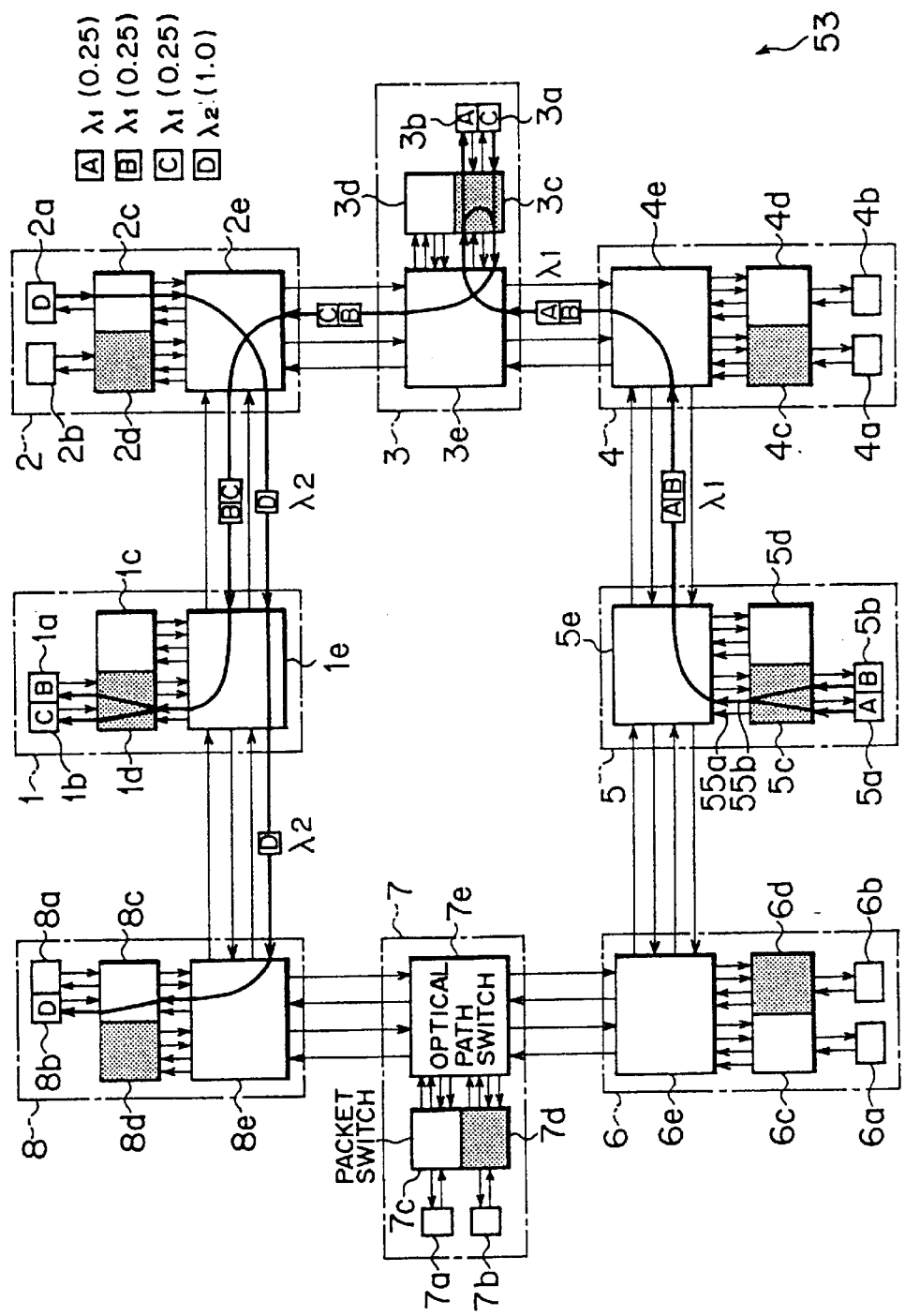
FIG. 18 is a diagram for explaining how the IP packet is transferred in an optical path network according to a third embodiment of the present invention when the network is maintained in a normal status.

FIG. 18 is a diagram for explaining how IP packets are transferred in the optical path network according to the third embodiment of the present invention when no trouble is brought about in the network. As shown in FIG. 18, an optical path network 53 is composed of photonic IP nodes 1 to 8 connected by means of optical fibers so as to form a ring-like network, whereby optical signals deriving from wavelength division multiplexing can be transmitted in a bidirectional fashion. Further, each of the photonic IP nodes 1 to 8 is arranged to have optical paths settled so that the paths are shared among the nodes, and IP packets are routed in the network. Furthermore, in the optical path network 53, an identical optical path is utilized within a section in which an optical path is settled.

The photonic IP nodes 1 to 8 are same as those described in the description of the first embodiment. Therefore, components illustrated in FIG. 18 attached with the same reference numerals as those of the components of the above-described first embodiment have the same arrangements or same functions, respectively. Accordingly, these components will not be further described. Further, the optical path network 53 is provided with a control channel through which optical path information can be supplied to each of the photonic IP nodes 1 to 8. Thus, the photonic IP nodes 1 to 8 can be informed of a source node and a destination node of each IP packet to be transmitted. In the arrangement shown in FIG. 18, availability upon branching IP packets using wavelength $\lambda 1$ is set to 0.25 and availability upon branching IP packets using wavelength $\lambda 2$ is set to 1.0.

Further, if the transmission bit rate of the IP packet to be transmitted to a desired photonic IP node is smaller than the transmission bit rate of one optical path, the wavelength is shared by a plurality of photonic IP nodes, with the result that the packet can be relayed by the packet switches 1c, 1d, to 8c, 8d. Thus, a path connecting between a source photonic IP node and a destination photonic IP node can be established.

Routing for the IP packets becomes as follows. IP packet A is routed from the photonic IP node 5 to the photonic IP node 3. IP packet B is routed from the photonic IP node 5 to the photonic IP node 1. IP packet C is routed from the photonic IP node 3 to the photonic IP node 1. And IP packet D is routed from the photonic IP node 2 to the photonic IP node 8.

In the above arrangement, if no link failure is brought about, IP packets A, B and C undergo the packet switching and wavelength switching. As for IP packet D, since availability is large, only optical path switching is effected.

Initially, IP packet A and IP packet B are assigned to the optical path 55b. The wavelength division multiplexing optical signal containing data of IP packet A and IP packet B is outputted from the optical path switch unit 5e to the transmission path. The wavelength division multiplexing optical signal is transmitted through the photonic IP node 4 and received by the photonic IP node 3. IP packet A is extracted from the wavelength division multiplexing optical signal by the optical path switch unit 3e of the photonic IP node 3. On the other hand, IP packet C generated from the router 3a of the photonic IP node 3 is accommodated in the wavelength division multiplexing optical signal which comes to have a vacancy owing to the extraction of IP packet A. Then, the wavelength division multiplexing optical signal containing data of IP packet B and IP packet C is outputted to the transmission path.

The wavelength division multiplexing optical signal containing data of IP packets B and C is transmitted through the photonic IP node 2 and received by the photonic IP node 1. The received wavelength division multiplexing optical signal reaches the optical path switching unit 1e of the photonic IP node 1, the data of IP packets B and C are extracted from the wavelength division multiplexing optical signal. The extracted IP packets B and C undergo routing operation of the routers 1a and 1b, respectively.

IP packet D is transmitted from the photonic IP node 2, assigned to an optical path having the wavelength of $\lambda 2$, and a wavelength division multiplexing optical signal having the wavelength of λ2 and containing data of IP packet D is transmitted. The wavelength division multiplexing optical signal is transmitted through the photonic IP node 1 and received by the photonic IP node 8. Data of IP packet D is extracted from the wavelength division multiplexing optical signal by the optical path switch unit 8e of the photonic IP node 8. The extracted IP packet D is routed by the router 8a.

As described above, in the ring-like optical path network, optical path switching and IP packet switching are effected for establishing traffic for IP packets. Further, when a packet is transmitted between the photonic IP nodes 4 and 5, the photonic IP nodes 3 and 4, the photonic IP nodes 2 and 3, or the photonic IP nodes 1 and 2, two IP packets can be accommodated in an optical signal of a single wavelength. Accordingly, it becomes possible to reduce the necessary number of optical paths in the optical path network 53. Moreover, the availability of the optical path network 53 can be improved, and the optical path network 53 can be more effectively managed.

Conversely, if link failure is brought about in the optical path network 53, traffic restoration is carried out by effecting optical path switching in a predetermined manner.

Figure 19:
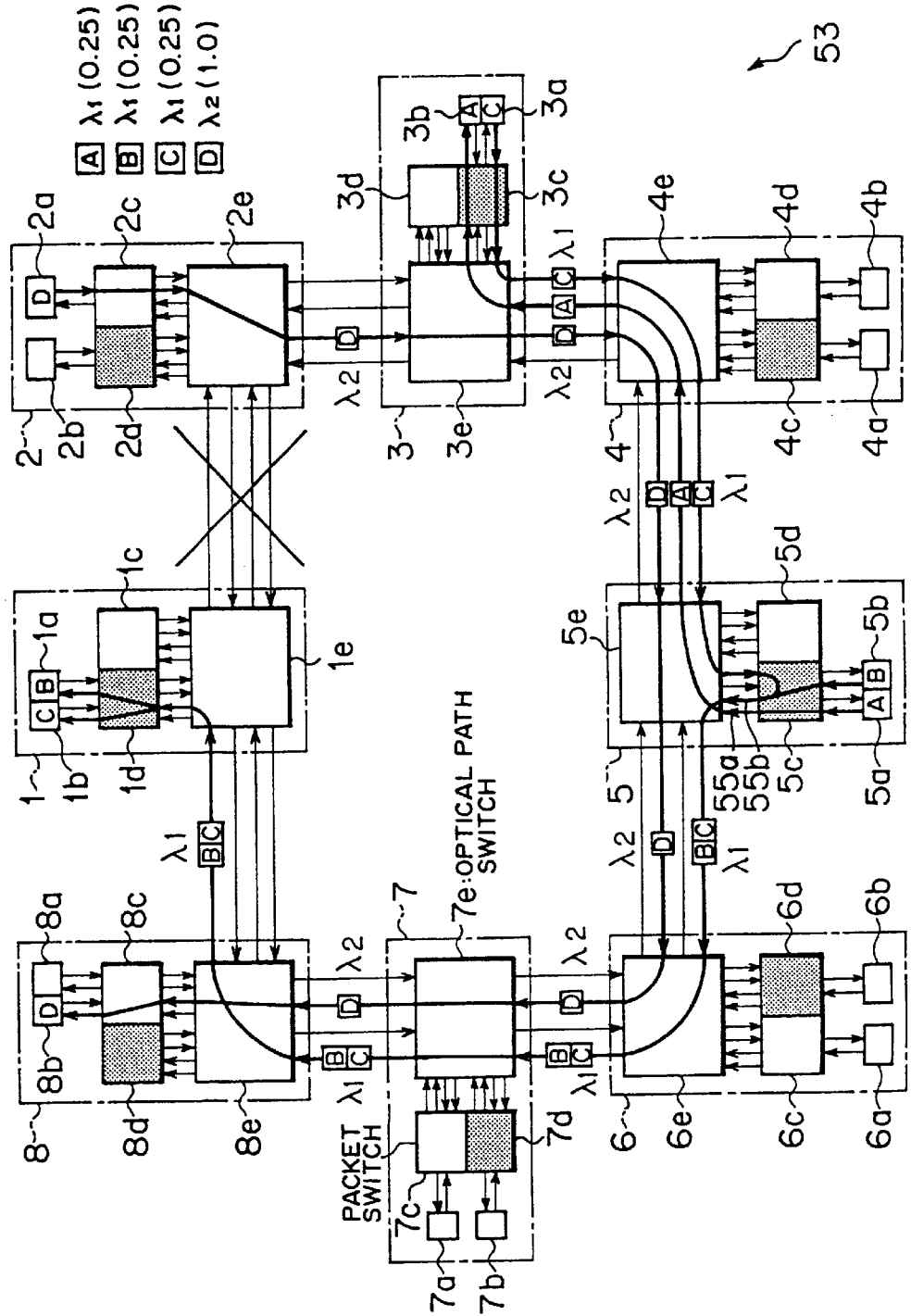
FIG. 19 is a diagram for explaining how the IP packet is transferred in the optical path network according to the third embodiment of the present invention when link failure is brought about and traffic is restored.

FIG. 19 is a diagram for explaining how IP packets are transferred upon traffic restoration carried out in the optical path network according to the third embodiment of the present invention. In FIG. 19, illustrated is how an optical path is settled after link failure is brought about in a transmission path between the photonic IP node 1 and the photonic IP node 2.

Components illustrated in FIG. 19 attached with the same reference numerals as those of the components of the above-described embodiment have the same arrangements or same functions, respectively. Therefore, these components will not be further described. Further, similarly to the already described embodiment, each of the photonic IP nodes 1 to 8 is arranged to be supplied with wavelength information. In the arrangement shown in FIG. 19, availability upon branching IP packets using wavelength λ1 is set to 0.25 and availability upon branching IP packets using wavelength λ2 is set to 1.0. Further, each of the IP packets has an optical path assigned thereto in a manner similar to that shown in FIG. 18 if no link failure is brought about. In the optical path network 53, each section having an optical path settled therein is arranged so that the same wavelength is utilized in accordance with the settled optical path.

According to the situation illustrated in FIG. 18, only IP packet B, C and D are influenced from the link failure. Thus, IP packets A is transmitted through substantially the same path as that illustrated in FIG. 18.

In the above arrangement, IP packets A, B and C undergo optical path switching and packet switching. Conversely, as for IP packet D, only optical path switching is effected because availability for the packet is large.

How traffic is restored for recovering link failure will hereinafter be described after link failure is brought about in a section between the photonic IP node 1 and the photonic IP node 2 as shown in FIG. 19. Initially, IP packet A is subjected to packet switching in the packet switching unit 5c, whereby the optical path in which IP packet A is accommodated is changed from the optical path 55b to the optical path 55a. Thus, the wavelength division multiplexing optical signal containing data of IP packet A is routed from the photonic IP node 5 to the photonic IP node 3.

On the other hand, IP packet B is subjected to optical path switching in such a manner that IP packet B is generated from the router 5b of the photonic IP node 5, and accommodated in a wavelength division multiplexing optical signal of the wavelength of λ1 directed to the photonic IP node 6. IP packet C is assigned to an optical path of the wavelength of λ1 for recovering the link failure by the optical path switching unit 3e. A wavelength division multiplexing optical signal containing data of IP packet C is transmitted from the photonic IP node 3 through the photonic IP node 4 to the photonic IP node 5. IP packets B and C are assigned to an optical path for recovering the link failure by the packet switching unit 5c, and the resulting wavelength division multiplexing optical signal containing data of IP packets B and C is transmitted to the photonic IP node 1. In this way, IP packet B is transmitted by advantageously utilizing the path for IP packet C.

The wavelength division multiplexing optical signal containing data of IP packets B and C is transmitted through the photonic IP nodes 6, 7 and 8 to the photonic IP node 1. IP packets B and C are extracted by the optical path switch unit 1e of the photonic IP node 1. The extracted IP packets B and C are routed by the routers 1a and 1b, respectively.

On the other hand, IP packet D is generated from the photonic IP node 2, assigned to the optical path having a wavelength of λ2 for recovering the link failure by the optical path switch unit 2e, and a wavelength division multiplexing optical signal containing data of IP packet D is outputted to the network. The wavelength division multiplexing optical signal containing data of IP packet D is transmitted through the photonic IP nodes 3, 4, 5, 6 and 7, and inputted to the photonic IP node 8. The optical path switch unit 8e of the photonic IP node 8 extracts the data of IP packet D from the wavelength division multiplexing optical signal. Then, IP packet D is routed by the router 8b.

As described above, in the section having an optical path for recovering link failure settled therein, a path having the same wavelength as that of the path utilized upon normal status is utilized for recovering link failure.

Further, if link failure is brought about in the ring-like optical path network 53, optical path switching is effected not by the photonic IP nodes 1 to 8 through which the wavelength division multiplexing optical signal passes but by the photonic IP node on the transmission side. Thus, traffic restoration is carried out. That is, to make the wavelength division multiplexing optical signal reach its destination photonic IP node, it is unnecessary for the photonic IP nodes utilized for relaying the wavelength division multiplexing optical signal to carry out optical path switching.

Moreover, since the optical path switching is carried out by the source node as described above, IP packets to be transferred to a plurality of destination nodes in accordance with IP addresses and outputted to the same transmission path are accommodated in an optical signal of the same wavelength. Accordingly, necessary number of wavelengths prepared for transmission can be reduced. In addition, the availability of optical path network 53 is improved and hence the network can be more effectively managed.

In the above-described embodiment, in a section having an optical path settled for traffic restoration, a path having the same wavelength as that of the path utilized upon normal status is utilized. However, a path having a wavelength different from that of the path utilized upon normal status may be utilized for recovering link failure. Further, each of the IP packets has an optical path assigned thereto in a manner similar to that shown in FIG. 13 if no link failure is brought about.

Figure 20:
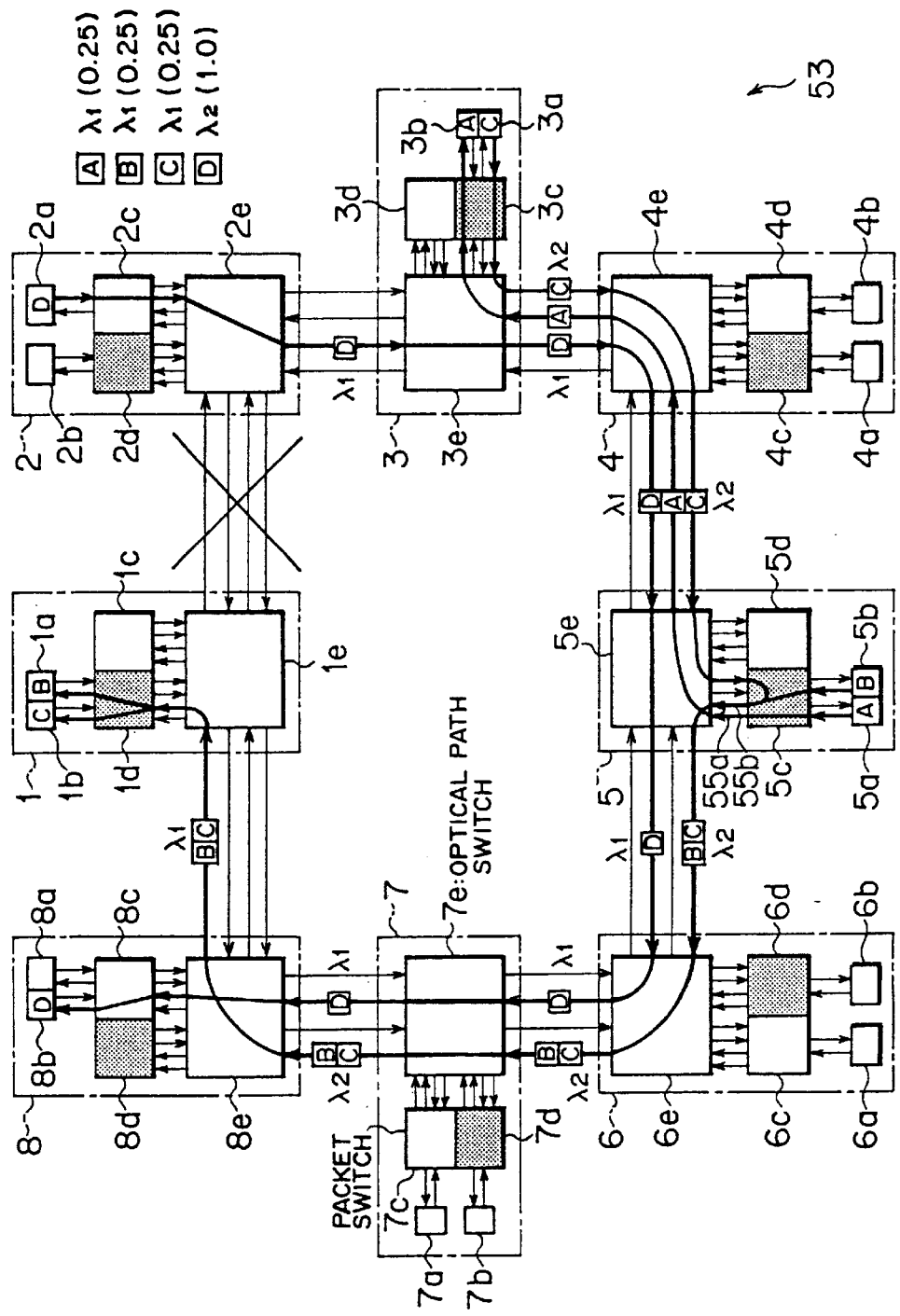
FIG. 20 is a diagram for explaining how the IP packet is transferred in the optical path network according to the third embodiment of the present invention when link failure is brought about at another part of the network and traffic is restored.

FIG. 20 is a diagram for explaining how IP packets are transferred upon traffic restoration in a different mode carried out in the optical path network according to the third embodiment of the present invention. In FIG. 20, illustrated is how an optical path is settled after link failure is brought about in a transmission path between the photonic IP node 1 and the photonic IP node 2.

Components illustrated in FIG. 20 attached with the same reference numerals as those of the components of the above-described embodiment have the same arrangements or same functions, respectively. Therefore, these components will not be further described. Further, similarly to the already described embodiment, each of the photonic IP nodes 1 to 8 is arranged to be supplied with wavelength information. In the arrangement shown in FIG. 20, availability upon branching IP packets using wavelength λ1 is set to 0.25 and availability upon branching IP packets using wavelength λ2 is set to 1.0. Further, each of the IP packets has an optical path assigned thereto in a manner similar to that shown in FIG. 18 if no link failure is brought about.

According to the situation illustrated in FIG. 20, in comparison with the situation illustrated in FIG. 18, only IP packet B, C and D are influenced from the link failure. Thus, IP packets A is transmitted through substantially the same path as that illustrated in FIG. 18.

In the above arrangement, IP packets A, B and C undergo optical path switching and packet switching. Conversely, as for IP packet D, only optical path switching is effected because availability for the packet is large.

How traffic is restored for recovering link failure will hereinafter be described after link failure is brought about in a section between the photonic IP node 1 and the photonic IP node 2 as shown in FIG. 20. Initially, IP packet A is subjected to packet switching in the packet switching unit 5c, whereby IP packet A is assigned to the optical path 55a. Then, the wavelength division multiplexing optical signal containing data of IP packet A is transmitted to the photonic IP node 3. In this case, IP packet C is generated from the router 3a of the photonic IP node 3 and accommodated in a wavelength division multiplexing optical signal of the wavelength of λ2 for recovering link failure. This is different from the case of FIG. 18 in which IP packet C is accommodated in a wavelength division multiplexing optical signal of the wavelength of λ1.

Also, IP packet B is generated from the router 5b of the photonic IP node 5 and subjected to the optical path switching. IP packet C is subjected to the optical path switching in the optical path switching unit 3e of the photonic IP node 3 and assigned to an optical path of the wavelength of λ2. Thus, IP packets B and C are accommodated in the same wavelength division multiplexing optical signal of the wavelength of λ2 in the photonic IP node 5, and the wavelength division multiplexing optical signal containing data of IP packets B and C is outputted to the network.

The wavelength division multiplexing optical signal containing data of IP packets B and C is transmitted through the photonic IP nodes 6, 7 and 8 to the photonic IP node 1. IP packets B and C are extracted by the optical path switch unit 1e of the photonic IP node 1. The extracted IP packets B and C are routed by the routers 1a and 1b, respectively.

On the other hand, IP packet D is generated from the photonic IP node 2, assigned to the optical path having a wavelength of λ1 by the optical path switch unit 2e, and a wavelength division multiplexing optical signal containing data of IP packet D is outputted to the network. It is noted that IP packet D is assigned to the optical path having a wavelength of λ2 in the cased of FIGS. 18 and 19. The wavelength division multiplexing optical signal containing data of IP packet D is transmitted through the photonic IP nodes 3, 4, 5, 6 and 7, and inputted to the photonic IP node 8. The optical path switch unit 8e of the photonic IP node 8 extracts the data of IP packet D from the wavelength division multiplexing optical signal. Then, IP packet D is routed by the router 8b.

As described above, in a section having an optical path settled for traffic restoration, a path having a wavelength different from that of the path utilized upon normal status is utilized as a wavelength traffic restoration for recovering link failure depending on the transmission path. Further, according to the above arrangement, it becomes possible to avoid useless loop-back which tends to occur in a ring-like network.

Further, if link failure is brought about in the ring-like optical path network 53, optical path switching is effected not by the photonic IP nodes 1 to 8 through which the wavelength division multiplexing optical signal passes but by the photonic IP node on the transmission side. Thus, traffic restoration is carried out. That is, to make the wavelength division multiplexing optical signal reach its destination photonic IP node, it is unnecessary for the photonic IP nodes utilized for relaying the wavelength division multiplexing optical signal to carry out optical path switching.

Moreover, since the optical path switching is carried out by the node on the source side, if availability as viewed from data terminal equipment governed under the node is set to be low, IP packets to be transferred to a plurality of destination nodes in accordance with IP addresses and outputted to the same transmission path are accommodated in an optical signal of the same wavelength. Accordingly, in addition to the optical path switching, necessary number of wavelengths prepared for transmission can be reduced. In addition, the availability of optical path network 52 is improved and hence the network can be more effectively managed.

(D) Other Disclosure

The present invention is not limited to the above-described of embodiments and modifications thereof, but various changes and modifications could be effected without departing from the gist of the present invention.

For example, the above-described optical path networks 50, 51, 52 and 53 are ring-state optical path networks respectively. The present invention can also be made for an optical path networks having another connection form such as a mesh-like network.

Now description will be made on a result of evaluation on how the present invention provides merits and improvements in performance of network communication, with reference to FIGS. 21 and 22.

Figure 21:
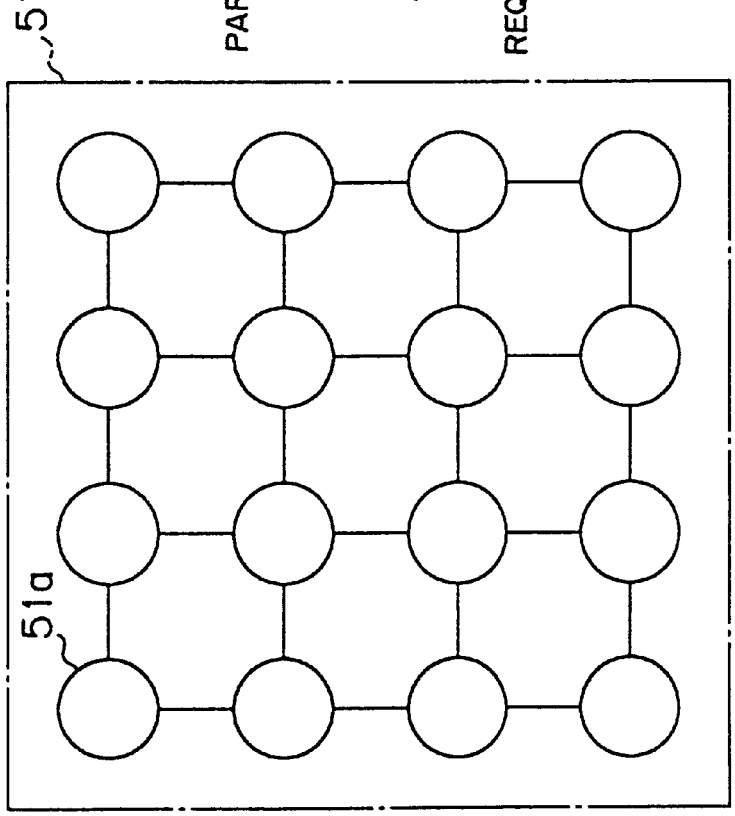
FIG. 21 is a diagram for comparing an arrangement of the network according to the present invention with that of a conventional one in terms of the required number of wavelengths.
Figure 23:
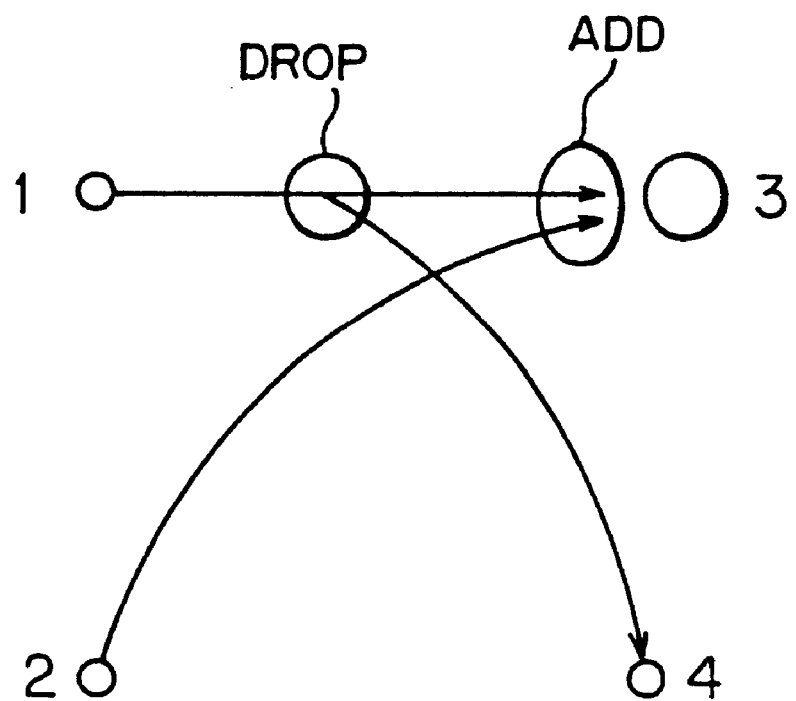
FIG. 23 is a conceptual diagram for explaining optical add/drop function.
Figure 24:
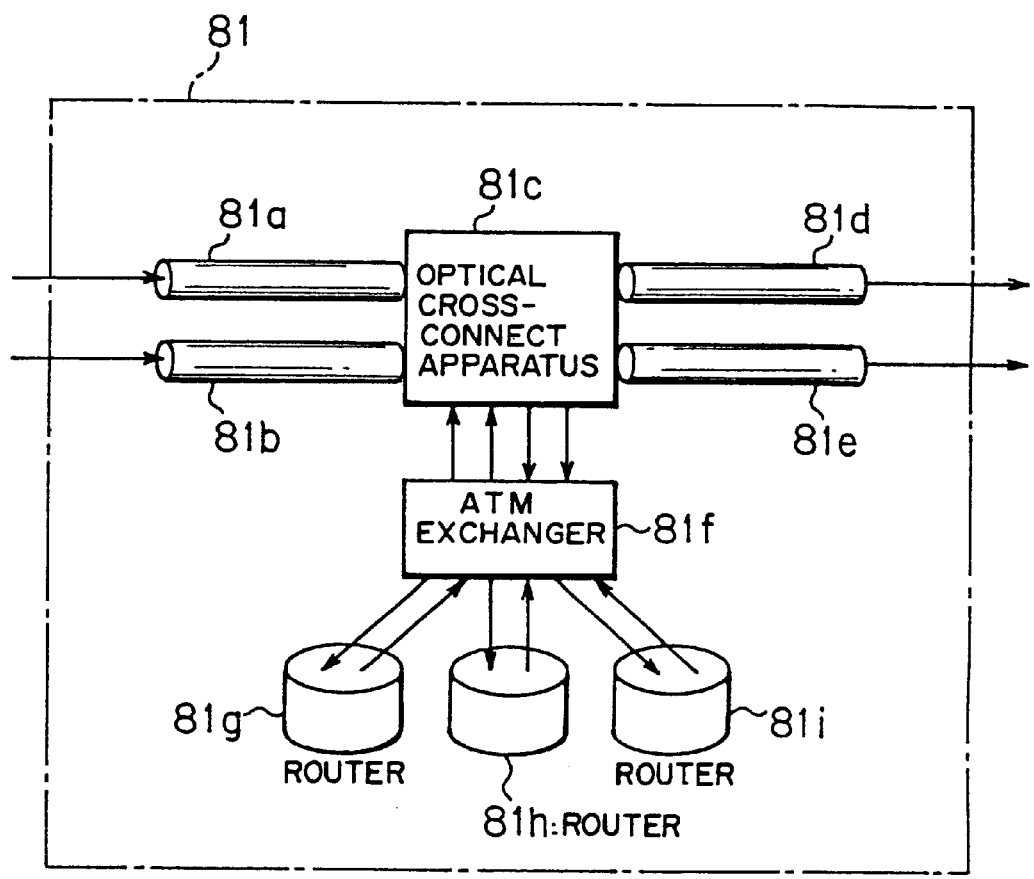
FIG. 24 is a diagram showing a physical arrangement of a photonic IP node.
Figure 25:
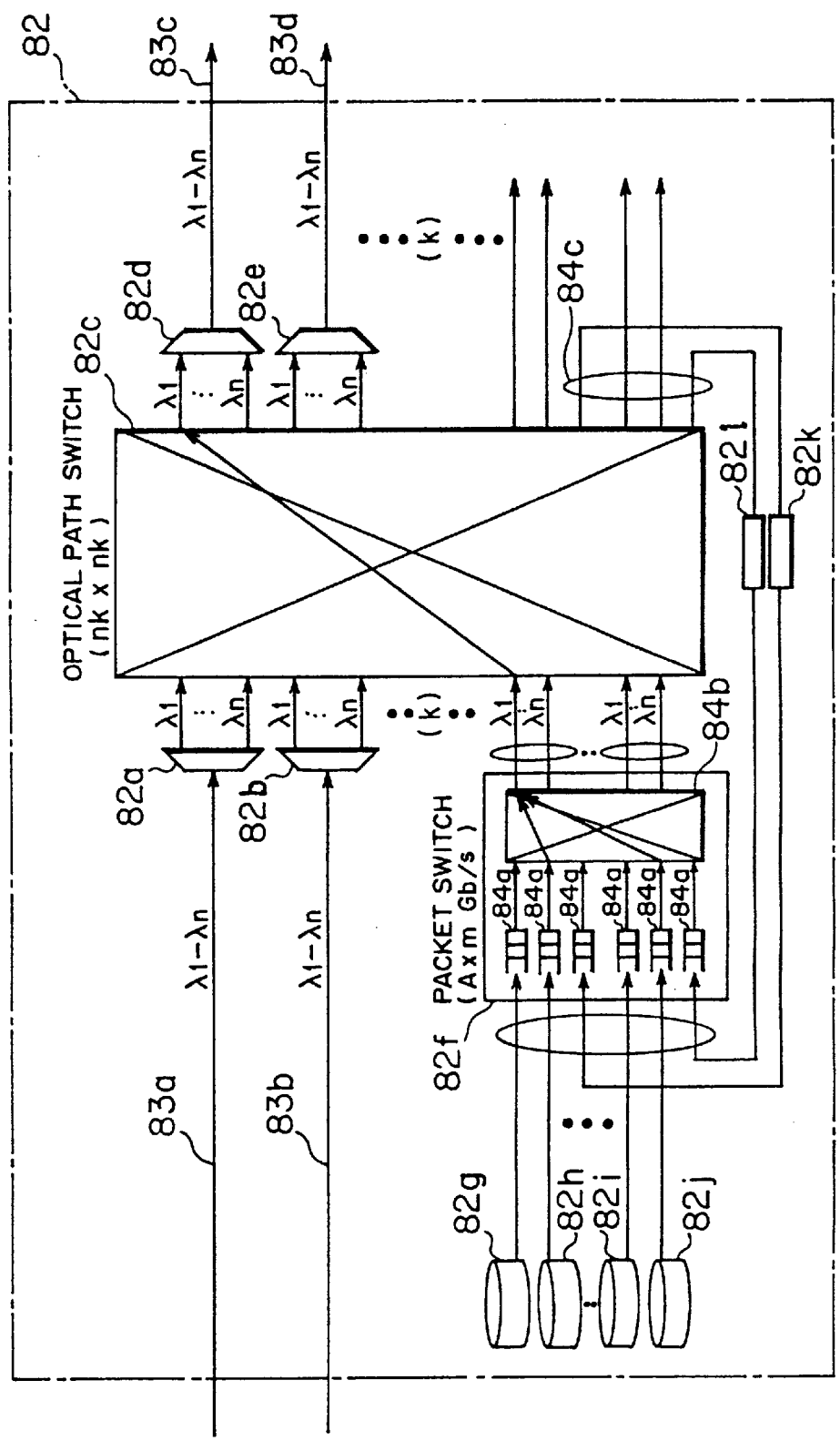
FIG. 25 is a diagram showing a logical arrangement of a photonic IP node.

FIG. 21 is a diagram for evaluating the merits and improvements of the present invention with respect to a conventional arrangement in terms of number of wavelengths prepared in the network. In this figure, there are shown the required number of wavelengths for the wavelength networks 50, 51, 52 and 53 when the network is arranged in a conventional manner and the present invention is applied to the network. The node network model 51 shown in FIG. 21 is composed of 16 photonic IP nodes connected to one another in a grid-fashion. Parameters of the node network model 51 become as follows. That is, if each of the photonic IP nodes is connected to one another in a network fashion (full mesh) and a couple of paths are provided for each connection between the nodes, the total number of paths becomes $_{16}C_2 \times 2$. In this case, $_{16}C_2$ designates a number of possible combinations of two elements out of 16 elements.

With regard to the parameters, the mean transmission bit rate per unit path is 2.5 Gbps, and the transmission bit rate of the wavelength is 10 Gbps. Further, the arrangement of the network 51 of the photonic IP nodes is the same as that of the above-described photonic IP node 1.

If the size of traffic of IP packets is equivalent to 5 Gbps in average in the paths having the same photonic IP node as a destination, in the conventional arrangement, a flow of IP packets equivalent to traffic of 5 Gbps (capacity of 10 Gbps of which availability is set to 0.5) is accommodated in a single wavelength, and this flow of packets does not share the same wavelength with other packets which have a different photonic IP node as a destination. Therefore, the availability of the transmission path stays within 5 Gbps. Conversely, in the optical path to which the present invention is applied, while a couple of packet flows of 2.5 Gbps each having the same photonic IP node as a destination are not assigned to two optical paths, respectively, the packet flow comes to share an optical path with other packet flow having different photonic IP node as a destination. Therefore, availability will be improved. As is noted in FIG. 21, the number of wavelengths that should be prepared in the network according to the present invention is 16 while the number of wavelengths that should be prepared in the network of the conventional arrangement is 29. This improvement reveals that the present invention can reduce the number of wavelengths to be prepared in the network up to about half.

FIG. 22 is a diagram for evaluating the merits and improvements of the present invention with respect to a conventional arrangement in terms of required number of components constituting the network. In this figure, there are shown the required number of components of the 2×2 switch in a photonic IP node of a conventional arrangement and a photonic IP node according to the present invention. The parameters shown in FIG. 22 are as follows. That is, a number of wavelengths undergoing the wavelength division multiplexing is 32, a number of input/output transmission paths is 8, a capacity A of the packet switch unit 11 is 320 Gbps, a number of packet switches is 2, and the transmission bit rate is 10 Gbps.

Figure 26:
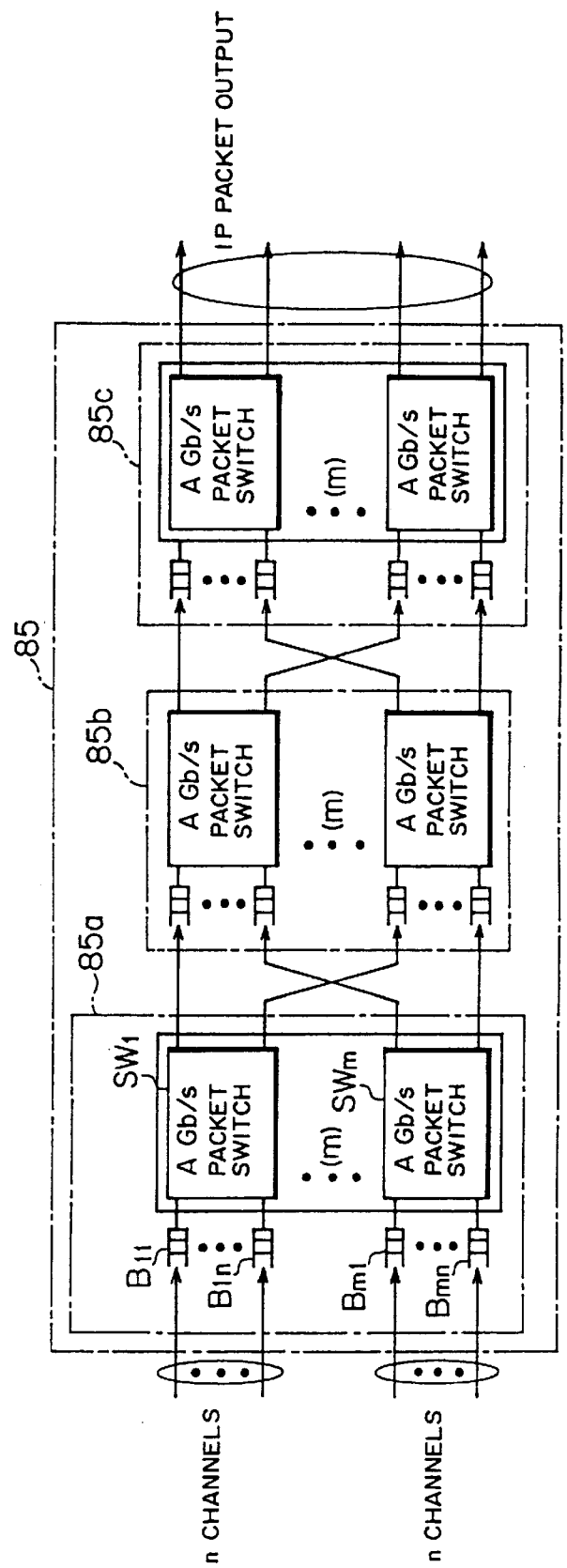
FIG. 26 is a diagram showing an arrangement of a packet switch unit.
Figure 27:
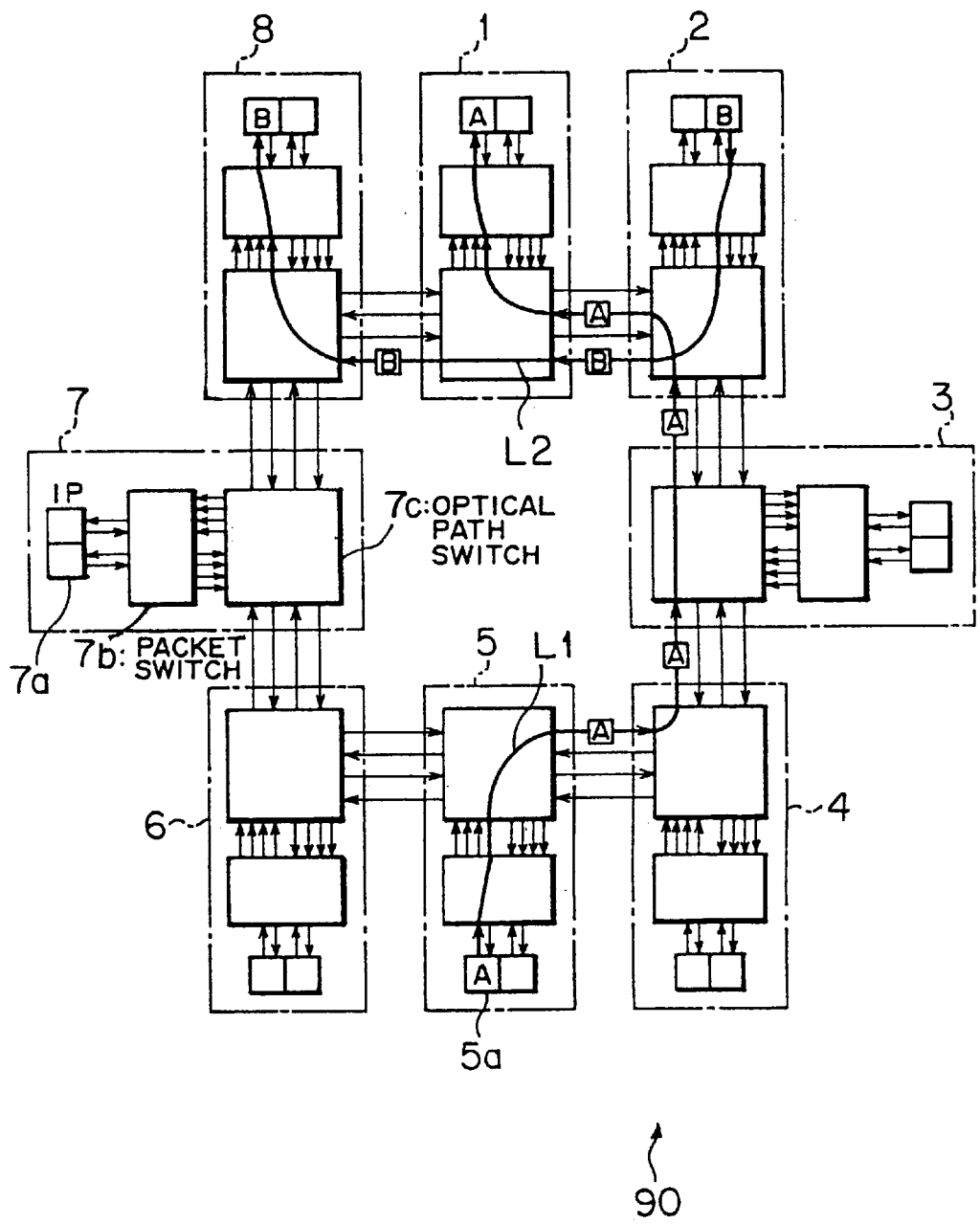
FIG. 27 is a diagram for explaining how an IP packet is transferred in an optical path network when the network is maintained in a normal status.
Figure 28:
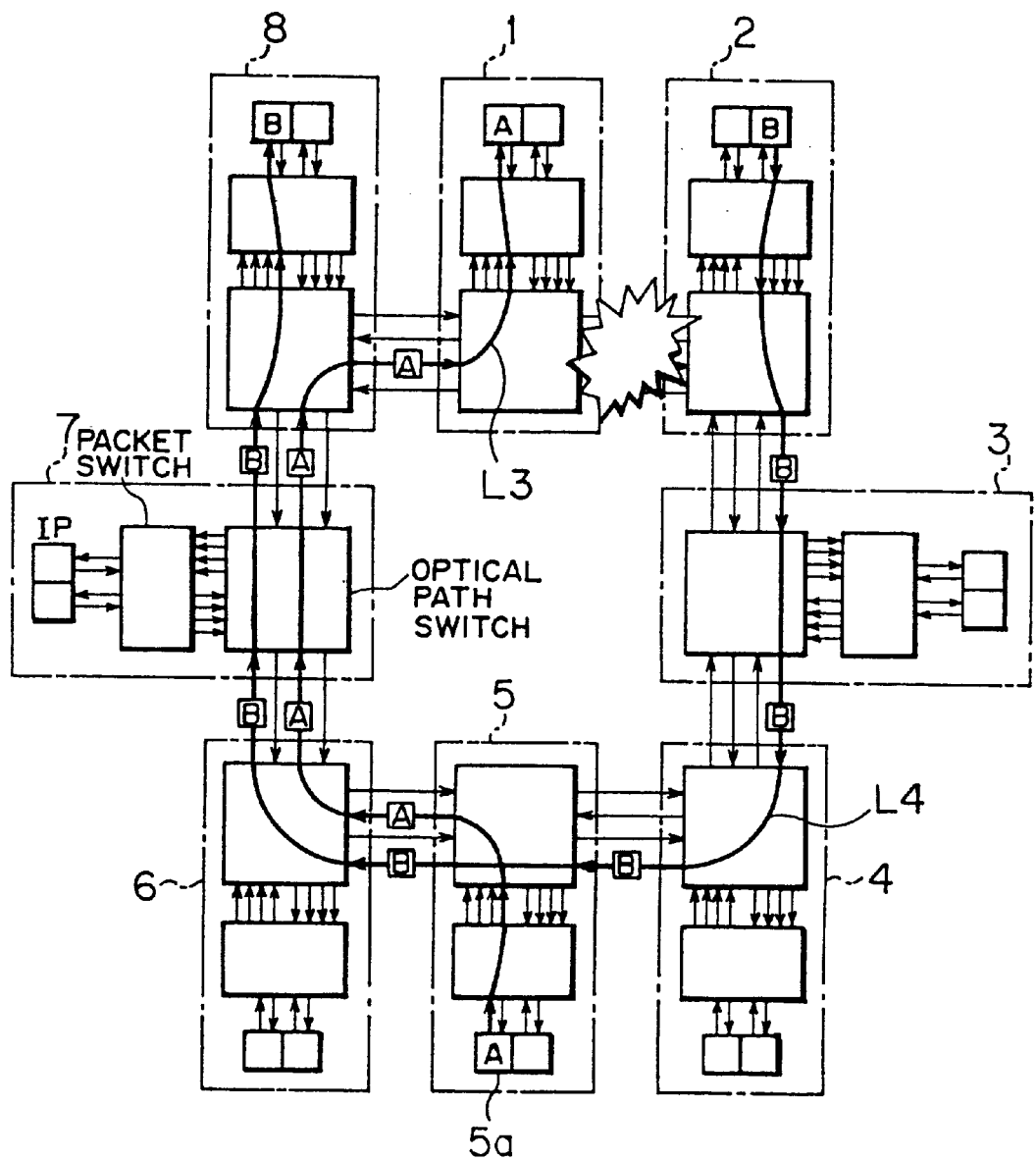
FIG. 28 is a diagram for explaining how the IP packet is transferred in the optical path network when link failure is brought about and traffic is restored.

Comparison was made between a photonic IP node of the present invention and a photonic IP node of a conventional arrangement under the condition that the photonic IP node has the same capacity (e.g., 2.5 Tbps) and both of the nodes are arranged as a three-stage switch circuit network described in the description of the above embodiments. The comparison reveals that the number of switch components required for forming the packet switch unit 11 was decreased by 15%. Moreover, buffer elements of the second and third stages of the packet switch unit 85 of the conventional arrangement (see FIG. 26) becomes unnecessary. Accordingly, each of the photonic IP nodes can be made small.

The optical path 56a shown in FIG. 3 is an exclusively utilized optical path, and hence it is utilized for accommodating a packet with a single destination. On the other hand, the optical path 56b shown in FIG. 3 is a commonly utilized optical path, and hence it is utilized for accommodating packets with different destinations. Therefore, as for example shown in FIG. 7, a wavelength division multiplexing optical signal containing data of a plurality of IP packets is a commonly utilized optical path. For example, the path extending from the photonic IP node 3 to the photonic IP node 5 for transmitting IP packets A and B, and the path extending from the photonic IP node 3 to the photonic IP node 1 for transmitting IP packets B and C, are commonly utilized optical path. On the other hand, a wavelength division multiplexing optical signal containing a single IP packet such as the path extending from the photonic IP node 2 to the photonic IP node 8 for transmitting IP packet D is an exclusively utilized optical path. The above differentiation is similarly applicable to what illustrated in FIGS. 8, 9 and 13 to 20.

Furthermore, the space switch unit 40a and 40c shown in FIGS. 10 and 12 are sometimes referred to as frash switch (Frash Switch: Frequency Multiplexed Routing and Selecting Hybrid).

What is claimed is:

1. A photonic node including a packet switching unit for transferring a packet with a first destination address to another photonic node in accordance with the first destination address, and an optical path switching unit connected to the packet switching unit and for transferring a packet with a second destination address by establishing traffic of an optical path for a wavelength division multiplexing optical signal composed of optical signals of a plurality of wavelengths, comprising:

a space switch unit having a couple of input ports and a couple of output ports, a wavelength division multiplexing optical signal composed of optical signals of a plurality of wavelengths and an add-packet with another node address being supplied thereto through the couple of input ports, respectively, an optical signal with the own node address being extracted from the wavelength division multiplexing optical signal and generated through a first output port as an optical signal to be dropped, and an optical signal with another node address contained in the wavelength division multiplexing optical signal and an optical signal caused by an add-packet with another node address being multiplexed together and generated through a second output port; and buffers for holding a plurality of add-packets generated as an electric signal and supplying the add-packets to the space switch unit; wherein the optical path switching unit is composed of a part of the space switch unit for branching each optical signal of the wavelength division multiplexing optical signal depending on its wavelength, an optical signal with the own node address being extracted from the wavelength division multiplexing optical signal and generated through the first output port as an optical signal to be dropped, and an optical signal with another node address contained in the wavelength division multiplexing optical signal and an optical signal caused by an add-packet with another node address being multiplexed together and generated through the second output port, and the packet switching unit is composed of a remaining part of the space switch unit for branching each optical signal of the wavelength division multiplexing optical signal depending on its wavelength and the buffers, a packet caused by an optical signal to be dropped which is generated from the optical path switching unit and a plurality of add-packets supplied through the buffer being supplied to the packet switching unit, and a packet caused by an optical signal to be dropped which is generated from the optical path switching unit through the first output port and a plurality of the add-packets being supplied to the optical path switching unit as an optical signal assigned with a predetermined wavelength depending on the destination address.

2. A photonic node comprising:

a space switch unit supplied with a wavelength division multiplexing optical signal composed of optical signals assigned with a plurality of wavelengths depending on each destination address and an add-packet with another node address, and generating an optical signal with the own node address extracted from the wavelength division multiplexing optical signal and multiplexing an optical signal with another node address contained in the wavelength division multiplexing optical signal and an optical signal caused by an add-packet with another node address and generating the multiplexed signal therefrom;

buffers for holding a plurality of add-packets generated as an electric signal and supplying the add-packets to the space switch unit;

link failure detecting unit connected to an input side and output side of the space switch unit and capable of detecting link failure occurrence and generating a detection signal based on the wavelength division multiplexing optical signal; and a traffic restoration control unit connected to the link failure detecting unit and arranged to select an optical signal contained in the wavelength division multiplexing optical signal depending on the wavelength, carry out switching among optical paths, and generate the optical signal in accordance with the reception of the detection signal from the link failure detecting unit, wherein a plurality of space switches provided in the space switch unit are arranged as an optical path switching unit such that an optical signal with the own node address is extracted from the wavelength division multiplexing optical signal and generated through the first output port as an optical signal to be dropped, and an optical signal having another node address contained in the wavelength division multiplexing optical signal and an optical signal caused by an add-packet having another node address are multiplexed together and generated through the second output port, and the plurality of space switches provided in the space switch unit and the buffers are arranged as a packet switching unit such that a packet caused by an optical signal to be dropped which is generated from the optical path switching unit through the first output port and a plurality of add-packets supplied through the buffer are supplied to the packet switching unit, and a packet caused by an optical signal to be dropped which is generated from the optical path switching unit through the first output port and a plurality of the add-packets are supplied to the optical path switching unit as an optical signal assigned with a predetermined wavelength depending on the destination address.

3. A photonic node provided with a space switch unit having a first input port at which a wavelength division multiplexing optical signal composed of optical signals of a plurality of wavelengths is received, a second input port at which an add-packet with another node address is received, a first output port from which an optical signal extracted from the wavelength division multiplexing optical signal is generated as an optical signal to be dropped, and a second output port from which an optical signal with another node address contained in the wavelength division multiplexing optical signal and an optical signal caused by the add-packet with the another node address multiplexed with that optical signal are generated, comprising:

a packet switching unit supplied with a packet caused by an optical signal to be dropped which is generated from the first output port and the add-packet from the second input port, and generating a packet caused by an optical signal to be dropped and a plurality of the add-packets as an optical signal assigned with a predetermined wavelength depending on the destination address;

an optical path switching unit for branching an optical signal with the own node address extracted from the wavelength division multiplexing optical signal which is supplied from the first input port and generating through the first output port as an optical signal to be dropped, and multiplexing an optical signal with another node address and an optical signal from the packet switching unit together and generating the multiplexed signal from the second output port;

link failure detecting unit connected to an input side and output side of the space switch unit and capable of detecting link failure occurrence and generating a detection signal based on the wavelength division multiplexing optical signal; and a traffic restoration control unit connected to the link failure detecting unit and arranged to select an optical signal contained in the wavelength division multiplexing optical signal depending on the wavelength, carry out switching among optical paths, and generate the optical signal in accordance with the reception of the detection signal from the link failure detecting unit.

4. A photonic node according to claim 1 employing a space switch unit, the space switch unit comprising:

a first packet switch composed of m (m is an integer) packet switches each having an input port at which the add-packet and the packet caused by an optical signal to be dropped are supplied and an output port from which an optical signal assigned with a predetermined wavelength depending on the destination address is generated;

a first space switch composed of k−m (k is an integer) switches each of which is arranged as an n×2n (n is an integer) matrix switch having n input ports at which an optical signal having one of plurality of differing wavelengths contained in the wavelength division multiplexing optical signal is supplied, and 2n output ports from which an optical signal having the same wavelength as one of plurality of differing wavelengths;

a second space switch composed of 2n switches each of which is arranged as a k×k matrix switch having k input ports at which an optical signal from the first packet switch and an optical signal from the first packet switch are supplied, and k output ports from which an optical signal supplied from the k input ports is output to a path selected in a predetermined manner;

a third space switch composed of k−m switches each of which is arranged as a 2n×n matrix switch having 2n input ports at which an optical signal from the second space switch is supplied, and n output ports from which an optical signal supplied from the 2n input ports is output in accordance with selection depending on the wavelength; and a fourth space switch composed of m switches each of which is arranged as a 2n×n matrix switch having 2n input ports at which an optical signal from the second space switch is supplied, and n output ports from which an optical signal supplied from the 2n input ports is output in accordance with selection depending on the wavelength.

5. A photonic node according to claim 2 employing a space switch unit, the space switch unit comprising:

a first packet switch composed of m (m is an integer) packet switches each having an input port at which the add-packet and the packet caused by an optical signal to be dropped are supplied and an output port from which an optical signal assigned with a predetermined wavelength depending on the destination address is generated;

a first space switch composed of k–m (k is an integer) switches each of which is arranged as an n×2n (n is an integer) matrix switch having n input ports at which an optical signal having one of plurality of differing wavelengths contained in the wavelength division multiplexing optical signal is supplied, and 2n output ports from which an optical signal having the same wavelength as one of plurality of differing wavelengths;

a second space switch composed of 2n switches each of which is arranged as a k×k matrix switch having k input ports at which an optical signal from the first packet switch and an optical signal from the first packet switch are supplied, and k output ports from which an optical signal supplied from the k input ports is output to a path selected in a predetermined manner;

a third space switch composed of k–m switches each of which is arranged as a 2n×n matrix switch having 2n input ports at which an optical signal from the second space switch is supplied, and n output ports from which an optical signal supplied from the 2n input ports is output in accordance with selection depending on the wavelength; and a fourth space switch composed of m switches each of which is arranged as a 2n×n matrix switch having 2n input ports at which an optical signal from the second space switch is supplied, and n output ports from which an optical signal supplied from the 2n input ports is output in accordance with selection depending on the wavelength.

6. A photonic node according to claim 3 employing a space switch unit, the space switch unit comprising:

a first packet switch composed of m (m is an integer) packet switches each having an input port at which the add-packet and the packet caused by an optical signal to be dropped are supplied and an output port from which an optical signal assigned with a predetermined wavelength depending on the destination address is generated;

a first space switch composed of k–m (k is an integer) switches each of which is arranged as an n×2n (n is an integer) matrix switch having n input ports at which an optical signal having one of plurality of differing wavelengths contained in the wavelength division multiplexing optical signal is supplied, and 2n output ports from which an optical signal having the same wavelength as one of plurality of differing wavelengths;

a second space switch composed of 2n switches each of which is arranged as a k×k matrix switch having k input ports at which an optical signal from the first packet switch and an optical signal from the first packet switch are supplied, and k output ports from which an optical signal supplied from the k input ports is output to a path selected in a predetermined manner;

a third space switch composed of k–m switches each of which is arranged as a 2n×n matrix switch having 2n input ports at which an optical signal from the second space switch is supplied, and n output ports from which an optical signal supplied from the 2n input ports is output in accordance with selection depending on the wavelength; and a fourth space switch composed of m switches each of which is arranged as a 2n×n matrix switch having 2n input ports at which an optical signal from the second space switch is supplied, and n output ports from which an optical signal supplied from the 2n input ports is output in accordance with selection depending on the wavelength.

7. A photonic node according to claim 1 employing a space switch unit, the space switch unit comprising:

a second packet switch composed of m (m is an integer) packet switches each having k input ports at which the add-packet and the packet caused by an optical signal to be dropped are supplied and 2k output ports from which an optical signal assigned with a predetermined wavelength depending on the destination address is generated;

a fifth space switch composed of n–m (n is an integer) switches each of which is arranged as a k×2k matrix switch having k input ports at which the wavelength division multiplexing optical signal is supplied, and 2k output ports from which an optical signal having the same wavelength is branched and generated;

an optical branching unit composed of 2k optical couplers for coupling to each other m optical signals generated from the packet switches of the second packet switch, respectively, and n–m optical signals generated from k×2k matrix switch of the fifth space switch, respectively, and branching and generating an optical signal resulting from the wavelength division multiplexing caused by the photocoupling into n signals;

a sixth space switch composed of n–m switches each of which is arranged as 2k×k matrix switch having 2k input ports at which the wavelength division multiplexing optical signal caused by the photocoupling generated from the optical branching unit and k output ports from which the wavelength division multiplexing optical signal caused by the photocoupling is generated under condition of wavelength division multiplexing;

a seventh space switch composed of m switches each of which is arranged as 2k×k matrix switch having 2k input ports at which the wavelength division multiplexing optical signal caused by the photocoupling generated from the optical branching unit and k output ports from which the wavelength division multiplexing optical signal caused by the photocoupling is generated under condition of wavelength division multiplexing; and a wavelength selecting unit composed of n×k optical filters, supplied with optical signals from the sixth space switch and the seventh space switch, selecting an optical signal with a particular wavelength from the optical signals, and generating the selected signal.

8. A photonic node according to claim 2 employing a space switch unit, the space switch unit comprising:

a second packet switch composed of m (m is an integer) packet switches each having k input ports at which the add-packet and the packet caused by an optical signal to be dropped are supplied and 2k output ports from which an optical signal assigned with a predetermined wavelength depending on the destination address is generated;

a fifth space switch composed of n–m (n is an integer) switches each of which is arranged as a k×2k matrix switch having k input ports at which the wavelength division multiplexing optical signal is supplied, and 2k output ports from which an optical signal having the same wavelength is branched and generated;

an optical branching unit composed of 2k photocouplers for coupling to each other m optical signals generated from the packet switches of the second packet switch, respectively, and n-m optical signals generated from k×2k matrix switch of the fifth space switch, respectively, and branching and generating an optical signal resulting from the wavelength division multiplexing caused by the photocoupling into n signals;

a sixth space switch composed of n-m switches each of which is arranged as 2k×k matrix switch having 2k input ports at which the wavelength division multiplexing optical signal caused by the photocoupling generated from the optical branching unit and k output ports from which the wavelength division multiplexing optical signal caused by the photocoupling is generated under condition of wavelength division multiplexing;

a seventh space switch composed of m switches each of which is arranged as 2k×k matrix switch having 2k input ports at which the wavelength division multiplexing optical signal caused by the photocoupling generated from the optical branching unit and k output ports from which the wavelength division multiplexing optical signal caused by the photocoupling is generated under condition of wavelength division multiplexing; and a wavelength selecting unit composed of n×k optical filters, supplied with optical signals from the sixth space switch and the seventh space switch, selecting an optical signal with a particular wavelength from the optical signals, and generating the selected signal.

9. A photonic node according to claim 3 employing a space switch unit, the space switch unit comprising:

a second packet switch composed of m (m is an integer) packet switches each having k input ports at which the add-packet and the packet caused by an optical signal to be dropped are supplied and 2k output ports from which an optical signal assigned with a predetermined wavelength depending on the destination address is generated;

a fifth space switch composed of n-m (n is an integer) switches each of which is arranged as a k×2k matrix switch having k input ports at which the wavelength division multiplexing optical signal is supplied, and 2k output ports from which an optical signal having the same wavelength is branched and generated;

an optical branching unit composed of 2k optical couplers for coupling to each other m optical signals generated from the packet switches of the second packet switch, respectively, and n-m optical signals generated from k×2k matrix switch of the fifth space switch, respectively, and branching and generating an optical signal resulting from the wavelength division multiplexing caused by the photocoupling into n signals;

a sixth space switch composed of n-m switches each of which is arranged as 2k×k matrix switch having 2k input ports at which the wavelength division multiplexing optical signal caused by the photocoupling generated from the optical branching unit and k output ports from which the wavelength division multiplexing optical signal caused by the photocoupling is generated under condition of wavelength division multiplexing;

a seventh space switch composed of m switches each of which is arranged as 2k×k matrix switch having 2k input ports at which the wavelength division multiplexing optical signal caused by the photocoupling generated from the optical branching unit and k output ports from which the wavelength division multiplexing optical signal caused by the photocoupling is generated under condition of wavelength division multiplexing; and a wavelength selecting unit composed of n×k optical filters, supplied with optical signals from the sixth space switch and the seventh space switch, selecting an optical signal with a particular wavelength from the optical signals, and generating the selected signal.

10. A photonic node according to claim 2 employing link failure detecting unit, the link failure detecting unit comprising:

an optical link break detecting unit connected to the input side of the space switch unit and arranged to generate a first switching trigger signal if the node fails to receive the wavelength division multiplexing optical signal; and a monitoring packet receiving unit connected to the output side of the space switch unit and arranged to generate a second trigger signal if the monitoring packet receiving unit fails to receive a monitoring packet which is sent at a predetermined time interval from another node as an electric signal.

11. A photonic node according to claim 3 employing link failure detecting unit, the link failure detecting unit comprising:

an optical link break detecting unit connected to the input side of the space switch unit and arranged to generate a first switching trigger signal if the node fails to receive the wavelength division multiplexing optical signal; and a monitoring packet receiving unit connected to the output side of the space switch unit and arranged to generate a second trigger signal if the monitoring packet receiving unit fails to receive a monitoring packet which is sent at a predetermined time interval from another node as an electric signal.

12. A photonic node according to claim 10 employing a traffic restoration control unit, the traffic restoration control unit comprising:

a path switching control unit connected to the optical link break detecting unit and the monitoring packet receiving unit, and arranged to detect link failure if a predetermined time duration has elapsed till the first trigger signal is last received from the optical link break detecting unit or the second trigger signal is last received from the monitoring packet receiving unit, and select an optical signal of the space switch unit for controlling switching depending on the destination of the optical signal; and a buffer reading/packet switching control unit connected to the monitoring packet receiving unit and arranged to detect link failure in the transmission path if a predetermined time duration has elapsed till the second switching trigger signal is last received from the monitoring packet receiving unit, change a reading order of the plurality of add-packets held in the buffers, and select an optical signal of the space switch unit for controlling switching depending on the destination of the optical signal.

13. A photonic node according to claim 11 employing a traffic restoration control unit, the traffic restoration control unit comprising:

a path switching control unit connected to the optical link break detecting unit and the monitoring packet receiving unit, and arranged to detect link failure if a predetermined time duration has elapsed till the first trigger signal is last received from the optical link break detecting unit or the second trigger signal is last received from the monitoring packet receiving unit, and select an optical signal of the space switch unit for controlling switching of the destination of the optical signal; and a buffer reading/packet switching control unit connected to the monitoring packet receiving unit and arranged to detect link failure if a predetermined time duration has elapsed till the second switching trigger signal is last received from the monitoring packet receiving unit, change a reading order of the plurality of add-packets held in the buffers, and select an optical signal of the space switch unit for controlling switching of the destination of the optical signal.

14. A photonic node for signal transmission including a packet switching unit for transferring a packet with a first destination address to another photonic node in accordance with the first destination address, and an optical path switching unit connected to the packet switching unit and for transferring a packet with a second destination address by establishing connection to an optical path of a wavelength division multiplexing optical signal composed of optical signals of a plurality of wavelengths, comprising:

a space switch unit having a couple of input ports and a couple of output ports, a wavelength division multiplexing optical signal composed of optical signals of a plurality of wavelengths and an add-packet with another node address being supplied thereto through the couple of input ports, respectively, an optical signal with the own node address being extracted from the wavelength division multiplexing optical signal and generated through a first output port as an optical signal to be dropped, and an optical signal with another node address contained in the wavelength division multiplexing optical signal and an optical signal caused by an add-packet with another node address being multiplexed together and generated through a second output port;

buffers for holding a plurality of add-packets generated as an electric signal and supplies the add-packets to the space switch unit; and a monitoring packet transmitting unit for generating a packet as an electric signal at a predetermined time interval, wherein the optical path switching unit is composed of a part of the space switch unit for branching each optical signal of the wavelength division multiplexing optical signal depending on its wavelength, an optical signal with the own node address being extracted from the wavelength division multiplexing optical signal and generated through the first output port as an optical signal to be dropped, and an optical signal with another node address contained in the wavelength division multiplexing optical signal and an optical signal caused by an add-packet with another node address being multiplexed together and generated through the second output port, and the packet switching unit is composed of a remaining part of the space switch unit for branching each optical signal of the wavelength division multiplexing optical signal depending on its wavelength, and the buffers, a packet caused by an optical signal to be dropped which is generated from the optical path switching unit and a plurality of add-packets supplied through the buffer being supplied to the packet switching unit, and a packet caused by an optical signal to be dropped which is generated from the optical path switching unit through the first output port and a plurality of the add-packets being supplied to the optical path switching unit as an optical signal assigned with a predetermined wavelength depending on the destination address.

15. A photonic node for signal reception including a packet switching unit for transferring a packet with a first destination address to another photonic node in accordance with the first destination address, and an optical path switching unit connected to the packet switching unit and for transferring a packet with a second destination address by establishing connection to an optical path of a wavelength division multiplexing optical signal composed of optical signals of a plurality of wavelengths, comprising:

a space switch unit having a couple of input ports and a couple of output ports, a wavelength division multiplexing optical signal composed of optical signals of a plurality of wavelengths and an add-packet with another node address being supplied thereto through the couple of input ports, respectively, an optical signal with the own node address being extracted from the wavelength division multiplexing optical signal and generated through a first output port as an optical signal to be dropped, and an optical signal with another node address contained in the wavelength division multiplexing optical signal and an optical signal caused by an add-packet with another node address being multiplexed together and generated through a second output port;

buffers for holding a plurality of add-packets generated as an electric signal and supplies the add-packets to the space switch unit;

a monitoring packet receiving unit connected to the output side of the space switch unit and arranged to generate a second trigger signal if the monitoring packet receiving unit fails to receive a monitoring packet which is sent at a predetermined time interval from another node as an electric signal;

a buffer reading/packet switching control unit connected to the monitoring packet receiving unit and arranged to detect link failure if a predetermined time duration has elapsed till the second switching trigger signal is last received from the monitoring packet receiving unit, change a reading order of the plurality of add-packets held in the buffers, and select an optical signal of the space switch unit for controlling switching of the destination of the optical signal; and a path switching control unit connected to the monitoring packet receiving unit, and arranged to detect link failure if a predetermined time duration has elapsed till the second trigger signal is last received from the monitoring packet receiving unit, and select an optical signal of the space switch unit for controlling switching of the destination of the optical signal, wherein the optical path switching unit is composed of a part of the space switch unit for branching each optical signal of the wavelength division multiplexing optical signal depending on its wavelength, an optical signal with the own node address being extracted from the wavelength division multiplexing optical signal and generated through the first output port as an optical signal to be dropped, and an optical signal with another node address contained in the wavelength division multiplexing optical signal and an optical signal caused by an add-packet with another node address being multiplexed together and generated through the second output port, and the packet switching unit is composed of a remaining part of the space switch unit for branching each optical signal of the wavelength division multiplexing optical signal depending on its wavelength and the buffers, a packet caused by an optical signal to be dropped which is generated from the optical path switching unit and a plurality of add-packets supplied through the buffer being supplied to the packet switching unit, and a packet caused by an optical signal to be dropped which is generated from the optical path switching unit through the first output port and a plurality of the add-packets being supplied to the optical path switching unit as an optical signal assigned with a predetermined wavelength depending on the destination address.

16. A photonic node for signal reception including a packet switching unit for transferring a packet with a first destination address to another photonic node in accordance with the first destination address, and an optical path switching unit connected to the packet switching unit and for transferring a packet with a second destination address by establishing connection to an optical path of a wavelength division multiplexing optical signal composed of optical signals of a plurality of wavelengths, comprising:

a space switch unit having a couple of input ports and a couple of output ports, a wavelength division multiplexing optical signal composed of optical signals of a plurality of wavelengths and an add-packet with another node address being supplied thereto through the couple of input ports, respectively, an optical signal with the own node address being extracted from the wavelength division multiplexing optical signal and generated through a first output port as an optical signal to be dropped, and an optical signal with another node address contained in the wavelength division multiplexing optical signal and an optical signal caused by an add-packet with another node address being multiplexed together and generated through a second output port;

buffers for holding a plurality of add-packets generated as an electric signal and supplies the add-packets to the space switch unit;

an optical link break detecting unit connected to the input side of the space switch unit and arranged to generate a first switching trigger signal if the node fails to receive the wavelength division multiplexing optical signal;

a monitoring packet receiving unit connected to the output side of the space switch unit and arranged to generate a second trigger signal if the monitoring packet receiving unit fails to receive a monitoring packet which is sent at a predetermined time interval from another node as an electric signal;

a path switching control unit connected to the optical link break detecting unit and the monitoring packet receiving unit, and arranged to detect link failure if a predetermined time duration has elapsed till the first trigger signal is last received from the optical link break detecting unit or the second trigger signal is last received from the monitoring packet receiving unit, and select an optical signal of the space switch unit for controlling switching of the destination of the optical signal; and a buffer reading/packet switching control unit connected to the monitoring packet receiving unit and arranged to detect link failure if a predetermined time duration has elapsed till the second switching trigger signal is last received from the monitoring packet receiving unit, change a reading order of the plurality of add-packets held in the buffers, and select an optical signal of the space switch unit for controlling switching of the destination of the optical signal, wherein the optical path switching unit is composed of a part of the space switch unit for branching each optical signal of the wavelength division multiplexing optical signal depending on its wavelength, an optical signal with the own node address being extracted from the wavelength division multiplexing optical signal and generated through the first output port as an optical signal to be dropped, and an optical signal with another node address contained in the wavelength division multiplexing optical signal and an optical signal caused by an add-packet with another node address being multiplexed together and generated through the second output port, and the packet switching unit is composed of a remaining part of the space switch unit for branching each optical signal of the wavelength division multiplexing optical signal depending on its wavelength and the buffers, a packet caused by an optical signal to be dropped which is generated from the optical path switching unit and a plurality of add-packets supplied through the buffer being supplied to the packet switching unit, and a packet caused by an optical signal to be dropped which is generated from the optical path switching unit through the first output port and a plurality of the add-packets being supplied to the optical path switching unit as an optical signal assigned with a predetermined wavelength depending on the destination address.

17. A photonic node for signal reception according to claim 16, wherein the buffer reading/packet switching control unit is arranged to respond to the time duration which is variably settled, and the path switching control unit is also arranged to respond to the time duration which is variably settled.

18. A method of restoring traffic upon occurrence of link failure in an optical path network composed of a plurality of photonic nodes connected to one another, a photonic node including a packet switching unit for transferring a packet with a first destination address to another photonic node in accordance with the first destination address, and an optical path switching unit connected to the packet switching unit and for transferring a packet with a second destination address by establishing connection to an optical path of a wavelength division multiplexing optical signal composed of optical signals of a plurality of wavelengths, the method comprising the steps of:

processing an input packet by receiving a wavelength division multiplexing optical signal composed of optical signals assigned with a plurality of wavelength depending on the first destination address, and extracting an optical signal with the own node address and an optical signal with another node address from the wavelength division multiplexing optical signal and generating the extracted signals;

processing an output packet by decoding a packet from the optical signal generated at the step of processing an input packet, assigning the decoded packet and a plurality of add-packets generated as electric signals to an optical signal with a predetermined wavelength depending on the destination address, and generating the optical signals;

extracting a number of nodes which are designated by destination addresses of the optical signals assigned with the packets at the step of processing an output packet;

assigning a predetermined wavelength to the optical signal generated at the step of processing the input packet and the optical signal generated at the step of processing the output packet so as to secure the corresponding wavelength, and then generating the optical signal assigned with the predetermined wavelength;

detecting occurrence of link failure based on the wavelength division multiplexing optical signal and generating a detection signal; and restoring traffic recovering the link failure by operating at least one of the packet switching unit and the optical path switching unit so that the packet can be transmitted through the established traffic to the photonic node corresponding to the destination address, based on the number of destination nodes determined at the step of extracting the number of nodes.

19. A method of restoring traffic upon occurrence of link failure in an optical path network according to claim 18, wherein the step of detecting occurrence of link failure is arranged as an optical link break detecting step in which if the wavelength division multiplexing optical signal is absent in being received by the node for a predetermined period of time, then it is determined that any link failure is brought about.

20. A method of restoring traffic upon occurrence of link failure in an optical path network according to claim 19, wherein the step of detecting occurrence of link failure is arranged to further include a monitoring packet receiving step in which a monitoring packet transmitted at a predetermined time interval is received and if the monitoring packet is absent in being received for a predetermined period of time, then it is also determined that any link failure is brought about.

21. A method of restoring traffic upon occurrence of link failure in an optical path network according to claim 20, wherein the step of detecting occurrence of link failure, comprising:

a first extending step for extending the period of time concerning the detection of the absence in receiving the monitoring packet in the monitoring packet receiving step; and a first detecting step in which if the wavelength division multiplexing optical signal is absent in being received by the node for a predetermined period of time, then it is determined that link failure is brought about.

22. A method of restoring traffic upon occurrence of link failure in an optical path network according to claim 20, wherein the step of detecting occurrence of link failure, comprising:

a second extending step for extending the period of time concerning the detection of the absence in receiving the wavelength division multiplexing optical signal in the optical link break detecting step; and a second detecting step in which if the monitoring packet is absent in being received for the predetermined period of time, then it is determined that link failure is brought about.

23. A method of restoring traffic upon occurrence of link failure in an optical path network according to claim 18, wherein the step of establishing traffic avoiding the link failure is arranged such that when it is determined that the number of nodes of destination address is singular in the node number extracting step, the optical path of the optical signal generated at the optical path processing step is changed, whereas when it is determined that the number of node of destination address is plural in the node number extracting step, the optical path of the optical signal generated at the optical path processing step is changed, and the decoded packet and the add-packet are assigned with a wavelength corresponding to the destination address.

24. A method of restoring traffic upon occurrence of link failure in an optical path network according to claim 18, wherein the step of establishing traffic avoiding the link failure is arranged such that the traffic is rerouted at the source node and the destination node in such a manner that the optical signal is assigned with a substituting path which permits the optical signal to be transferred to the destination node.

25. A method of restoring traffic upon occurrence of link failure in an optical path network according to claim 18, wherein the step of establishing traffic avoiding the link failure is arranged such that the traffic restoration is handled by the nodes neighboring the failed link in such a manner that the optical signal is assigned with a substituting path which permits the optical signal to be transferred to the destination node.

26. A method of restoring traffic upon occurrence of link failure in an optical path network according to claim 24, wherein the step of establishing traffic avoiding the link failure is arranged such that an identical wavelength is assigned to an optical signal to be transmitted through a section to which the optical path is settled.

27. A method of restoring traffic upon occurrence of link failure in an optical path network according to claim 24, wherein the step of establishing traffic avoiding the link failure is arranged such that differing wavelengths are assigned to optical signals to be transmitted through a section to which the optical path is settled.

28. A photonic node comprising:

an optical path switching unit supplied with optical signals having a plurality of wavelengths different from one another at a plurality of input ports, subjecting the optical signals having a plurality of wavelengths different from one another to a switching operation effected by an opto-space switch of a multi-stage arrangement; and a buffer connected to a predetermined number of ports of the plurality of input ports provided in the optical path switching unit, holding a packet with a destination address and supplying the packet to the optical path switching unit at the predetermined number of ports, wherein a part of the opto-space switch of the optical path switching unit including a packet switching unit for converting the packet supplied to the buffer into an optical signal assigned with a predetermined wavelength depending on the destination address and generating the optical signal.

29. A method of restoring traffic avoiding link failure in an optical path network in which a plurality of packets each having a destination address are converted into optical signals of a predetermined wavelength and transferred depending on the destination address, the method comprising the steps of:

extracting the number of nodes of the destination address of the optical signals which are converted from the plurality of packets;

converting the plurality of packets into optical signals having an identical wavelength if the number of nodes is determined to be plural at the node number extracting step; and converting the packet into an optical signal having a wavelength depending on the destination address if the number of nodes is determined to be singular at the node number extracting step.

* * * * *